(12) United States Patent
Huh et al.

(10) Patent No.: US 9,133,709 B2
(45) Date of Patent: Sep. 15, 2015

(54) DETERMINATION OF OIL SATURATION IN RESERVOIR ROCK USING PARAMAGNETIC NANOPARTICLES AND MAGNETIC FIELD

(75) Inventors: Chun Huh, Austin, TX (US); Steven L. Bryant, Austin, TX (US); Thomas E. Milner, Austin, TX (US); Keith P. Johnston, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 700 days.

(21) Appl. No.: 13/508,611

(22) PCT Filed: Nov. 17, 2010

(86) PCT No.: PCT/US2010/057080
§ 371 (c)(1),
(2), (4) Date: Aug. 6, 2012

(87) PCT Pub. No.: WO2011/063023
PCT Pub. Date: May 26, 2011

(65) Prior Publication Data
US 2013/0091941 A1  Apr. 18, 2013

Related U.S. Application Data

(60) Provisional application No. 61/262,037, filed on Nov. 17, 2009.

(51) Int. Cl.
*E21B 49/00* (2006.01)
*E21B 47/10* (2012.01)
*G01V 3/08* (2006.01)

(52) U.S. Cl.
CPC ............. *E21B 49/00* (2013.01); *E21B 47/1015* (2013.01); *G01V 3/082* (2013.01)

(58) Field of Classification Search
CPC ...... E21B 47/1015; E21B 49/00; G01V 3/082
See application file for complete search history.

(56) References Cited

U.S. PATENT DOCUMENTS

| | | | | |
|---|---|---|---|---|
| 4,222,444 A | * | 9/1980 | Hamilton | ........................ 175/72 |
| 4,269,279 A | | 5/1981 | House | |
| 4,491,796 A | * | 1/1985 | Smith | ........................... 324/346 |
| 4,769,602 A | | 9/1988 | Vinegar et al. | |

(Continued)

FOREIGN PATENT DOCUMENTS

WO      2011063023  A2      5/2011

OTHER PUBLICATIONS

Adkins, Stephanie, et al., "Water-in-Carbon Dioxide Emulsions Stabilized with Hydrophobic Silica Particles," Phys. Chem. Chem. Phys., (2007), 9:6333-6343.

(Continued)

*Primary Examiner* — John Fitzgerald
(74) *Attorney, Agent, or Firm* — Chainey P. Singleton; Edwin S. Flores; Chalker Flores, LLP

(57) ABSTRACT

Methods for detection of the presence and distribution of oil in subsurface formation are described herein. The present invention involves injection of an aqueous dispersion of the nanoparticles into the potentially oil containing subsurface formation, followed by a remote detection of the oscillation responses of the nanoparticles in the oil/water interfaces in the reservoir rock by applying magnetic field.

15 Claims, 24 Drawing Sheets

(56) References Cited

U.S. PATENT DOCUMENTS

| | | | |
|---|---|---|---|
| 5,151,658 A * | 9/1992 | Muramatsu et al. | 324/346 |
| 5,877,995 A | 3/1999 | Thompson et al. | |
| 6,250,848 B1 * | 6/2001 | Moridis et al. | 405/263 |
| 7,170,294 B2 | 1/2007 | Kasevich | |
| 7,741,841 B2 | 6/2010 | Edwards et al. | |
| 8,230,918 B2 * | 7/2012 | Ameen | 166/250.1 |
| 8,269,501 B2 * | 9/2012 | Schmidt et al. | 324/345 |
| 8,638,104 B2 * | 1/2014 | Barber et al. | 324/338 |
| 2008/0290876 A1 | 11/2008 | Ameen | |
| 2009/0043198 A1 | 2/2009 | Milner | |
| 2009/0179649 A1 | 7/2009 | Schmidt et al. | |

OTHER PUBLICATIONS

Adler, Desmond C., et al., "Phase-Sensitive Optical Coherence Tomography at up to 370,000 Lines Per Second Using Buffered Fourier Domain Mode-Locked Lasers," Optics Letters, Mar. 15, 2007, vol. 32, No. 6, pp. 626-628.

Arney, David S.J., et al., "Nanomaterials," Encyclopedia of Chemical Processing, (2006), pp. 1803-1812.

Bashtovoi, V., et al., "Capillary Ascension of Magnetic Fluids," Journal of Magnetism and Magnetic Materials, (2002), pp. 265-267.

Binks, B.P., et al., "Influence of Particle Wettability on the Type and Stability of Surfactant-Free Emulsions," Langmuir, (2000), 16:8622-8631.

Binks, Bernard P., "Particles as Surfactants-Similarities and Differences," Current Opinion in Colloid & Interface Science, (2002), 7:21-41.

Binks, Bernard P., et al., "Colloidal Particles at Liquid Interfaces: An Introduction," Colloidal Particles at Liquid Interfaces, Aug. 17, 2006, pp. 1-73.

Bourgeat-Lami, Elodie, et al., "Polymer Encapsulation of Inorganic Particles," Functional Coatings, Oct. 26, 2006, pp. 85-152.

Bresme, F., et al., "Nanoparticles at Fluid Interfaces," Journal of Physics: Condensed Matter, (2007), 19, 33 pages.

Chen, Quan, et al., "Quantitative Magnetic Resonance Imaging Methods for Core Analysis," New Techniques in Sediment Core Analysis, (2006), 267:193-207.

Dickson, Jasper L., et al., "Stabilization of Carbon Dioxide-in-Water Emulsions with Silica Nanoparticles," Langmuir, (2004), 20:7976-7983.

Gupta, A.K., et al., "Synthesis and Surface Engineering of Iron Oxide Nanoparticles for Biomedical Applications," Biomaterials, (2005), 11 pages.

Hilpert, Markus, et al., "Capillarity-Induced Resonance of Oil Blobs in Capillary Tubes and Porous Media," Geophysics, May-Jun. 2000, vol. 65, No. 3, pp. 874-883.

International Search Report and Written Opinion for PCT/US2010/057080, dated Aug. 30, 2011, 8 pages.

Ito, A., et al., "Medical Application of Functionalized Magnetic Nanoparticles," Journal of Bioscience and Bioengineering, 2005, vol. 100, Issue 1, pp. 1-11.

Joo, Chulmin, "Spectral-Domain Optical Coherence Phase Microscopy for Quantitative Phase-Contrast Imaging," Optics Letters, Aug. 15, 2005, vol. 30, No. 16, pp. 2131-2133.

Kralchevsky, P.A., et al., "On the Thermodynamics of Particle-Stabilized Emulsions: Curvature Effects and Catastrophic Phase Inversion," Langmuir, (2005), 21:50-63.

Kuranov, Roman V., et al., "Gas-Cell Referenced Swept Source Phase Sensitive Optical Coherence Tomography," IEEE Photonics Technology Letters, Oct. 15, 2010, vol. 22, No. 20, pp. 1524-1526.

Lavrova, O., et al., "Numerical Treatment of Free Surface Problems in Ferrohydrodynamics," Journal of Physics: Condensed Matter, (2006), 18:S2657-S2669.

Li, Xun, et al., "Physics of Partially Saturated Porous Media: Residual Saturation and Seismic-Wave Propagation," Annu. Rev. Earth Planet, Science, (2001), 29:419-460.

Li, Yusong, et al., "Investigation of the Transport and Deposition of Fullerene (C60) Nanoparticles in Quartz Sands Under Varying Flow Conditions," Environ. Sci. Technol., (2008), 42:7174-7180.

Lu, An-Hui, et al., "Magnetic Nanoparticles: Synthesis, Protection, Functionalization, and Application," Magnetic Nanoparticles, Angew. Chem. Int. Ed., (2007) 46:1222-1244.

Miksis, Michael J., "Effects of Contact Line Movement on the Dissipation of Waves in Partially Saturated Rocks," Journal of Geophysical Research, Jun. 10, 1988, vol. 93, No. B6, pp. 6624-6634.

Norton, Stephen J., et al., "Imaging the Distribution of Magnetic Nanoparticles with Ultrasound," IEEE Transactions on Medical Imaging, May 2007, vol. 26, No. 5, pp. 660-665.

Oh, Junghwan, et al., "Detection of Magnetic Nanoparticles in Tissue Magneto-Motive Ultrasound," Nanotechnology, (2006), 17:4183-4190.

Oldenburg, Curtis M., et al., "Numerical Simulation of Ferrofluid Flow for Subsurface Environmental Engineering Applications," Transport in Porous Media, (2000), 38:319-344.

Pierce, Mark C., et al., "Simultaneous Intensity, Birefringence, and Flow Measurements with High-Speed Fiber-Based Optical Coherence Tomography," Optics Letters, Sep. 1, 2002, vol. 27, No. 17, pp. 1534-1536.

Polevikov, Viktor, et al., "Instability of Magnetic Fluid in a Narrow Gap between Plates," Journal of Magnetism and Magnetic Materials, (2005), 289:379-381.

Pride, Steve, "Governing Equations for the Couples Electromagnetics and Acoustics of Porous Media," Physical Review B, Dec. 1, 1994, vol. 50, No. 21, pp. 15 678-15 696.

Prodanovic, Masa, "A Level Set Method for Determining Critical Curvatures for Drainage and Imbibition," SPE Paper, (2007), 45 pages.

Prodanovic, Masa, et al., "Resolving Meniscus Movement Within Rough Confining Surfaces via the Level Set Method," In Focus on Water Resource Research, (2008), 25 pages.

Prodanovic, Masa, "LSMPQS Software Manual (v. 0.5)," http://users.ices.utexas.edu/-masha/lsmpqs/index.html, May 3, 2009, 56 pages.

Prodanovic, Masa, et al., "Effects of Magnetic Field on the Motion of Multiphase Fluids Containing Paramagnetic Particles in Porous Media," SPE 124375, (2009), 1 page.

Prodanovic, Masa, et al., "Physics-Driven Interface Modeling for Drainage and Imbibition in Fractures," SPE Journal, (2009), pp. 532-542.

Qin, Xiao, et al., "Synthesis of Y2O3:Eu Phosphor Nanoparticles by Flame Spray Pyrolysis," NSTI-Nanotech, (2005), vol. 2, pp. 9-12.

Roberts, Peter M., et al., "Elastic Wave Stimulation of Oil Reservoirs: Promising EOR Technology?" The Leading Edge, May 2003, pp. 448-453.

Rodriguez, Elena, et al., "Enhanced Migration of Surface-Treated Nanoparticles in Sedimentary Rocks," SPE 124418, (2009), 1 page.

Saleh, Navid, et al., "Adsorbed Triblock Copolymers Deliver Reactive Iron Nanoparticles to the Oil/Water Interface," Nano Letters, (2005), vol. 5, No. 12, pp. 2489-2494.

Saleh, Navid, et al., "Oil-in-Water Emulsions Stabilized by Highly Charged Polyelectrolyte-Grafted Silica Nanoparticles," Langmuir, (2005), 21:9873-9878.

Sheppard, S., et al., "Magnetic Resonance Imaging Study of Complex Fluid Flow in Porous Media: Flow Patterns and Quantitative Saturation Profiling of Amphiphilic Fracturing Fluid Displacement in Sandstone Cores," Magnetic Resonance Imaging, (2003), 21:365-367.

Telenkov, Sergey A., et al., "Differential Phase Optical Coherence Probe for Depth-Resolved Detection of Photothermal Response in Tissue," Physics in Medicine and Biology, (2004), 49:111-119.

Zhang, Gigi Qian, et al., "Interpretation of Wettability in Sandstones with NMR Analysis," Petrophysics, May-Jun. 2000, vol. 41, No. 3, pp. 223-233.

Zhang, Tiantian, et al., "Foams and Emulsions Stabilized with Nanoparticles for Potential Conformance Control Applications," SPE 121744, (2009), 17 pages.

Huh, C.: "Improved Oil Recovery by Seismic Vibration: A Preliminary Assessment of Possible Mechanisms," SPE 103870 presented at First Intern. Oil. Conf. Mexico, Cancun, Mexico, Aug. 2006.

Dey, Tania, et al., "Synthesis of Polymer-coated Magnetic Nanoparticles", Proc. NSTI Nanotech, vol. 2, 13-16 (2005).

(56) References Cited

OTHER PUBLICATIONS

Hilpert, Markus: "Capillarity-induced resonance of blobs in porous media: Analytical solutions, Latice-Boltzmann modeling, and blob mobilization", J. Colloid Interface Sci., 309, 493-504 (2007).

Moridis, G. J., et al., "Theoretical and Experimental Investigations of Ferrofluids for Guiding and Detecting Liquids in the Subsurface," Mar. 1998, Lawerence Berkeley National Laboratory Report LBL-41069, Berkeley, California.

* cited by examiner

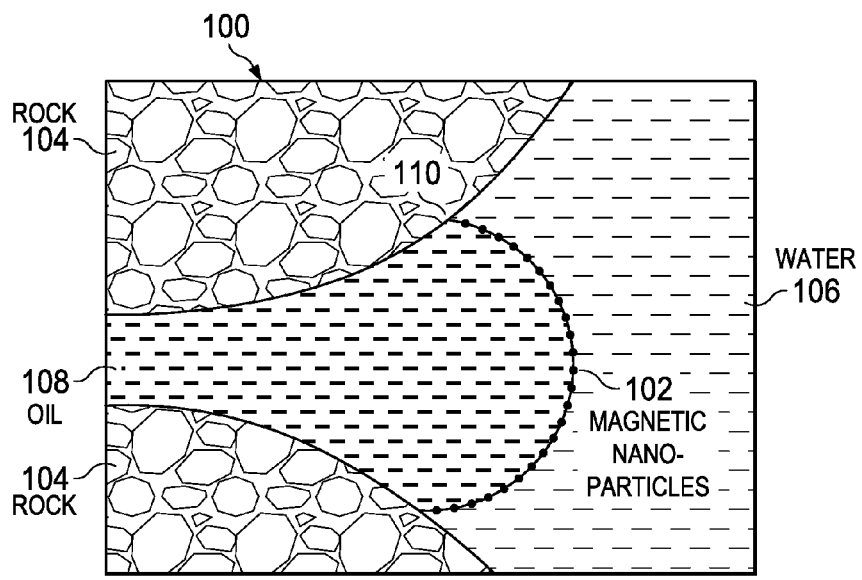
FIG. 1A
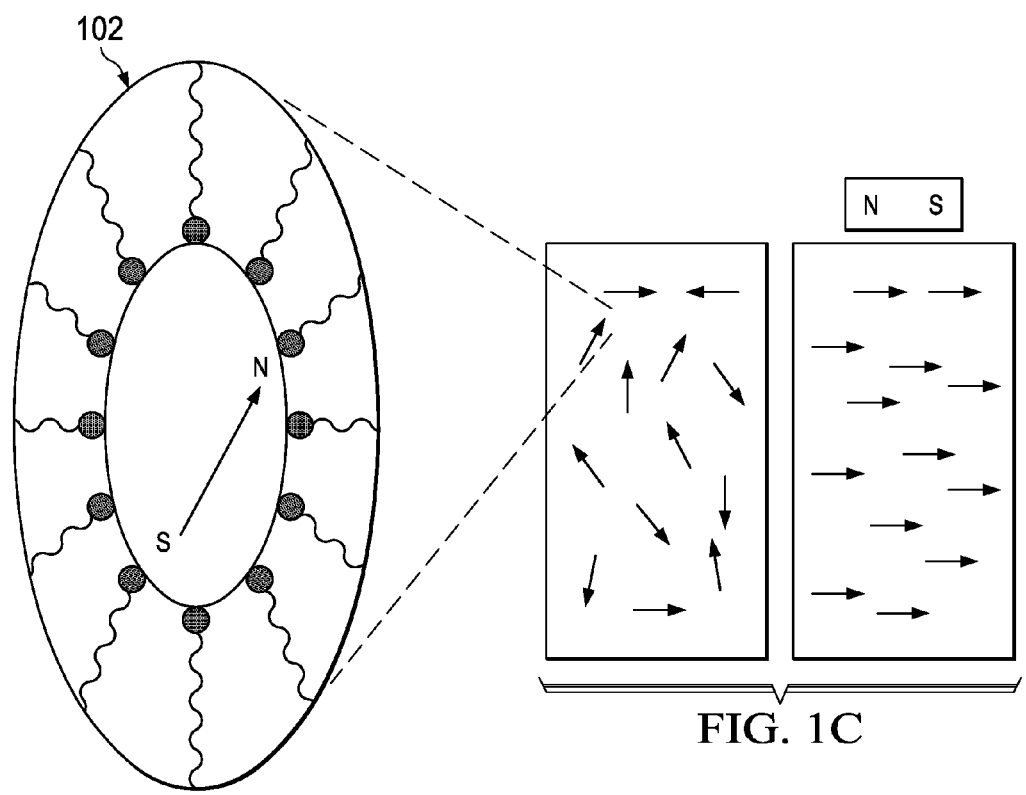
FIG. 1B
FIG. 1C

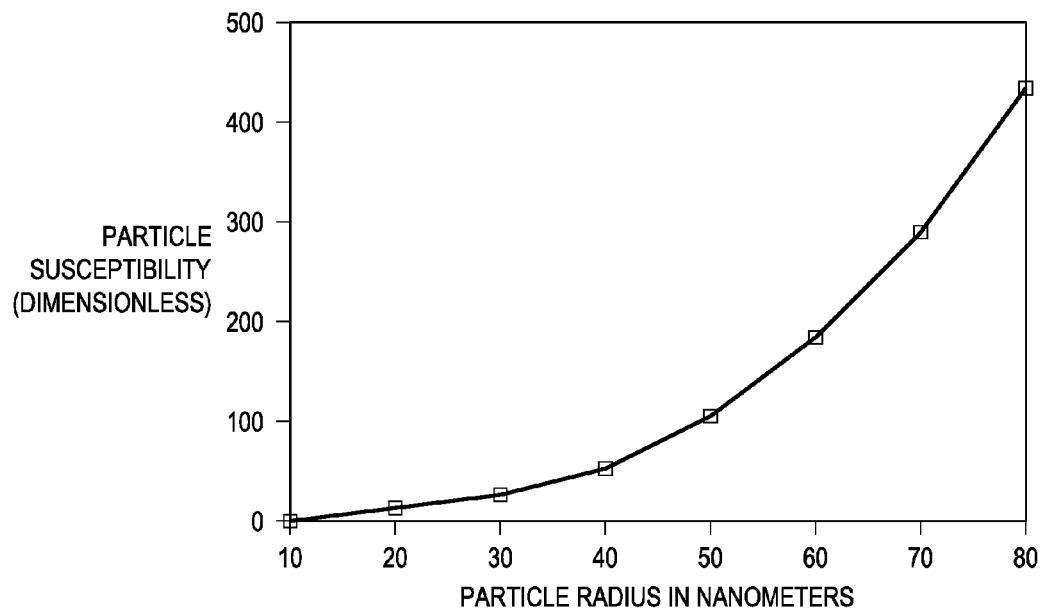
FIG. 3B
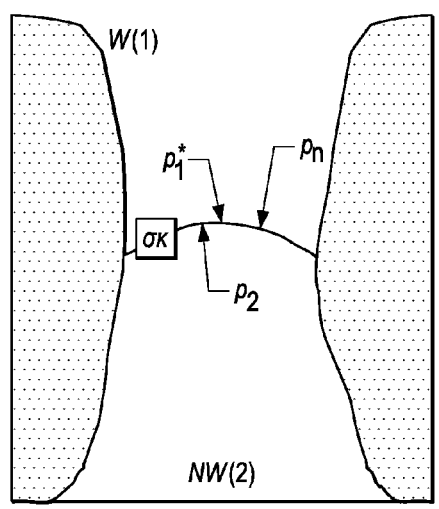 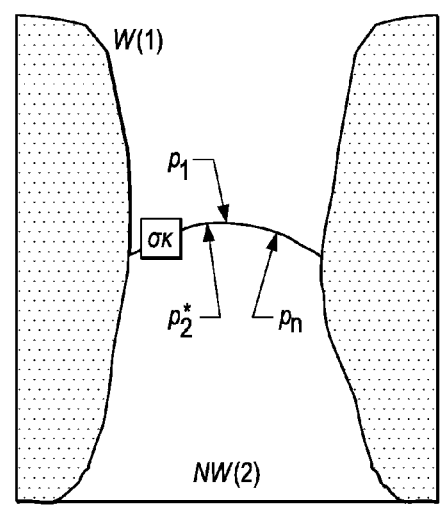
FIG. 4A          FIG. 4B

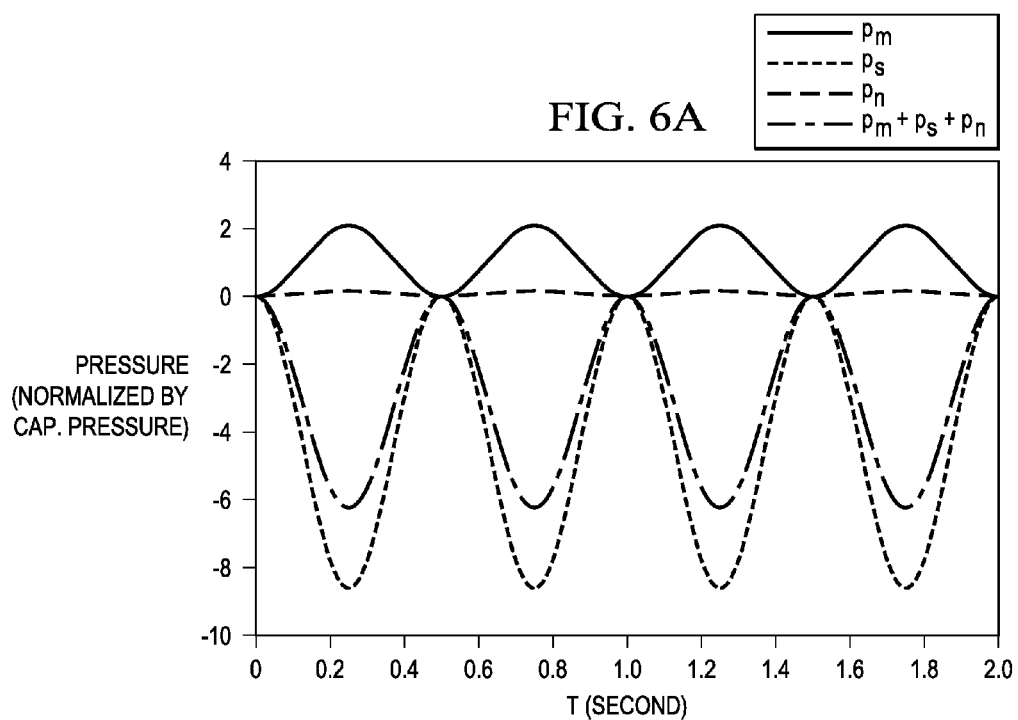
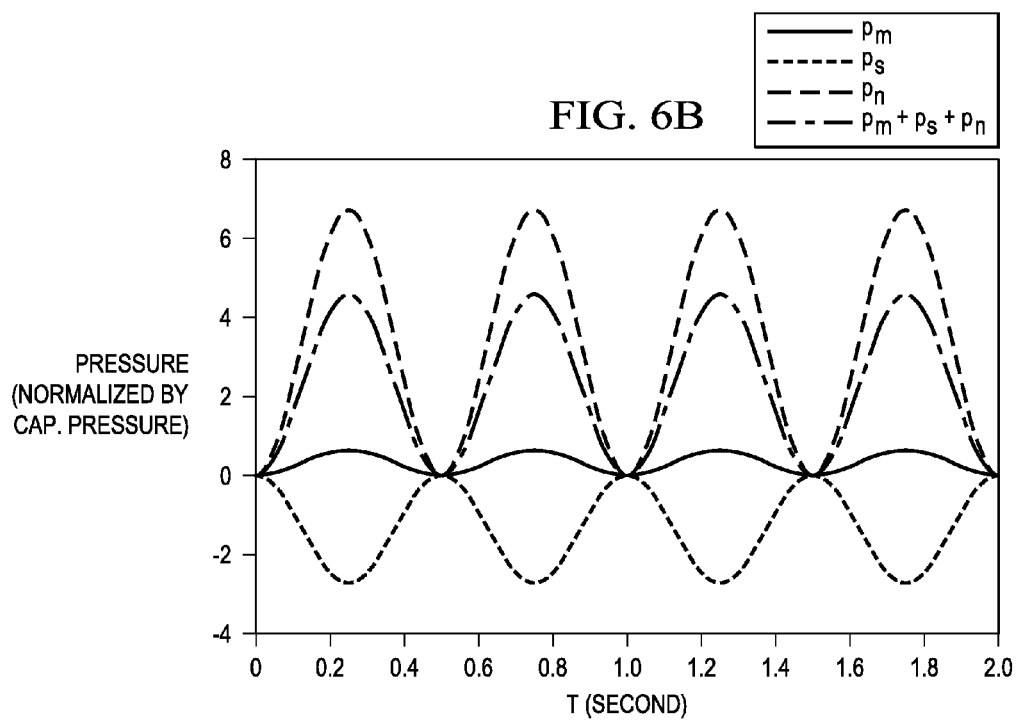

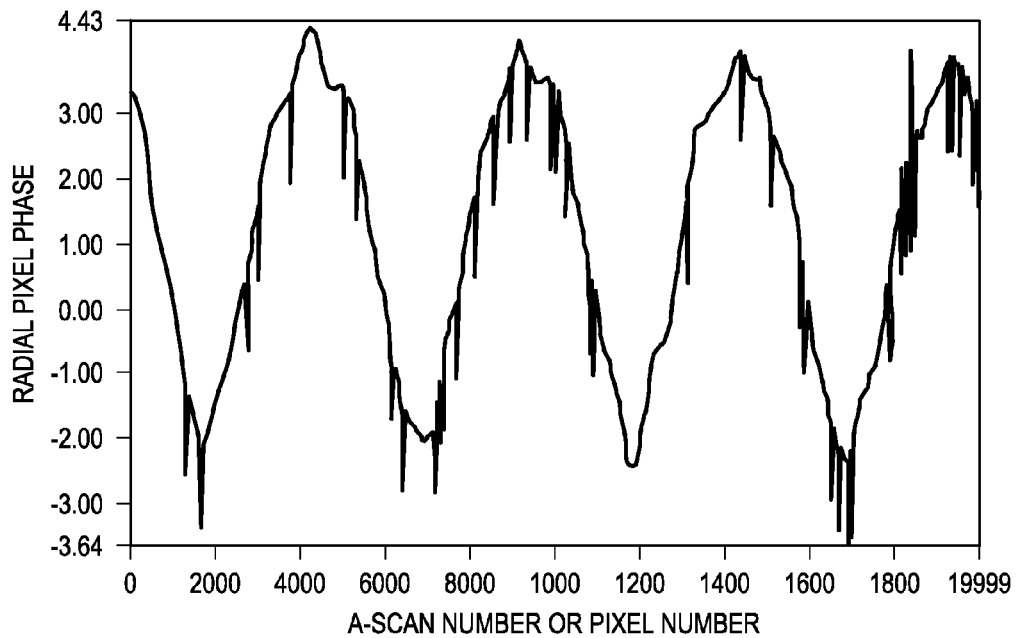
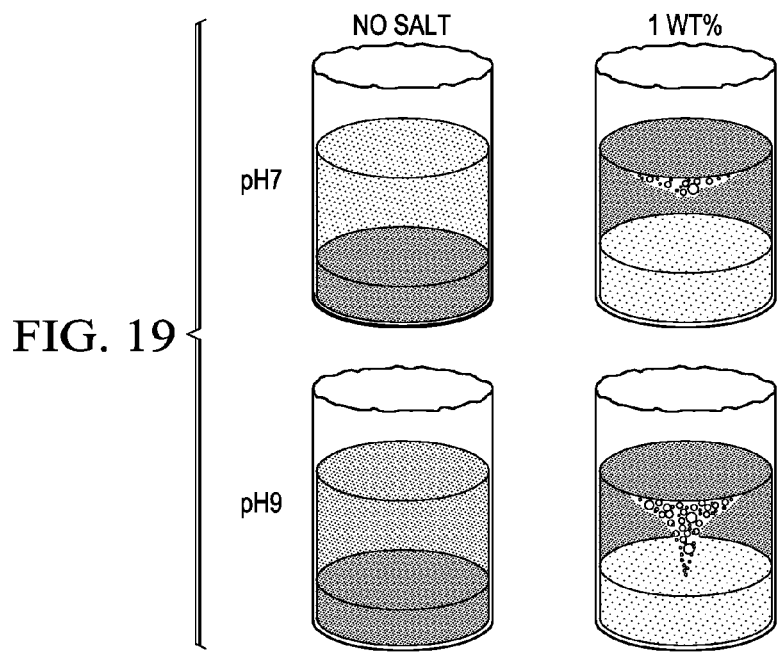

FIG. 20
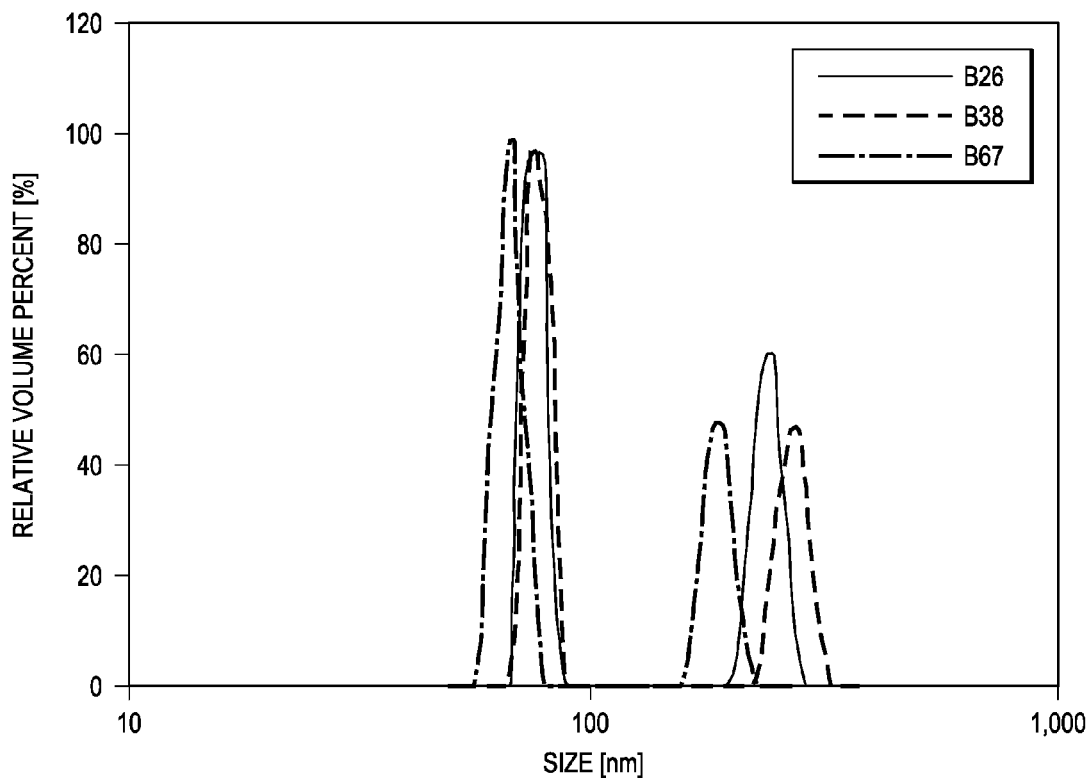
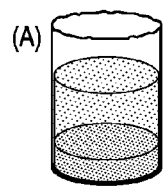
FIG. 21A
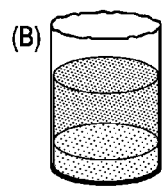
FIG. 21B
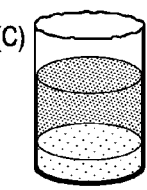
FIG. 21C
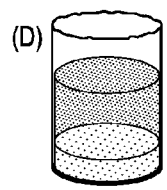
FIG. 21D
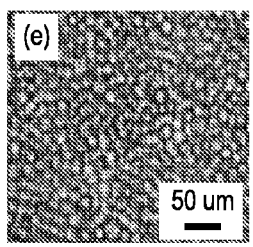
FIG. 21E
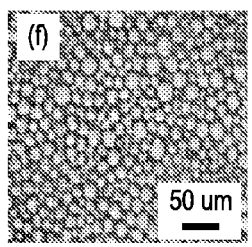
FIG. 21F
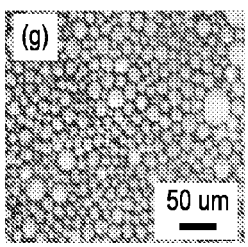
FIG. 21G
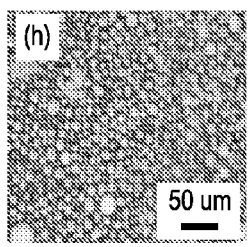
FIG. 21H

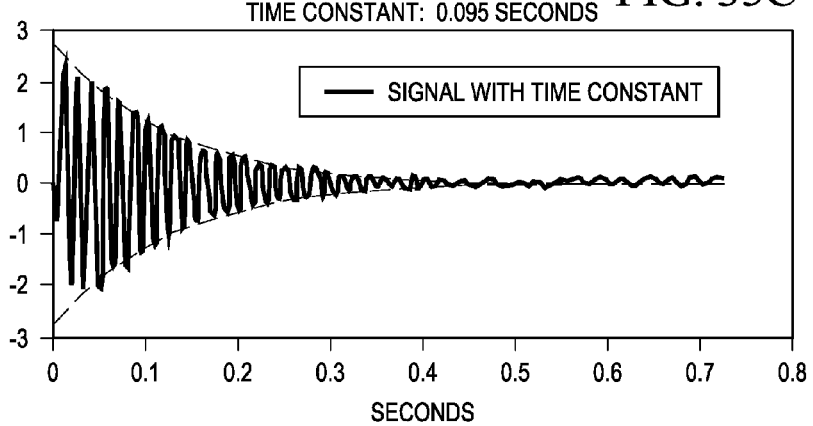
FIG. 35C
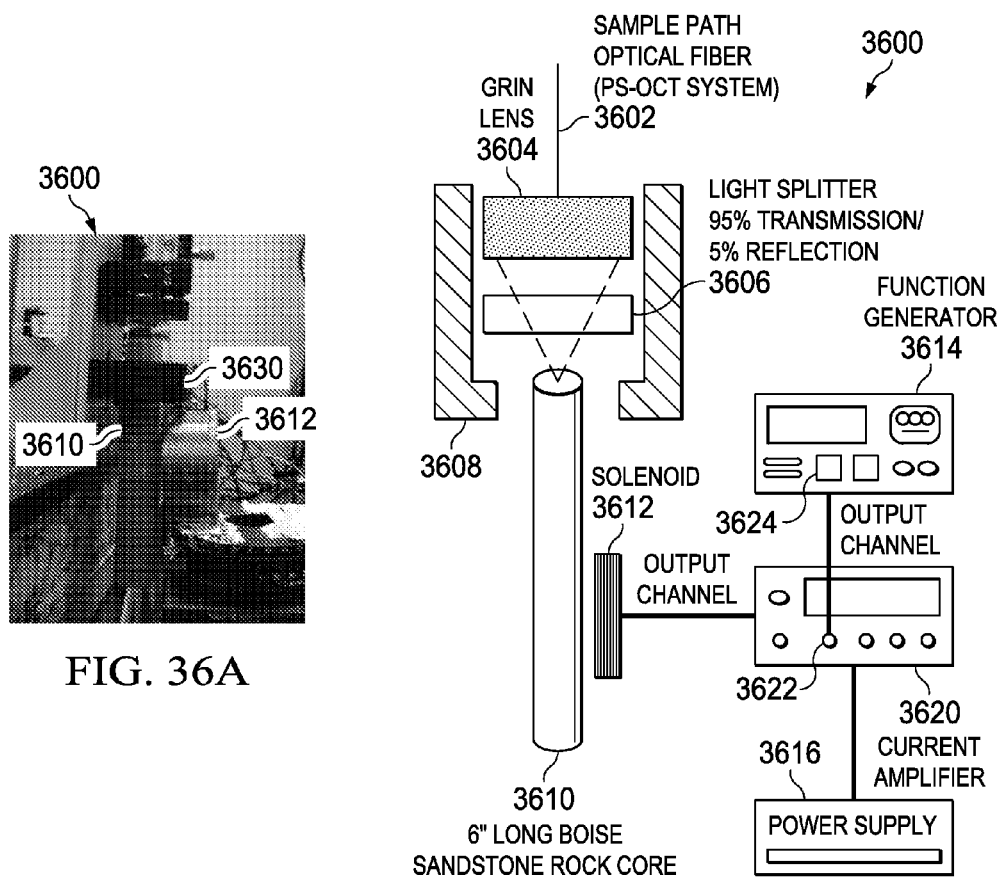
FIG. 36A
FIG. 36B

DETERMINATION OF OIL SATURATION IN RESERVOIR ROCK USING PARAMAGNETIC NANOPARTICLES AND MAGNETIC FIELD

CROSS-REFERENCE TO RELATED APPLICATIONS

This application is a National Stage of International Application No. PCT/US2010/057080, filed Nov. 17, 2010, which claims the benefit of U.S. Provisional Application No. 61/262,037, filed Nov. 17, 2009. The contents of each of which are incorporated by reference in their entirety.

TECHNICAL FIELD

The present invention relates in general to the field of oil recovery, and more particularly, to using paramagnetic nanoparticles for detecting the presence and determining the saturation of oil in subsurface formations.

BACKGROUND INFORMATION

Without limiting the scope of the invention, its background is described in connection with imaging techniques used in oil recovery.

Accurate, non-invasive determination of oil saturation distribution in laboratory cores, near-wellbore zones, and deep in the reservoir, will greatly improve understanding of oil displacement mechanisms for various enhanced oil recovery (EOR) processes, and also help identify the location of bypassed oils so that they can be subsequently recovered. Currently, the oil saturation distribution can be determined: (i) for laboratory cores, using MRI or CT-scan imaging; (ii) for near-wellbore zones, by NMR and other logging methods; and (iii) for zones deeper in the reservoir, e.g., by injection of partitioning tracers. The difficulty with the NMR logging is that its probing depth is very shallow, i.e., in centimeters. Moreover, interpretation requires knowledge of rock surface properties (wettability, relaxivity) that can be difficult to estimate independently. With the "echo" injection/production of partitioning tracers, a reliable determination of oil saturation from the tracer material balance is difficult, because it is difficult to have the detailed knowledge of the porosity-permeability distribution in the study zone.

U.S. Pat. No. 4,769,602 issued to Vinegar and Tutunjian (1988) provides a method of imaging of materials to determine petrophysical properties and measuring fluid saturations using Nuclear Magnetic Resonance (NMR) Imaging. According to the '602 patent, an earthen core sample containing multiple fluids during a coreflood experiment is located within a NMR Imaging Apparatus, so that the sample and fluids therein may be imaged. In coreflood experiments conducted for reservoir engineering applications, the three fluid phases may typically be water or a brine phase, an oil or oleic phase, and a gas phase.

U.S. Pat. No. 7,170,294 issued to Kasevich (2007) discloses the application of electromagnetic tomography for efficient recovery of oil and gas as well as the removal of unwanted liquids from subsurface formations. The Kasevich patent involves the deployment of both surface and a single borehole magnetic dipole structures used for both transmitting and receiving low frequency electromagnetic energy. Several concentric surface antenna arrays with electronic switching between each circular array and the downhole solenoid will have the ability to image the spread and movement of oil and gas during thermal treatment and provide three dimensional temperature measurement. The oil movement to recovery wells may be provided by radio frequency heating or steam flood as in enhanced oil recovery. This information allows for developing very efficient oil and fluid recovery techniques by actually observing topographic images developed according to this invention.

U.S. Patent Application No. 20090167302 (Edwards and Ladva, 2009) discloses the use of time-lapsed NMR diffusivity measurements in an observation well. The observation well is cased in the zone of interest with non-magnetic and non-conductive casing that is invisible to the NMR tool. Secondly, because NMR measurements have a dead zone in front of the antenna depending on the spatial variation of the fixed magnet strength, for example about 2.7 inches, a distance between the casing and the formation is reduced to less than the dead zone length by drilling the observation well at small deviation of about 5° and running the casing without centralizers. Both the casing and the pad-type NMR tool will follow the low side of the borehole, ensuring the measurement volume of the NMR tool is inside the formation and beyond the annulus. With the appropriate observation well completion, time-lapse diffusivity measurements with pad-type NMR tools can address several shortcomings in the current practice of monitoring EOR processes that rely upon changes in density and hydrogen index (HI). Various uses of NMR imaging in wells cased with non-metallic casing are also disclosed.

SUMMARY

Embodiments of the present invention describe a synthesis and use of custom paramagnetic nanoparticles that adsorb preferentially to the oil/water interface. Embodiments of the present invention involve injecting an aqueous dispersion of the nanoparticles into the potentially oil containing subsurface formation, and remotely detecting the presence and distribution of oil in the reservoir.

Embodiments of the present invention use oscillations of paramagnetic nanoparticles in a magnetic field for the accurate determination of oil saturation. Embodiments of the present invention include compositions and methods of detecting oil/water menisci in reservoir rock to indicate the presence of oil. By injecting paramagnetic nanoparticles that adsorb preferentially on the oil/water interface (meniscus), and by detecting the acoustic wave generated by their oscillation, their presence in the reservoir rock is deduced. The interpretation of this measurement is sensitive to the wettability but not the relaxivity of the rock grain surfaces. Independent methods are available for relating meniscus density (number per unit volume) to oil saturation and wettability.

When paramagnetic nanoparticles are adsorbed at the oil/water interface or dispersed in one of the fluid phases in reservoir rock pores and then exposed to an external magnetic field, the resultant particle movements displace the interface. Interfacial tension acts as a restoring force, leading to interfacial fluctuation and a pressure (sound) wave. The underlying physical concept of the present invention is described with the application of the theory of ferrofluids to track the motion of an oil/water interface in a cylindrical pore as typically observed in reservoir rock. Results of the theoretical studies obtained herein are consistent with the laboratory studies performed with an aqueous suspension of iron oxide nanoparticles, in which the interface motion is measured by the optical coherence tomography (OCT). The relative densities of the fluid phases (air/aqueous and dodecane/aqueous as in embodiments of the present invention) strongly affect the displacement of the interface. Application of a magnetic field introduces pressure-like terms into the equation of fluid phase motion. The problem is then restated in terms of interface motion, extending a numerical interface-tracking model based on the level-set method to account for capillarity and magnetic pressures simultaneously. The model of the present invention can be used to illustrate the motion of an interface between immiscible fluids at the pore scale when magnetic forces are imposed on the paramagnetic nanoparticles dispersed in one fluid phase.

A first step for an implementation of embodiments of the present invention is the application of a surface coating to nanoparticles such that once they contact oil in the reservoir rock, they are adsorbed at the oil/water interface. The steps involved include: (a) injection of an aqueous dispersion of paramagnetic nanoparticles into a reservoir rock that contains some oil in its pores; (b) application of a magnetic field oscillation so that the oil/water menisci at the rock pores oscillate, and thereby generate an acoustic response (a pressure wave); (c) measurement of the acoustic response with a sensitive geophone; and (d) deduction of the oil meniscus density in the rock, thereby obtaining the oil saturation distribution. Because the number density of menisci is related to the degree of disconnection of the oil phase, embodiments may also provide quantitative insights into the fraction of oil trapped as a residual phase especially if combined with another measurement such as resistivity.

The techniques of the present invention as described in various embodiments combine magnetic oscillation (enhanced with paramagnetic nanoparticles) with acoustic response measurements for the determination of the fluid saturations in the reservoir rock, with greater probing depth than MRI or NMR logging methods. Additionally, because the paramagnetic nanoparticles adsorbed at the oil/water interface will have significant influence on the molecular spins, embodiments of the present invention can provide (i) enhanced imaging of multi-phase fluids during the MRI scan of the laboratory core, in the manner of nanoparticle-enhanced medical imaging of particular human organs; and (ii) improved determination of fluid saturation distributions by NMR logging.

Embodiments of the present invention disclose a composition for detecting a presence, measuring a distribution or both of an oil or a hydrocarbon in a subsurface formation comprising one or more coated paramagnetic nanoparticles, wherein the paramagnetic nanoparticles are coated with a polymer, surfactant, or any combinations thereof adapted for downhole administration and a fluid comprising the one or more coated paramagnetic nanoparticles, wherein the fluid comprises water, hard water, brine or any combinations thereof. In an aspect of the present invention, the coated paramagnetic nanoparticles are metal oxides, comprising at least 1, 2, 3, 4, 5, 6, 7 oxides of iron, magnesium, molybdenum, lithium, cobalt, nickel or tantalum. The coated paramagnetic nanoparticles may be dispersed or suspended in the fluid.

Embodiments of the present invention include a method of coating the nanoparticles by adsorbing a thin polymer gel film or a coating material around the paramagnetic nanoparticles, wherein the thin polymer gel film or the coating material wraps around the paramagnetic nanoparticles to prevent a detachment of the coating during a transport of the nanoparticle in the subsurface formation. The detachment of the coating is prevented by chemically binding the polymer gel film or the coating material to itself or to another agent on the nanoparticle surface. The coating imparts a high salinity tolerance to the nanoparticles for monovalent and divalent salts.

In aspects of the present invention the binding of the polymer gel film or the coating material is achieved by contacting the paramagnetic nanoparticles suspended in an aqueous solution with the polymer (comprising monomers, a homopolymer, a copolymer or combinations and modifications thereof), a cross-linker, a catalyst, a first stabilizer, and a second stabilizer. Non-limiting examples of the polymers include those selected from the group consisting of polyacrylic acid (PAA), block copolymer of poly(acrylic acid)$_m$-b-poly(butyl acrylate)$_n$, random copolymer of poly(acrylic acid)$_m$-r-poly(butyl acrylate)$_n$, poly(4-styrene sulfonic acid-co-maleic acid), polyethylene glycol, styrene sulfonic acids, acrylic and methacrylic acid polymers and copolymers, polylactic acid copolymers (PLA) and polylactic glycolic acid (PLGA), vinyl sulfonic acid, vinyl benzyl trimethyl ammonium chloride, acrylamidopropyl trimethyl ammonium chloride, polyethylene oxide, polypropylene oxide, and combinations or modifications thereof, wherein m and n are the number of monomers. The cross-linker is an agent reacting with the polymer or the coating material to bind it to the particle surface. An example of a cross-linker is an alkane diamine like 1,6-hexanediamine A catalyst is used to promote the cross linking reaction, and is selected from the group consisting of carbodiimides, N-hydroxysuccinimide esters, imidoesters, maleimides, haloacetyls, pyridyl disulfides, and aryl azides. A non-limiting example of a catalyst is 1-ethyl-3-(3-dimethylamino-propyl) carbodiimide.

In a specific aspect the first stabilizer and the second stabilizer comprise low-molecular weight substances or polymeric materials. The first stabilizer is employed during a synthesis of the one or more paramagnetic nanoparticles and is selected from the group consisting of polyacrylic acid (PAA), block copolymers of poly(acrylic acid)$_m$-b-poly(butyl acrylate)$_n$, random copolymers of poly(acrylic acid)$_m$-r-poly(butyl acrylate)$_n$, poly(4-styrene sulfonic acid-co-maleic acid), polyethylene glycol, styrene sulfonic acids, acrylic and methacrylic acid polymers and copolymers, polylactic acid copolymers (PLA) and polylactic glycolic acid (PLGA), vinyl sulfonic acid, vinyl benzyl trimethyl ammonium chloride, acrylamidopropyl trimethyl ammonium chloride, polyethylene oxide, polypropylene oxide, and combinations or modifications thereof, wherein m and n are the number of monomers. The second stabilizer increases an adsorption of the one or more paramagnetic nanoparticles at an oil-water interface to provide an enhanced imaging of the oil and decreases an adsorption at the subsurface formation or a rock surface to promote the transfer of the one or more nanoparticles in the subsurface formation or a reservoir, and is selected from the group consisting of polyacrylic acid (PAA), block copolymers of poly(acrylic acid)$_m$-b-poly(butyl acrylate)$_n$, random copolymers of poly(acrylic acid)$_m$-r-poly(butyl acrylate)$_n$, poly(4-styrene sulfonic acid-co-maleic acid), polyethylene glycol, styrene sulfonic acids, acrylic and methacrylic acid polymers and copolymers, polylactic acid copolymers (PLA) and polylactic glycolic acid (PLGA), vinyl sulfonic acid, vinyl benzyl trimethyl ammonium chloride, acrylamidopropyl trimethyl ammonium chloride, polyethylene oxide, polypropylene oxide, and combinations or modifications thereof, wherein m and n are the number of monomers.

In other specific aspects the polymer is a poly(acrylic acid)m-b-poly(butyl acrylate)n block copolymer or a poly(acrylic acid)m-r-poly(butyl acrylate)n random copolymer, where m and n are the numbers of (acrylic acid) and (butyl acrylate) monomers, respectively, wherein m and n can be adjusted for improved salt tolerance and interfacial activity, or a poly(4-styrenesulfonic acid-co-maleic acid) copolymer.

In aspects of the present invention, the coated paramagnetic nanoparticles have a diameter less than 100 nm. The coated paramagnetic nanoparticles may have diameters of 1 nm, 5 nm, 10 nm, 25 nm, 40 nm, 50 nm, 60 nm, 75 nm, 90 nm, and 100 nm. The skilled artisan would understand these diameters to include 1 nm, 2 nm, 3 nm, 4 nm, 5 nm, 10 nm, 15 nm, 20 nm, 40 nm, 60 nm, 80 nm, 100 nm and incremental variations thereof, for example, 1.2 nm, 2.7 nm, 3.5 nm, 10.4 nm, 54.3 nm, 78.9 nm, and so forth.

The coated paramagnetic nanoparticles may comprise nanospheres, nanorods, nanoclusters, nanotubes, nanofibers or any combinations thereof. In an aspect of the present invention, the coated paramagnetic nanoparticles preferentially adsorb at an oil/water interface and oscillate in the presence of an externally applied magnetic field. The coated nanoparticles generate an acoustic wave on oscillation, wherein a frequency spectrum, a magnitude or a combination thereof of the acoustic wave is directly related to an oil meniscus density and saturation in the subsurface formation.

Embodiments of the present invention provide a method of determining a presence, measuring a distribution and saturation or both of an oil or a hydrocarbon or $CO_2$ in a reservoir rock or subsurface formation comprising the steps of: (i) injecting a dispersion of one or more coated paramagnetic nanoparticles into the reservoir rock or subsurface formation to adsorb the coated paramagnetic nanoparticles at an oil/water, gas/water or $CO_2$/water interface, wherein the paramagnetic nanoparticles are coated with a polymer or a surfactant or any combinations thereof and are dispersed in a fluid selected from the group consisting of water, hard water, brine, and combinations thereof; (ii) applying an external magnetic field to oscillate the coated nanoparticles adsorbed at the oil/water, gas/water or $CO_2$/water interface; (iii) measuring an acoustic response generated by the oscillation of the coated nanoparticles adsorbed at the oil/water, gas/water or $CO_2$/water interface, wherein the acoustic response is measured by a geophone, a surface acoustic wave sensor, a frequency analyzer or any combinations thereof; and (iv) determining an oil or gas or $CO_2$ meniscus density and presence in the reservoir rock or subsurface formation rock, thereby obtaining the distribution and saturation from the frequency spectrum, the magnitude or a combination thereof of the acoustic response. Embodiments of the present invention further comprise a step of determining a fraction of the oil or gas or $CO_2$ present in the rock by a measurement of a resistivity, wherein the resistivity is measured using one or more resistivity logging tools.

In embodiments of the present invention, the coated paramagnetic nanoparticles comprise a metal oxide, wherein the metal in the metal oxides comprises at least one of iron, magnesium, molybdenum, lithium, cobalt, nickel or tantalum. The coated paramagnetic nanoparticles may be dispersed or suspended in the fluid and are coated by adsorbing a thin polymer gel film around the paramagnetic nanoparticles, wherein the thin polymer gel film wraps around the paramagnetic nanoparticles to prevent a detachment of the coating during transport of the nanoparticles in the subsurface formation and promotes a high salinity tolerance to the nanoparticles for monovalent and divalent salts.

The adsorption of the thin polymer gel film or the coating material is achieved by contacting the paramagnetic nanoparticles suspended in an aqueous solution with the polymer, a cross-linker, a catalyst, a first stabilizer, and a second stabilizer. The polymers comprise monomers, a homopolymer, a copolymer or combinations and modifications thereof and are selected from the group consisting of polyacrylic acid (PAA), block copolymers of poly(acrylic acid)$_m$-b-poly(butyl acrylate)$_n$, random copolymers of poly(acrylic acid)$_m$-r-poly(butyl acrylate)$_n$, poly(4-styrene sulfonic acid-co-maleic acid), polyethylene glycol, styrene sulfonic acids, acrylic and methacrylic acid polymers and copolymers, polylactic acid copolymers (PLA) and polylactic glycolic acid (PLGA), vinyl sulfonic acid, vinyl benzyl trimethyl ammonium chloride, acrylamidopropyl trimethyl ammonium chloride, polyethylene oxide, polypropylene oxide, and combinations or modifications thereof, wherein m and n are the number of monomers. The first stabilizer and the second stabilizer used herein comprise low molecular weight substances or polymeric materials and are selected from the group consisting of polyacrylic acid (PAA), block copolymer of poly(acrylic acid)$_m$-b-poly(butyl acrylate)$_n$, random copolymer of poly(acrylic acid)$_m$-r-poly(butyl acrylate)$_n$, poly(4-styrene sulfonic acid-co-maleic acid), polyethylene glycol, styrene sulfonic acids, acrylic and methacrylic acid polymers and copolymers, polylactic acid copolymers (PLA) and polylactic glycolic acid (PLGA), vinyl sulfonic acid, vinyl benzyl trimethyl ammonium chloride, acrylamidopropyl trimethyl ammonium chloride, polyethylene oxide, polypropylene oxide, and combinations or modifications thereof, wherein m and n are the number of monomers.

In a specific aspect the polymer is a poly(acrylic acid)$_{114}$-b-poly(butyl acrylate)$_{26}$ copolymer or a poly(4-styrenesulfonic acid-co-maleic acid) copolymer. In other specific aspects, the coated paramagnetic nanoparticles have a diameter less than 100 nm. Typically, the diameters of the coated paramagnetic nanoparticle may be 1 nm, 5 nm, 10 nm, 25 nm, 40 nm, 50 nm, 60 nm, 75 nm, 90 nm, and 100 nm. In one or more aspects, the coated paramagnetic nanoparticles comprise nanospheres, nanorods, nanoclusters, nanotubes, nanofibers, or any combinations thereof. In one or more aspects, the paramagnetic nanoparticles are coated with the polymer, the surfactant, or combinations thereof. In one or more aspects, the method is used prior to or during an oil recovery operation.

Embodiments of the present invention disclose a system for determining a presence, measuring a distribution and saturation, or both of an oil or a hydrocarbon or $CO_2$ in a reservoir rock or subsurface formation comprising an injection system for delivering an aqueous dispersion of one or more coated paramagnetic nanoparticles into the reservoir rock or subsurface formation, wherein the paramagnetic nanoparticles are coated with a polymer or a surfactant, or any combinations thereof and are dispersed in a fluid comprising water, hard water, brine or any combinations thereof, an acoustic transducer connected to the injection system or a neighboring well, a power supply source, a current amplifier with one or more output channels connected to the power supply source, one or more solenoid coils that may be wrapped around a metallic core, wherein the solenoid coil is connected to a first output channel of the current amplifier coil and generates a magnetic field of a prescribed wave form when the power supply source and the current amplifier are turned on, a function generator connected to a second output channel of the current amplifier, and a geophone or a sonic wave frequency analyzer connected to the acoustic transducer, wherein the geophone or the sonic wave frequency analyzer measures a frequency spectrum, a magnitude or a combination thereof of an acoustic wave generated by an oscillation of the one or more coated paramagnetic nanoparticles. In one or more aspects, the pulsed magnetic field generated by the one or more solenoid coils exerts a force on the coated paramagnetic nanoparticles. In one or more aspects, the one or more solenoid coils are replaced with a spinning permanent magnet or an array of spinning permanent magnets to produce the magnetic field. In one or more aspects, the system as described hereinabove is used prior to or during an oil recovery operation. The nanoparticles are coated by adsorbing a coating material such as a thin polymer gel film around the paramagnetic nanoparticles by contacting the paramagnetic nanoparticles suspended in an aqueous solution with the polymer, a cross-linker, a catalyst, a first stabilizer, and a second stabilizer, wherein the coating imparts a high salinity tolerance to the nanoparticles for monovalent and divalent salts. The polymers are selected from the group consisting of polyacrylic acid (PAA), block copolymer of poly(acrylic acid)$_m$-b-poly(butyl acrylate)$_n$, random copolymer of poly(acrylic acid)$_m$-r-poly(butyl acrylate)$_n$, poly(4-styrene sulfonic acid-co-maleic acid), polyethylene glycol, styrene sulfonic acids, acrylic and methacrylic acid polymers and copolymers, polylactic acid copolymers (PLA) and polylactic glycolic acid (PLGA), vinyl sulfonic acid, vinyl benzyl trimethyl ammonium chloride, acrylamidopropyl trimethyl ammonium chloride, polyethylene oxide, polypropylene oxide, and combinations or modifications thereof, wherein m and n are the number of monomers. More specifically, the polymer is a poly(acrylic acid)$_{114}$-b-poly (butyl acrylate)$_{26}$ copolymer or a poly(4-styrenesulfonic acid-co-maleic acid) copolymer.

In an embodiment the instant invention discloses a composition comprising: (a) a plurality of coated paramagnetic nanoparticles, wherein (i) each of the coated paramagnetic nanoparticles has a coating that is a polymer, a surfactant, or a combination thereof; and (ii) the coating is operable to allow the coated paramagnetic nanoparticles to be injected into a downhole formation; and (b) a fluid in which the plurality of coated paramagnetic nanoparticles are intermixed, wherein (i) the fluid is selected from the group consisting of water, hard water, brine, and combinations thereof; and (ii) the composition is operable for detecting a presence of a hydrocarbon in a subsurface formation, measuring a distribution of the hydrocarbon in the subsurface formation, or both.

Another embodiment of the instant invention provides a method of determining a presence, measuring a distribution and saturation or both of a hydrocarbon in a subsurface formation comprising the steps of: (a) injecting a fluid comprising coated paramagnetic nanoparticles into a subsurface formation to adsorb the coated paramagnetic nanoparticles at an interface, wherein (i) the fluid is selected from the group consisting of water, hard water, brine, and combinations thereof; and (ii) the interface is selected from the group consisting of an oil/water interface, a gas/water interface, and a $CO_2$/water interface; (b) applying an external magnetic field to oscillate the coated paramagnetic nanoparticles adsorbed at the interface; (c) measuring an acoustic response parameter generated by the oscillation of the coated paramagnetic nanoparticles adsorbed at the interface, wherein the acoustic response is measured by a device selected from the group consisting of a geophone, a surface acoustic wave sensor, a frequency analyzer, and a combination thereof; and (d) determining the presence and an oil, a gas or a $CO_2$ meniscus density in the subsurface formation from the measure acoustic response parameter.

In yet another embodiment the instant invention discloses a system for determining a presence, measuring a distribution and saturation or both of a hydrocarbon or $CO_2$ in a subsurface formation comprising: (a) an injection system for delivering a fluid comprising coated paramagnetic nanoparticles into the subsurface formation, wherein the fluid is selected from the group consisting of water, hard water, brine, and a combination thereof, (b) an acoustic transducer operably connected to the injection system; (c) a power supply source; (d) a current amplifier with a plurality of output channels connected to the power supply source; (e) one or more solenoid coils that are wrapped around a metallic core, wherein the solenoid coils are connected to a first output channel of the current amplifier coil and are operable to generate a pulsed magnetic field of a prescribed wave form when the power supply source and the current amplifier are turned on; (f) a function generator connected to a second output channel of the current amplifier; and (g) a geophone or a sonic wave frequency analyzer connected to the acoustic transducer, wherein the geophone or the sonic wave frequency analyzer measures a frequency spectrum, a magnitude or a combination thereof of an acoustic wave generated by an oscillation of the one or more polymer coated paramagnetic nanoparticles.

DESCRIPTION OF THE DRAWINGS

For a more complete understanding of the features and advantages of the present invention, reference is now made to the detailed description of the invention along with the accompanying figures and in which:

FIG. 1A shows paramagnetic nanoparticles in accordance with embodiments of the present invention readily adhering to the oil/water interface when injected into a reservoir rock.

FIG. 1B shows a schematic of nanoparticles with a paramagnetic core and coated with adsorbed dispersant molecules with no external magnetic field applied. Magnetic core radius is typically about 80% of the particle radius.

FIG. 1C shows the nanoparticles of FIG. 1B oriented in presence of an external magnetic field.

FIG. 3B is an example susceptibility χ curve for the spherical magnetite ($Fe_3O_4$) particles of different radii of FIG. 3A.

FIG. 4A is a schematic showing pressures acting on an interface between fluid 1 (magnetized, wetting) and fluid 2 (non-wetting, non-magnetic). Note that $p_c=p_2-p_1$ (thermodynamic pressures), and $p_1^*=p_1+p_s+p_m$ is a composite pressure for the magnetized fluid, and $p_n=\mu_0 \ast M_n^2/2$ is a magnetic normal pressure.

FIG. 4B is similar to FIG. 4A except that the non-wetting fluid is now magnetized and the wetting fluid is not. Thus, $p_2^*=p_2+p_s+p_m$ is now the composite pressure, and the magnetic normal pressure acts from the non-wetting fluid.

(FIG. 5A) nanoparticles of susceptibility 0.2, (FIG. 5B) nanoparticles of susceptibility 20.

FIGS. 6A and 6B show a similar situation as FIGS. 5A and 5B except that the magnetized air is replaced by dodecane. Capillary pressure value is 64 Pa. The density of dodecane is comparable to that of water, and thus the magnitudes of $p_m$ and $p_s$ terms differ. Moreover, the magnitudes of all the magnetic terms depend on particle susceptibility. Consequently, the total magnetic pressure can be positive or negative: (FIG. 6A) nanoparticles of susceptibility 0.2, (FIG. 6B) nanoparticles of susceptibility 20.

(FIG. 11A) only magnetic normal pressure component present (position dependent), (FIG. 11B) only volumetric magnetic pressure components present (constant along the interface for a fixed time).

FIG. 18 is a similar study as shown in FIG. 17 with air instead of dodecane, showing a peak-to-valley displacement of only 500 nm, about ten times smaller than the dodecane/water interface displacement.

FIG. 19 shows dodecane in water emulsions stabilized by iron oxide nanoparticles coated with cross-linked PAA molecules. To form the emulsions, 0.05 wt % nanoparticle dispersions were used at pH 7 and pH 9 without added salt and with 1 wt % salinity. The photographs were taken 20 minutes after the emulsions formation.

FIG. 20 shows volume fraction based distributions of poly(acrylic acid)114-b-poly(butyl acrylate)B coated iron oxide nanoclusters.

FIGS. 21A-21D show emulsion images of poly(acrylic acid)114-b-poly(butyl acrylate)26 at pH 8 with: no salt (FIG. 21A), 1 wt % salt (FIG. 21B), 2 wt % salt (FIG. 21C), and 3 wt % salt (FIG. 21D).

FIGS. 21E-21H show microscopic emulsion droplet images of Poly(acrylic acid)114-b-Poly(butyl acrylate)26 at pH 8 with: no salt (FIG. 21E), 1 wt % salt (FIG. 21F), 2 wt % salt (FIG. 21G), and 3 wt % salt (FIG. 21H).

FIGS. 35A-35C show a rock displacement signal from a sandpack sample wetted with: 1.0 wt % solution (FIG. 35A), emulsion (FIG. 35B), and 0.5 wt % solution (FIG. 35C) in response to a magnetic pulse.

FIGS. 36A and 36B show a photograph (FIG. 36A) and a schematic diagram of an experimental setup (FIG. 36B) for a rock displacement measurement by PS-OCT.

DETAILED DESCRIPTION

Figure 2A:
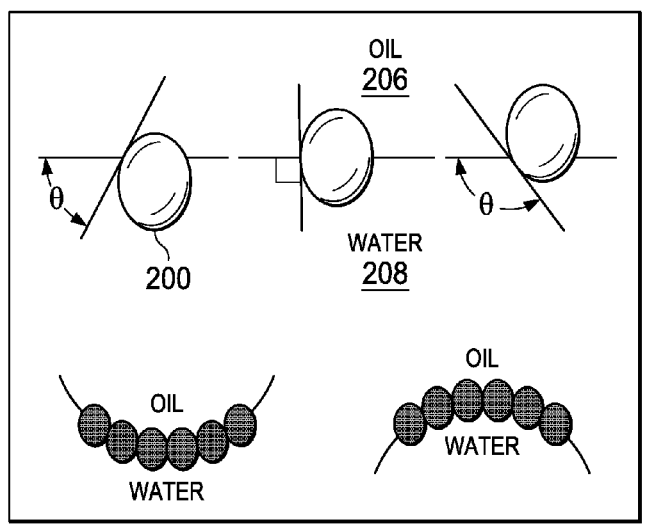
FIG. 2A shows the nanoparticles attached to the water-oil (aqueous-nonaqueous) interface. Depending on the contact angle, θ, that the nanoparticles assume with the interface, the curvature of the interface may vary.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "nanoparticles" as used herein refers to the size distribution of the particles constituting the corresponding material that includes particles of nanometer scale in size. Typically, "nanoparticles" have an average diameter of 1 μm or less, preferably from 10 to 500 nm, and more preferably from 10 to 100 nm. While the term "diameter" is used herein to describe suitable particle sizes, it should be understood that nanoparticle materials suitable for use in the present invention need not be substantially spherical in shape.

The term "paramagnetic" as used herein refers to a substance that is generally nonmagnetic under normal circumstances. However, when placed under a magnetic field, the substance possesses magnetization in direct proportion to the strength of the field.

The term "downhole" as used herein refers to a direction farther from the earth's surface measured along the path of the wellbore. "Downhole" composition refers to compositions ready to be fed down an oil well, in other words the composition comprises all components that it will contain as it is fed down the oil well and that it is at the desired temperature and pressure at which it will be fed down the oil well.

The term "polymer" refers to thermoplastic, synthetic, organic polymeric material, and includes, but is not limited to, homopolymers, copolymers, terpolymers and the like, and combinations of any two or more thereof. A "monomer" is an atom or a small molecule that may bind chemically to other "monomers" to form a polymer. The term "homopolymer" is used to indicate a polymer in which all of the monomer units are identical. A "heteropolymer or copolymer" is a polymer derived from two (or more) monomeric species.

The term "acoustic wave" as used herein refers to a wave that is transmitted through a solid, liquid, and/or gaseous material as a result of the mechanical vibrations of the particles forming the material. The normal mode of wave propagation is longitudinal (i.e., the averaged direction of motion of the particles is parallel to the direction of wave propagation), the wave therefore consists of compressions and rarefactions of the material.

The term "oscillation" as used herein refers to a reciprocating or a to and fro movement rhythmically about a mean position, or a dithering or a perturbation in a random or semi-random manner but so that the time-averaged position is a selected or desired position.

Described herein is a method for accurate determination of oil saturation in subsurface formations using electromagnetic imaging with paramagnetic nanoparticles. Embodiments of the present invention detect the oil/water menisci in reservoir rock, which indicates presence of oil. By injecting paramagnetic nanoparticles that adsorb preferentially on the oil/water interface (meniscus), and by detecting the acoustic wave generated by their oscillation, their presence in the reservoir rock is deduced.

The penetration depth for the detection of oil distribution in the reservoir rock is currently very limited. Embodiments of the present invention increase the probing depth for the measurement of oil distribution more than the currently used MRI or NMR methods. Embodiments of the present invention remotely detect the spatial distribution of oil saturation in the reservoir rock pores. In addition to improved detection by injecting an image-enhancing agent into the subsurface rock formation, the properties of the oil reservoirs can be measured more accurately and reliably. Embodiments of the present invention may be also employed to detect the presence and distribution of (i) gas or (ii) $CO_2$ that had been sequestered earlier in the subsurface formations.

Embodiments of the present invention have many first of its kind features that are absent in the prior art. The injection of paramagnetic nanoparticles into the subsurface formation for the purpose of enhanced imaging of the distribution of oil in the reservoir is novel and no such attempts have been made before. Also, embodiments of the present invention permit a chemical coating on a surface of nanoparticles to be designed in a way such that the nanoparticles do not adsorb on the rock pore walls, but preferentially adsorb on the oil/water interfaces. Detection of the oscillation responses of the nanoparticles on the oil/water interfaces in the reservoir rock by applying magnetic field has not been made or described before.

Accurate, non-invasive determination of oil saturation distribution in the reservoir will greatly improve understanding of oil displacement mechanisms for various enhanced oil recovery (EOR) processes, and also helps to identify the location of bypassed oils so that they can be subsequently recovered. With current methods of oil saturation determination, such as the NMR logging and the injection of partitioning tracers, it is difficult to obtain reliable information for a large volume of the reservoir. For example, the probing depth of NMR logging is very shallow, i.e., in centimeters. With the "echo" injection/production of partitioning tracers, a reliable determination of oil saturation from the tracer material balance is difficult, because detailed knowledge of the porosity-permeability distribution in the study zone that is required for proper interpretation of the tracer flow is usually not available. Recognizing that the detection of the oil/water menisci in reservoir rock means presence of oil, and borrowing from the idea of enhancing magnetic resonance imaging (MRI) with use of paramagnetic nanoparticles, embodiments of the present invention detail the use of such particles for accurate determination of oil saturation in reservoir rock.

Super-paramagnetic nanoparticles are currently being used to enhance MRI of targeted human body parts (Oh et al. 2006). The coating of the particles is designed to attach to specific human tissue. In subsurface pore spaces, the coexistence of multiple fluid phases implies presence of, for instance, water-oil interfaces. If one of the phases contains paramagnetic particles, the interface (also in contact with the solid) can show an elastic response (and even resonance) when exposed to an oscillating external magnetic field. The present inventors tested and validated this concept of detecting the acoustic response, which may lead to the development of a novel method of determining the hydrocarbon saturation distribution in subsurface formations. This is akin to measurements of seismic response to an imposed electromagnetic field earlier proposed as a hydrocarbon detection technique. The latter relies on the dielectric difference between the oil and water phase (Pride, 1994; Thompson and Gist, 1999), whereas embodiments of the present invention relies on the presence of paramagnetic nanoparticles, which may be introduced by injection from wellbores.

Referring to FIG. 1A, a consideration for a method of oil saturation determination 100 in accordance with embodiments of the present invention is that when nanoparticles 102 are injected into a reservoir rock 104 and contact oil 108, they readily adhere to the oil/water interface 110, but do not adhere to the pore wall. Making a colloidal particle readily adhere to an interface between oil and water of given compositions has been an active research subject because emulsions/foams stabilized with colloidal particles ("Pickering" emulsions) are widely used, though not in the oil industry (Binks 2002; Binks and Lumdson 2000). During the last 10 years or so, making nanoparticles stay at the immiscible fluid/liquid interface, and their characterization, has been studied extensively (Dickson et al. 2004; Binks and Horozov 2006; Arney et al. 2006; Adkins et al. 2008).

A factor that allows use of functional nanoparticles for applications in oil exploration and production is their small size, so that they can be transported with ease in the reservoir rock, unlike the colloidal particles that are generally filtered within a short distance from injection. The transport of dilute aqueous dispersions of nanoparticles in porous media is an area of active research by the present inventors (Rodriguez et al. 2009) and others (Li et al. 2007).

Adhesion of a nanoparticle 200 at an interface generally requires the coating of the nanoparticle surface with a polymer or surfactant, so that the contact angle ($\theta$) made by the oil/water interface on the nanoparticle surface is close to $\theta=90°$ (208), as shown in FIG. 2A. If $\theta>90°$, and the interface is densely populated by the nanoparticles, the interface is curved toward the water phase and a water-in-oil (or water-in-$CO_2$) emulsion is formed. If $\theta<90°$, the interface is curved toward the oil phase (Binks 2002; Kralchevsky et al. 2005). The free energy of adhesion for a nanoparticle at the interface is given by:

$$\Delta G_{ad} = \pi \alpha^2 \gamma_{ow} (1-|\cos\theta|)^2 \quad \text{(A)}$$

where $\alpha$ is particle radius; and $\gamma_{ow}$ is the interfacial tension.

The above adhesion energy is quite large (Binks 2002; Binks and Horozov 2006), which is the cause for the unusually long-term stability of solid-stabilized emulsions, compared to the surfactant-stabilized emulsions. This also brings out an advantage of using nanoparticles in embodiments of the present invention, i.e., even when the nanoparticles in the bulk water phase are flushed out after the initial injection, those adsorbed at the oil/water interface remain there without being desorbed.

Figure 2B:
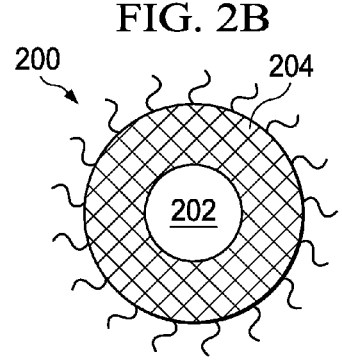
FIG. 2B is a schematic of a nanoparticle with a metal oxide core and a polymer shell which renders a desired contact angle and a dispersion stability in water.

A variety of methods of coating nanoparticles or creating a shell 204 to a nanoparticle core 202 (FIG. 2B), have been reported in the literature (Bourgeat-Lami and Duguet 2006). For example, to create a stable super-critical $CO_2$-in-water emulsion, the inventors prepared silica particles of varying surface wettability by reacting the strongly hydrophilic silica with dichlorodimethylsilane to reduce the surface density of silanol groups (Dickson et al. 2004). To create a stable water-in-$CO_2$ emulsion, the inventors were able to form, around a hydrophilic colloidal or fumed silica core, a shell of cross-linked trifunctional agent, (heptadecafluoro-1,1,2,2-tetrahydrodecyl) triethyoxysilane, to render the particles $CO_2$-philicity (Adkins et al. 2008). Dey and O'Connor (2004) employed the atom transfer radical polymerization (ATRP) method to create a polystyrene coating around a magnetic nanoparticle. Saleh et al. (2005) created highly charged surface by sulfonation of the ATRP-prepared polystyrene coating to silica core.

A probe used in embodiments of the present invention is a suspension of nanosize (<100 nm) particles typically coated with a molecular layer of a dispersant and suspended in a liquid carrier (see FIG. 1B). Unlike in magneto- or electro-hydrodynamics, the body force acting on the fluid is due to magnetic polarization of the particles only. Further, the present inventors considered paramagnetic particles which align themselves parallel to the applied magnetic field and do not retain magnetic moment after the field is removed (so called soft magnetic materials, see FIG. 1C) in contrast to permanent magnets (so called hard magnetic materials).

Ferrofluids applications range from a large number of engineering devices to tracers of blood flow in medical diagnostics: major breakthroughs happened in the 1970s and 1980s (Rosensweig, 1997). Subsurface applications were explored more recently (Moridis et al. 1998, Oldenburg et al. 2000), in particular to guide the ferrofluid through a porous formation by exposing it to a strong magnetic field.

The particle size (two orders of magnitude less than the colloidal particles) enables suitably surface-coated nanoparticles to flow through the reservoir rocks without retention in pore throats, even at very large particle concentrations (Rodriguez et al. 2009). Particle coating is a matter of design to ensure the dispersability of the nanoparticles and also to avoid adsorption on (charged) rock surfaces. Further, a coating can be designed to make particles prefer either the aqueous or non-aqueous phase, or the non-aqueous/aqueous interfaces. In the latter case, particles require high energy to adsorb at the interfaces and once adsorbed, they will not detach easily (FIG. 2A) and will consequently form a monolayer at the interface (for comprehensive review, see Bresme and Oettel, 2007). The application of nanoparticles at the interface in stabilizing emulsions, and a study parallel to the present invention is available in Zhang et al. (2009).

A foundation of a theoretical treatment of an application of embodiments of the present invention comprises adding magnetic forces to the Navier-Stokes equation and developing stress tensors accordingly. Rosensweig (1997) expounds this theory, and Lavrova et al. (2006) provide a recent numerical treatment of a free surface application. They classified the equation sets required for numerical simulation of the interface motion and studied the interactions among Maxwell, Young-Laplace and Navier-Stokes equations for some of classical problems in ferrohydrodynamics and applied their numerical scheme to them. Bashtovoi et al. (2002) studied the equilibrium of a magnetic fluid column inside a cylindrical capillary in the presence of a uniform external magnetic field. They found that the total pressure drop in the fluid decreases in magnetic fields longitudinal and transverse to the axis of the capillary tube. Polevikov and Tobiska (2004) extended this and studied the instability of a layer of magnetic fluid in a plane capillary in the presence of a uniform external magnetic field. They found two different types of instability with increasing magnetic field.

Embodiments of the present invention are interested in subsurface applications of ferrofluids, with particular attention to hydrocarbon/water interfaces. Having the magnetizable fluid guided through the subsurface in mind, Oldenburg et al. (2000) added the magnetic force to the pressure gradient and gravitational body force terms in Darcy's Law and calculated the resulting transport of the ferrofluid. Calculating the magnetic field strength H in a general medium with variable magnetic permeability (such as any porous medium), the resulting magnetization of the ferrofluid M, and the gradient of the field strength (required for the magnetic force term) are non-trivial tasks. On the related subject of the oscillation of the fluid/fluid interfaces held in rock pores in response to an imposed seismic vibration, a detailed literature review is given by Huh (2006). Hilpert (2007) and others examined the resonance exhibited by oil blob interfaces when exposed to an oscillating external body force. As shown below, however, the forcing resulting from a magnetic field has somewhat different (and more involved) physics.

The present disclosure includes a basic exposition of the theory applying for the aqueous dispersion of paramagnetic nanoparticles, and derives the relevant equations for the particular application of modeling the interfacial movements in response to the imposed magnetic field. Specific examples of the interfacial displacements, obtained from analytical solutions, are then given to provide insight on the interpretation of the laboratory measurements. The numerical modeling of interfacial oscillations in complex pore geometry is also described with some simple example results. The phase-sensitive optical coherence tomography (PS-OCT) set-up that directly measures the displacement of a fluid/fluid interface in response to the imposed magnetic field is also described.

From the modeling standpoint, the present inventors recognize three steps: oil-water interface modeling, exposing the interface to magnetic field (assuming paramagnetic particles were injected), and measuring the sound wave in response to the interface movement (oscillation). The first two steps are described herein.

If nanosize paramagnetic particles are suspended in a fluid, they will not show magnetic properties until an external magnetic field is applied (FIG. 1C). When the field is applied, the tendency of the dipole moments to align with the field is partially overcome by thermal agitation. As the field strength is increased, the particles become more and more aligned, and at some point the magnetization achieves the saturation value (i.e., all particles are aligned as depicted in FIG. 1C).

Figure 3A:
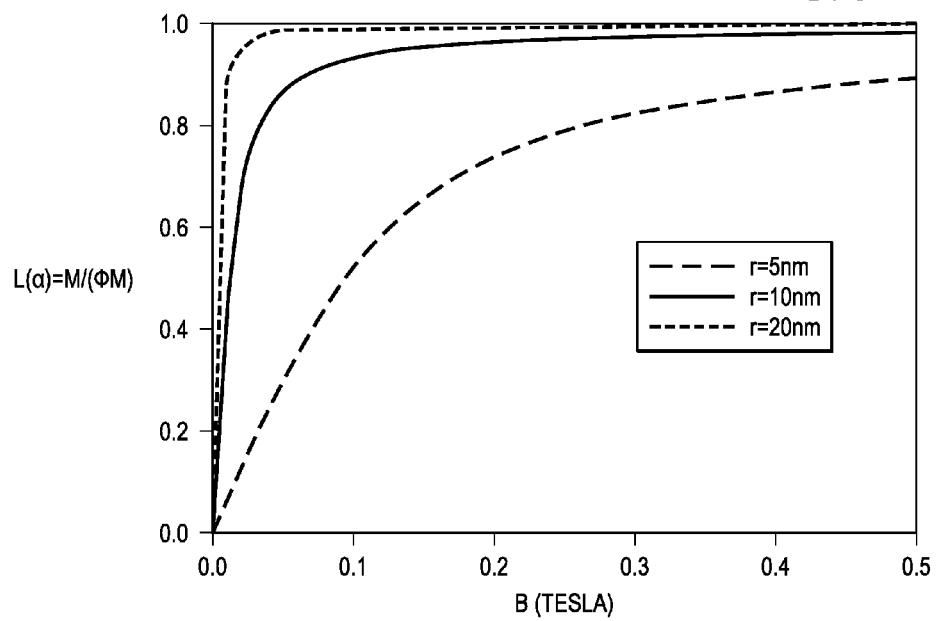
FIG. 3A is an example magnetization curve for spherical magnetite ($Fe_3O_4$) particles of different radii assuming bulk magnetization $M_d=4.46\cdot 10^5$ $Am^{-1}$, volume fraction $\phi=0.01$ in ferrofluid (mass fraction approximately 0.05) and temperature T=300 K. Particle radius refers to the magnetic core radius.

The classical Langevin theory gives the relationship between the magnetization of the ferrofluid, the applied magnetic field (of magnitude H), and the magnetization of the bulk solid material from which the nanoparticles are made, via the Langevin function, L:

$$\frac{M}{\phi M_d} = \coth(\alpha) - \frac{1}{\alpha} = L(\alpha) \tag{1}$$

where $$\alpha = \frac{mH}{kT}$$

is a ratio of magnetic and thermal energies for a single particle, $k=1.3807 \cdot 10^{-23}$ JK$^{-1}$ is Boltzmann's constant and T is temperature. For small $\alpha$ (soft magnetic materials) the relationship is approximately linear, $L(\alpha) \approx \alpha/3$. This equation is not only important in ferrofluids, but is also used to determine the particle size of a magnetic solid dispersed in a support material (e.g., iron in a piece of rock). An example magnetization curve is shown in FIG. 3A. The review paper by Gupta and Gupta (2005) provides more details on magnetization properties of nanoparticles.

The relationship between the magnetic induction field $\vec{B}$, magnetic field strength $\vec{H}$, and magnetization is given by $\vec{B} = \mu_0(\vec{M}+\vec{H})$, i.e., the resulting magnetic induction is a sum of the induction due to the impressed magnetic field strength and that of the magnetized material itself (the proportionality constant $\mu_0 = 4\pi \cdot 10^{-7}$ Hm$^{-1}$ is the permeability of the vacuum). For soft magnetic materials and the magnetic fields of moderate strength, $\vec{M}$ and $\vec{H}$ are co-linear, $\vec{M} = \chi \vec{H}$. The proportionality constant $\chi$ is dimensionless and is called magnetic susceptibility; see FIG. 3B for an example calculation of how susceptibility changes with the particle size. In this case:

$$\vec{B} = \mu_0(\vec{M}+\vec{H}) = \mu_0(\chi \vec{M}+\vec{H}) = \mu \vec{H} \tag{2}$$

In applications described herein, there is no free electric charge flow, thus the Maxwell equations reduce to the second Gauss Law:

$$\nabla \cdot \vec{B} = 0 \tag{3}$$

and the form of Ampere's law when there is no electric current flow:

$$\nabla \times \vec{H} = 0 \tag{4}$$

In other words, the magnetic induction field is divergence free (akin to the velocity of an incompressible fluid), and the magnetic field is vorticity free. At the boundary of two materials with different magnetic properties, this results in the continuity of the normal component of magnetic induction, and of the tangential component of magnetic field:

$$\vec{n} \cdot (\vec{B}_1 - \vec{B}_2) = 0 \quad (5)$$

$$\vec{n} \times (\vec{H}_1 - \vec{H}_2) = 0 \quad (6)$$

Equation of Ferrofluid Motion: Embodiments of the present invention consider oscillations of the fluid-fluid interface around an equilibrium position (average fluid velocity=zero) rather than solutions to the equations of motion of bulk fluids with nonzero average velocity. Though a focus is on the balance between capillary and magnetic forces, it is convenient to cast this problem as the boundary (interface) conditions of the equations of bulk multi-phase fluid motion.

Because the particles are paramagnetic and are dispersed in the bulk fluid, a magnetic force acts on an element of magnetizable fluid like a combination of thermodynamic pressure (normal to the surface of the fluid volume in question) and a volumetric force analogous to that of gravity. While the calculation of the force can be rather complex, it can nevertheless be formulated as a gradient of a magnetic stress tensor.

Equation of Motion for Non-Magnetized Fluid: The Navier-Stokes equation for two phase flow of incompressible fluids of constant viscosity:

$$\rho \frac{D\vec{v}}{Dt} = -\nabla p + \eta \nabla^2 \vec{v} + \rho \vec{g} \quad (7)$$

where the notation is standard: $\rho$, $\eta$ are density and viscosity (both discontinuous at the fluid-fluid interface), p is thermodynamic pressure, $$\vec{v}, \frac{D\vec{v}}{Dt}$$

velocity and its material derivative and $\vec{g}$ gravitational acceleration. The terms of the right hand side constitute a force density $\vec{f}$, which is the sum of the pressure, viscous and gravity forces. The effect of the pressure and viscous forces on a volume of fluid can be viewed as force acting normal to the surface of the volume. Introducing the stress tensor notation, the pressure and viscous tensor is given by the formula:

$$T = -\nabla p I + \eta (\nabla \vec{v} + \nabla \vec{v}^T) \quad (8)$$

The total force on a volume V of fluid (whose surface is S) is given by $\vec{F} = \int_S \vec{n} \cdot T dS = \int_V \nabla \cdot T dV$ and the force density is then $\vec{f} = \nabla \cdot T$.

Fluid-Fluid Boundary Conditions for Non-Magnetized Fluids: Boundary conditions for the interface between the (immiscible) fluids are modeled using the Young-Laplace equation. According to the Young-Laplace equation, the interface at equilibrium supports a pressure difference (so called capillary pressure $p_c$). It does so by adopting a curved surface whose curvature $\kappa$ satisfies:

$$p_c = p_{nw} - p_w = \sigma \kappa \quad (9)$$

Equation of Motion for Magnetized Fluid: Similar to pressure and viscous stress tensors, one can derive a magnetic stress tensor. The derivation is rather lengthy (Rosensweig, 1997) and the magnetic stress tensor in its most general form is given as:

$$T'_m = -p(\rho, T)I - \underbrace{\left\{ \int_0^H \mu_0 \left( \frac{\partial (vM)}{\partial v} \right)_{H,T} dH + \frac{1}{2} \mu_0 H^2 \right\} I + \vec{B}\vec{H}}_{T_m} \quad (10)$$

Here $$v = \frac{1}{\rho}$$

is convenient to include the thermodynamic pressure p in this tensor. This motivates the definition of composite pressure:

$$p^* = p(\rho, T) + \underbrace{\mu_0 \int_0^H v \left( \frac{\partial M}{\partial v} \right)_{H,T} dH}_{p_s} + \underbrace{\mu_0 \int_0^H M \, dH}_{p_m}. \quad (11)$$

$p_s$ and $P_m$ are called magnetostrictive and fluid-magnetic pressure, respectively. Further, magnetic force (that excludes the thermodynamic pressure component) is given as:

$$\vec{f}_m = \nabla \cdot T_m$$
$$= -\nabla \left[ \mu_0 \int_0^H v \left( \frac{\partial M}{\partial v} \right)_{H,T} dH + \mu_0 \int_0^H M \, dH \right] + \mu_0 M \nabla H$$

which results in the amended Navier-Stokes equation:

$$\rho \frac{D\vec{v}}{Dt} = \underbrace{\vec{f}_p}_{\text{pressure force}} + \underbrace{\vec{f}_m}_{\text{magnetic force}} + \underbrace{\vec{f}_v}_{\text{viscous force}} + \underbrace{\vec{f}_g}_{\text{gravity force}}$$

$$\rho \frac{D\vec{v}}{Dt} = -\nabla p^* + \mu_0 M \nabla H + \eta \nabla^2 \vec{v} + \rho \vec{g}$$

It must be noted that the composite pressure has replaced the thermodynamic pressure term from the standard Navier-Stokes formulation. Furthermore, most applications (Oldenburg et al. 2000, Lavrova et al. 2006) ignore the magnetostrictive pressure: this can be safely done for single phase, incompressible ferrofluid applications where the magnetization does not vary with fluid density. In two-phase flow where only one phase is magnetized, however, the present inventors show below that the magnetostrictive term is not necessarily negligible.

Boundary Conditions for the Interface Between a Magnetized Fluid and a Non-Magnetized Fluid: Assume the wetting (W, aqueous) fluid is magnetizable, and the non-wetting (NW, non-aqueous) fluid is not (see FIG. 4A), and using the magnetic stress tensor stated above and the fact that the normal components of B and tangential component of H are continuous across the NW-W interface, the interface at equilibrium curves in order to satisfy a modified Young-Laplace equation as follows:

$$p_c - (p_s + p_m + p_n) - \sigma \kappa = 0 \quad (12)$$

The equation above contains the new pressure term, magnetic normal pressure:

$$p_n = \mu_0 (H_{2n} - H_{1n})^2 / 2 \quad (13)$$

that appears due to integration of the magnetic stress tensor at the interface between non-magnetized and magnetized fluids, and $H_{1n}$ is the component of the magnetic field strength in fluid 1 normal to the interface. As before, $p_c=p_{nw}-p_w=p_2-p_1$ stands for capillary pressure. For boundary conditions, gravity forces are assumed small (but could be added to the analysis). Further, had the non-wetting fluid been magnetized and not the wetting fluid (see FIG. 4B), the sign of the term $(p_s+p_m+p_n)$ in the modified Young-Laplace equation, Equation (12), would change. Assuming B and H are collinear (consistent with the use of soft magnetic material), the pressures evaluate to:

$$p_m = \frac{1}{2}\mu_0 \chi H_1^2 = \frac{1}{2\mu_0} \frac{\chi}{(\chi+1)^2} B_1^2 \quad (14)$$

$$p_s = -\frac{1}{2}\mu_0 \chi H_1^2 \frac{\rho_1}{\rho_1-\rho_2} = \frac{1}{2\mu_0} \frac{\chi}{(\chi+1)^2} B_1^2 \frac{\rho_1}{\rho_1-\rho_2}$$

$$p_n = \frac{1}{2}\chi^2 H_{1n}^2 = \frac{1}{2} \frac{\chi^2}{(\chi+1)^2} B_{1n}^2$$

All terms have nonlinear dependence on the magnetic susceptibility $\chi$ of the suspended nanoparticles (note that the nonlinear dependence of $p_n$ is $\chi$ times that of $p_m$ or $p_s$). Magnetostrictive term $p_s$ also depends on the densities of the two fluid phases (and can be positive or negative). The magnetic normal pressure $p_n$, on the other hand, depends on the component of magnetic field normal to the fluid/fluid interface, and thus it is not constant along the interface.

Equation (12) extends the Young-Laplace relationship to account for magnetic forces. It is remarkable that the effect of the magnetic field can be incorporated in terms of pressure-like quantities $p_s$, $p_m$ and $p_n$. This means the existing body of theory and simulators for capillarity-controlled displacements can be readily extended to handle ferrofluids like the ones disclosed herein. The magnetic pressure terms can augment or diminish the capillary pressure, depending on the type of fluids (e.g., their density ratio), as well as on which phase is magnetized (wetting or not, denser or not). Further, which of the magnetic terms becomes dominant as well as their size relative to the capillary pressure term is controlled by multiple factors. In general, a fluid/fluid configuration that is stable in the absence of a magnetic field will respond in one of three ways when a magnetic field is applied. The induced motion may be incremental and reversible, e.g., to a new stable configuration occupying the same pores and throats; oscillatory, e.g., interfaces vibrating in the same throats; or irreversible, e.g., Haines jumps of the nonwetting phase into previously unoccupied pores.

Example Calculation of Interfacial Movement: The present inventors calculated the contributions to composite pressure in an example application. Following Oh et al. (2006), the inventors carried out studies in which the following sinusoidal magnetic field is applied in a z direction:

$$\vec{B}(x,y,z,t) = \sin(2\pi f_n) B_z(z) \vec{k} \quad (15)$$

where $f_n$ is modulation frequency of the applied sinusoidal magnetic field, and $B_z$ its maximum strength. Variation of $B_z$ in x and y directions was negligible.

To demonstrate how different fluids, pore geometry, and type of particles influence the composite pressure, the inventors assumed a straight capillary of radius r. The capillary contains water (wetting phase) on the bottom and a less dense non-wetting fluid on top. The situation is taken directly from the study set-up described later, for which the following values are assigned: $r=10^{-3}$ m; water phase of density $\rho_1=1000$ kgm$^{-3}$; contains paramagnetic nanoparticles of $\chi=0.2$ and 20; and non-wetting phase has density $\rho_2=1$ kgm$^{-3}$ and interfacial tension $\sigma=0.072$ Nm$^{-1}$ (air), or $\rho_2=750$ kgm$^{-3}$, and $\sigma=0.032$ Nm$^{-1}$ (dodecane). A constant value of magnetic field strength $B_z(z)=0.05T$ and a frequency of 1 Hz are assumed. To simplify the demonstration, the projection $B_{1n}$, which varies with position along a curved interface, is approximated with a constant corresponding to its value at angle 45° with respect to the magnetic field. The capillary pressure is set to the equilibrium value in the absence of a magnetic field, i.e., to $$\frac{2\sigma}{r}.$$

Figure 5A:
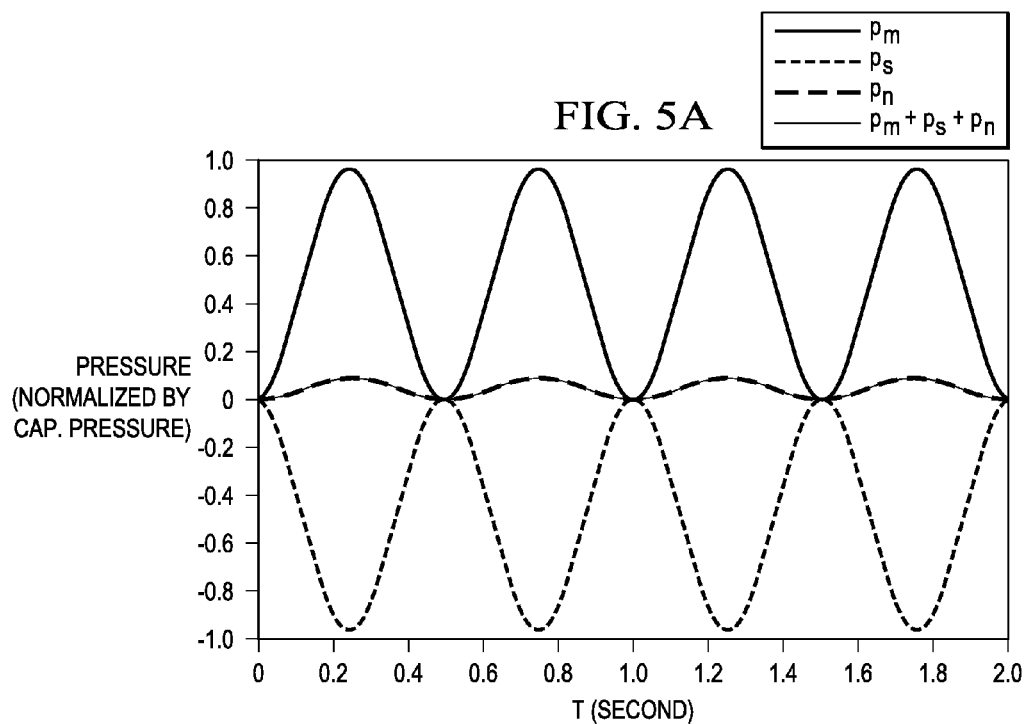
FIGS. 5A and 5B show a magnetic pressure estimate at an interface between the magnetized water and air relative to capillary pressure for a capillary tube of radius 1 mm. Capillary pressure value is 144 Pa. Because air is much less dense than water, the $p_m$ and $p_s$ terms cancel each other regardless of particle magnetic susceptibility. The total magnetic pressure (black) is therefore determined by the $p_n$ term.
Figure 5B:
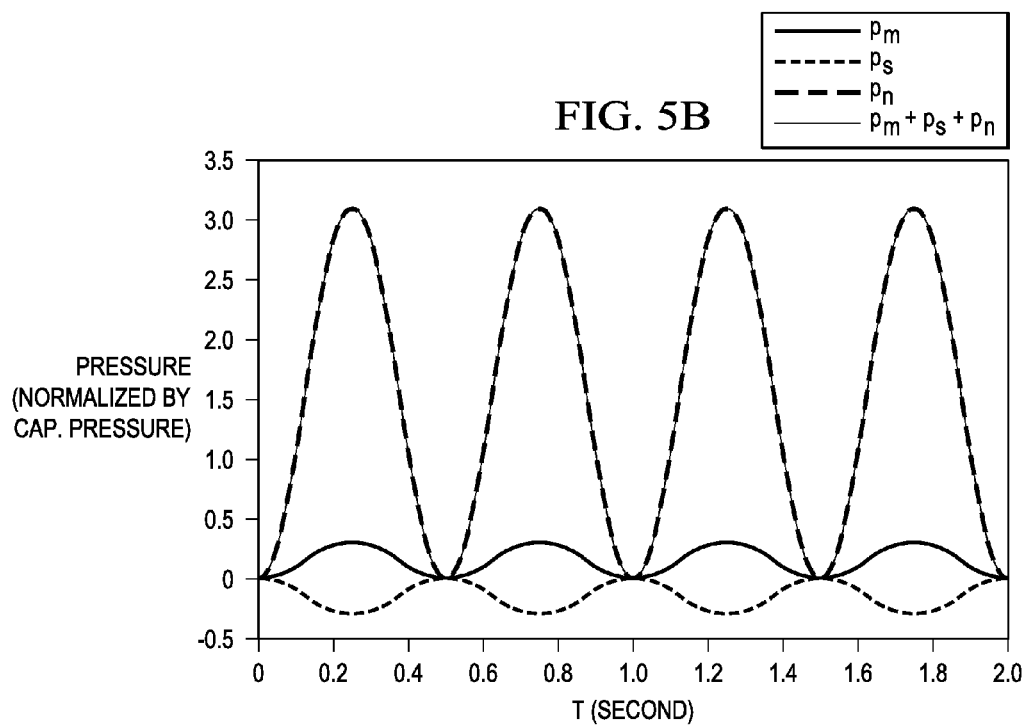

Considering an air/water interface first, the ratio $$\frac{\rho_1}{\rho_1-\rho_2}$$

in Equation (14) in this case is very close to unity, so no matter which particle susceptibility is considered, the $p_m$ and $p_s$ terms almost cancel each other, as the sinusoids in FIGS. 5A and 5B illustrate. The sum of the magnetic pressures will therefore be determined by the magnetic normal pressure $p_n$ and thus is always positive. The total magnetic pressure is about a factor of ten smaller than the capillary pressure for particles of small susceptibility, as shown in FIG. 5A, but three times larger than the capillary pressure for particle susceptibility 100 times greater, as shown in FIG. 5B. The imposed field would thus be expected to induce oscillation of the interface for the situation in FIG. 5A, but would overcome capillary forces and induce fluid displacement for large susceptibility particles (assuming no gravity forces).

In a dodecane/water combination, on the other hand, the $p_m$ and $p_s$ terms are of opposite sign but not of equal magnitude. Depending on particle susceptibility, the relative sizes of all the magnetic terms differ and can sum to a negative value or positive value. For small susceptibility, as shown in FIG. 6A, the total magnetic pressure is negative, while for large susceptibility, as shown in FIG. 6B, the total magnetic pressure is positive. Consequently, an imposed magnetic field can affect the fluids in dramatically different ways, depending on the susceptibility of the paramagnetic particles. In both cases, the magnitude of the total magnetic pressure is several times greater than the capillary pressure. Thus, small susceptibility need not render magnetic forces negligible relative to capillary pressure. The fluid densities are important in this respect; the normalized magnetic pressure is an order of magnitude larger for dodecane/water (see FIG. 6A) than for air/water (see FIG. 5A) for particles of small susceptibility. For large susceptibility, the normalized magnetic pressures are similar for air/water and dodecane/water systems.

The particular fluid-fluid-solid surface combination adds another dimension to this behavior. If water is the wetting phase, the total magnetic pressure is subtracted from the capillary pressure, as in Equation (12). If water is nonwetting, the magnetic pressure is added to the capillary pressure. As seen in FIGS. 6A and 6B, the total magnetic pressure itself may be either positive or negative. Therefore, there are four possible scenarios when exposing the system to a magnetic field as shown below:

|  | $p_{m+}\ p_{n+}\ p_s$ positive | $p_{m+}\ p_{n+}\ p_s$ negative |
| --- | --- | --- |
| Water-wet solid | Effect of $p_c$ diminished | Effect of $p_c$ augmented |
| Oil-wet solid | Effect of $p_c$ augmented | Effect of $p_c$ diminished |

Diminishing the effect of $p_c$ means that the fluid/fluid interface will adopt a curvature smaller than it would in the absence of the magnetic field. Augmenting $p_c$ causes the interface to become more curved.

Figure 7:
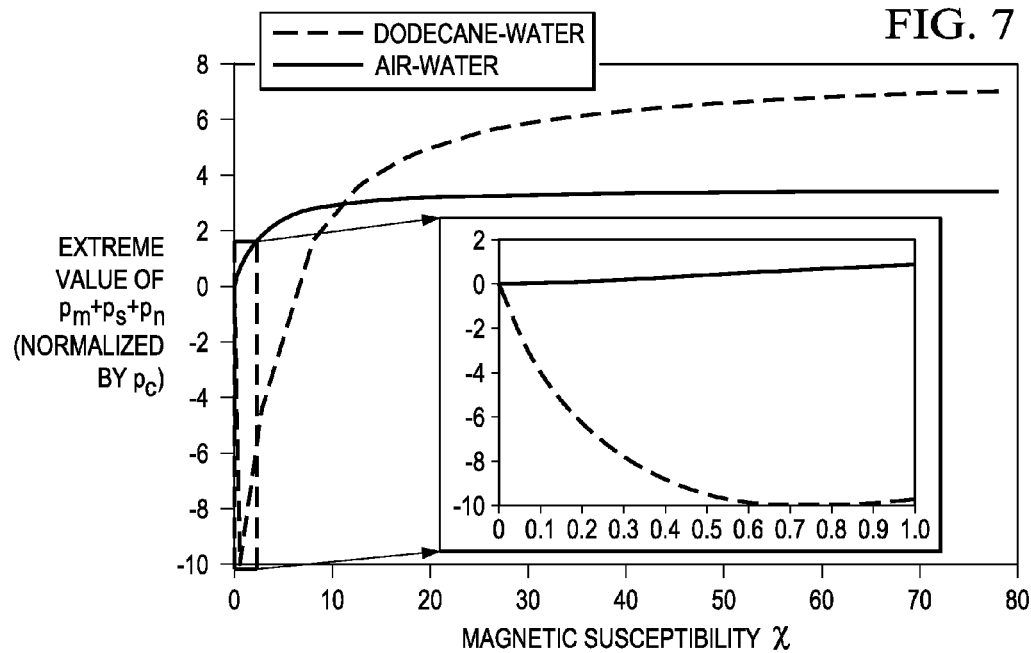
FIG. 7 is a plot showing an extreme value of the magnetic pressures at an interface between two fluids (normalized by capillary pressure for the tube of radius 1 mm) with nanoparticles of different susceptibility suspended in water. If induced by an oscillatory magnetic field, the magnetic pressure will vary between this extreme value and zero.

FIGS. 5A and 5B and FIGS. 6A and 6B show that the normalized total magnetic pressure oscillates between zero and some extreme value. Large values of magnetic pressure are expected to be useful in applications. Thus, the dependence of the extreme value upon particle susceptibility offers insight in the full range of possibilities, as shown in FIG. 7. The extreme value grows with particle susceptibility but exhibits saturation. Thus efforts to increase response by deploying particles of greater susceptibility will reach a point of diminishing returns. The inset in FIG. 7 shows that the extreme value can be a large negative number at small susceptibility, depending on fluid densities. Thus some fluid pairs may work well with particles of modest susceptibility and poorly with particles of greater susceptibility. This counterintuitive result raises interesting questions for the design of particles for this application. Further, air has a narrow range of extreme values (and is likely going to be examined only in a laboratory environment), while dodecane, of interest in field applications, has a much wider range of extreme values.

Typical sandstone pore size (radius) is about 10 micron, i.e., 100 times smaller than the tube considered in the example above. The previous discussion applies, but the ratio of magnetic pressures relative to the capillary pressure is 100 times smaller. In the field, it is therefore expected that interfaces will oscillate when exposed to an oscillating magnetic field.

Figure 8:
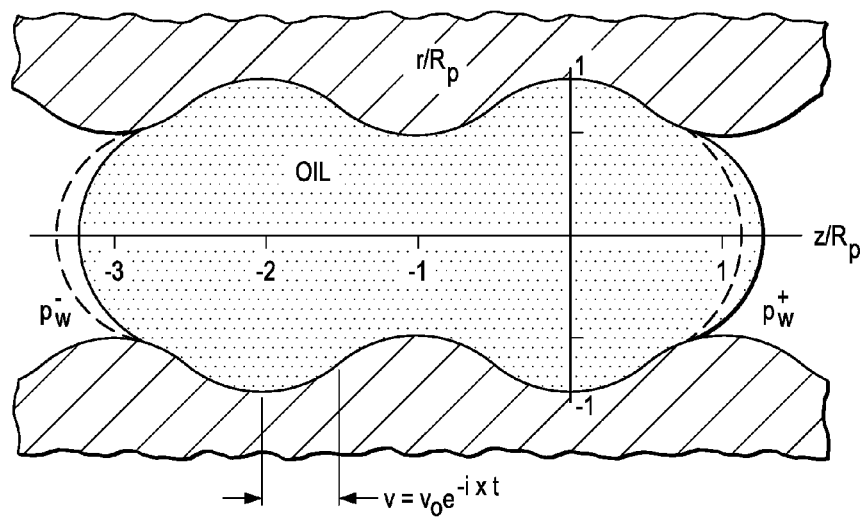
FIG. 8 is a schematic showing a pressure wave generated by the oscillation of an oil-water meniscus.

Oscillation of oil/water meniscus in a pore: The presence of the oil/water interfaces (menisci) in reservoir rock influencing the seismic wave propagation has been recognized by the petroleum geophysicists for some time (Li et al. 2001). For example, Miksis (1988) did modeling analysis to see if the fluctuation of the oil/water menisci at rock pores is a main mechanism for the seismic velocity attenuation. In the attempts to explain the enhanced oil recovery by seismic vibration that has been claimed by Russian researchers (Roberts et al. (2003)), Hilpert et al. (2000) and many others investigated the possibility of generating resonance when a seismic vibration is conveyed to an oil-containing reservoir zone (see Huh (2006) for review). Because the oil/water interfacial tension has a restoring force when displaced, the oil/water meniscus oscillation generates a pressure wave, as schematically shown in FIG. 8.

A detailed pore level interface description at residual oil saturations in arbitrary geometries can readily be obtained (Prodanović and Bryant, 2006, 2008, 2009; Prodanović, 2009). The approximate modeling of the oscillation of the oil/water interface in a rock pore, in response to the imposed magnetic field, can be carried out by modifying the software developed by the present inventors (Prodanović and Bryant, 2006, 2008, 2009). A short summary of the approach is as follows. The moving surface of interest is embedded as the zero level set of function $\phi(\vec{\chi}, \tau)$ defined on an entire domain and $\tau$ is a time-like parameter that tracks the motion of the interface toward an equilibrium position. The zero level set is the set of points $\vec{\chi}$ such that $\phi(\vec{\chi}, \tau)=0$. Such representation enables elegant calculation of various interface properties. For instance, the normal to the interface is simply, $$\vec{n} = \frac{\nabla \phi}{|\nabla \phi|},$$

where $\nabla\phi=(\phi_x, \phi_y, \phi_z)$ is the spatial gradient of $\phi$, and (twice the) mean curvature $\kappa$ is divergence of the normal. In level set methods, the level set function evolves in time according to the following partial differential equation:

$$\phi_\tau + F|\nabla\phi|=0, \phi(\chi,0) \text{ given} \qquad (27)$$

where F is the speed of the interface in a normal direction. More general equation:

$$\phi_\tau + \vec{u}\cdot\nabla\phi=0, \phi(\chi,0) \text{ given} \qquad (28)$$

where is external velocity field (if $$\vec{u} = F\vec{n} = F\frac{\nabla\phi}{|\nabla\phi|},$$

the previous equation will be obtained). In the most general two phase flow application, one would propagate the fluid-fluid interface using velocity field $\vec{u}$ obtained by solving the Navier-Stokes equation. If capillarity is the dominant force, however, the interface at equilibrium will curve itself while balancing capillary pressure and interfacial tension (Young-Laplace equation $p_c = \sigma\kappa$). Thus, the appropriate normal speed model at the core of slow, quasi-static interface movement is:

$$F(\vec{\chi},\tau)=p_c-\sigma\kappa(\vec{\chi},\tau) \qquad (29)$$

The inventors modeled the situation where the wetting fluid is perfectly wetting the solid surface (contact angle zero). This is effectively done describing the solid phase with a separate level set function and implementing a simple penalization if the meniscus enters the solid phase. For more details refer to Prodanović and Bryant (2006, 2008).

Without magnetic pressures, the interface adopts a curvature that (at equilibrium) balances capillary pressure only. Such an interface can be found by solving Equations (27) and (28) in the limit of large $\tau$. With one of the fluids magnetized and exposed to an external magnetic field we need to add magnetic pressures into the equation as per Equation (12) and thus the speed function becomes (for wetting fluid being magnetized):

$$F(\vec{\chi},\tau,t)=p_c-(p_m(t)+p_s(t)+p_n(t))-\sigma\kappa(\vec{\chi},\tau) \qquad (30)$$

If the non-wetting fluid is magnetized and the wetting fluid is not magnetized, the sign in front of the magnetic pressures turns positive. t now denotes real time (of the magnetic field oscillation, if applicable). If no damping of the interface motion due to viscosity is assumed, for each real time t, the interface instantaneously finds the equilibrium position (steady state solution to Equation (27) with respect to the parameter $\tau$). For practical application, one could find the physical link between real time and the parameter $\tau$ and use the equation to monitor motion in real time.

The inventors studied the influence of various magnetic pressure terms using constant and sinusoidally changing magnetic fields, the latter motivated by Equation (15), in a simple converging-diverging capillary.

Constant Magnetic Field: In the presence of a simple permanent magnet, the magnetic field as well as magnetic induction field within the magnetized fluid in a small capillary are constant (to a good approximation). Thus, magnetostrictive ($p_s$) and fluid-magnetic pressures ($p_m$) are constant as well. If magnetic normal pressure is negligible (as for example in the case of dodecane and water with low susceptibility particles, FIG. 6A), then the total pressure difference to be balanced by the curved interface will be a constant. The value of the constant will be smaller or larger than the original thermodynamic capillary pressure, depending on whether NW or W phase is magnetized.

From the perspective of the fluid/fluid interface, the effect of the constant magnetic field is equivalent to the effect of an increment/decrement in capillary pressure. Thus, the interface will assume new position with a larger/smaller meniscus curvature. Depending on the geometry of the (capillary) pore space, the new position will be reached reversibly and nearby (in a converging geometry) or irreversibly and far-away (interface jump in a converging-diverging geometry when the new pressure is smaller/higher than the critical value for a neighboring pore/throat).

Figure 9:
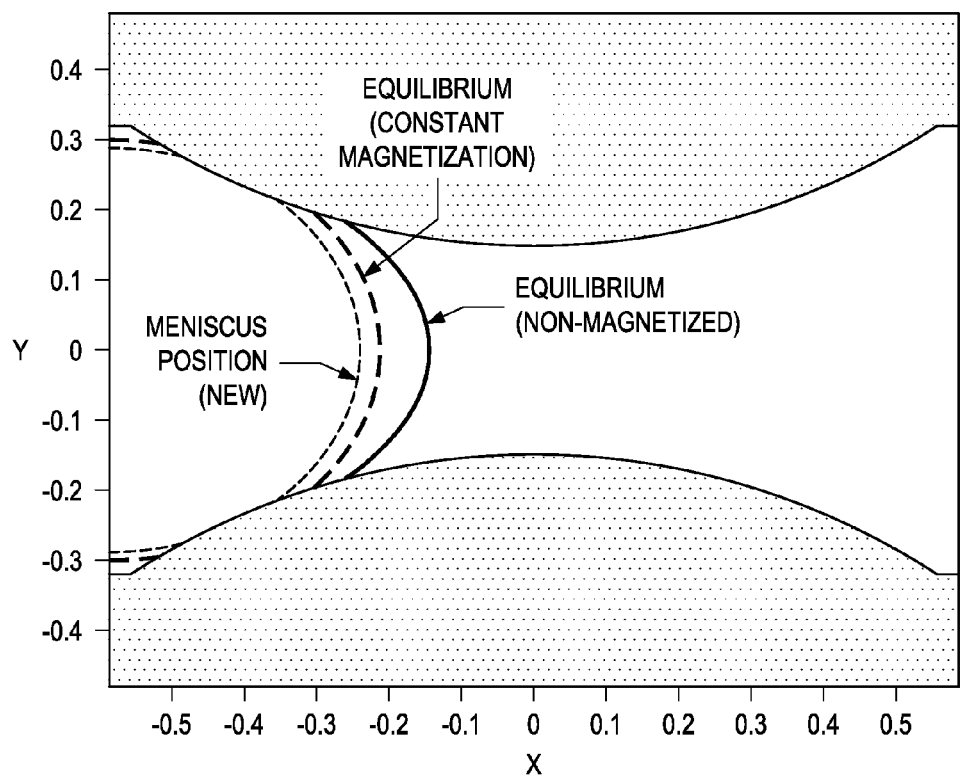
FIG. 9 is a plot showing rock grains (shown in gray) delineating a small converging-diverging capillary. The initial equilibrium interface (length scale is normalized by the radius of grains, corresponding numerical capillary pressure used is 0.1) is shown. The interface is then exposed to a constant magnetic field and the wetting phase is assumed magnetized. With the fluids and particles of FIG. 6A, and with a constant magnetic field that yields $p_m + p_s = 0.02$ and $p_n = 0$, the interface retreats as shown. For a different choice of fluids and particles (FIG. 5A), if a constant magnetic field is imposed that yields $p_n = 0.02(\vec{n} \cdot \vec{e}_x)^2$, the meniscus again retreats. The difference is that the magnetic normal pressure is not constant along the interface but depends on its orientation with respect to the imposed magnetic field.

FIG. 9 illustrates this behavior. The initial location of the meniscus is the equilibrium position for value $p_c$=0.1, $\sigma$=0.02, $$k = \frac{p_c}{\sigma} = 5.$$

The nonwetting phase is on the left side of the meniscus, and the magnetizable wetting phase on the right. Suppose a constant magnetic field is applied in the x-direction (horizontal direction in FIG. 9), and suppose further that magnetic normal pressure $p_n$ is negligible. The inventors chose a strength of the field so that the total magnetic pressure $p_m+p_2$=0.02. The magnetic pressure diminishes the capillary pressure, because the wetting phase contains the paramagnetic particles. Hence, the meniscus retreats (to the left in FIG. 9) to a new equilibrium position in a less constricted part of the pore throat. The imposition of the constant field in this case causes a small amount of imbibition.

Suppose now that the fluids and susceptibility are chosen as in FIG. 5A, so that the magnetostrictive and fluid magnetic pressures are of opposite sign and the same magnitude, and the magnetic normal pressure is non-negligible. In this case, the total magnetic pressure is dominated by the magnetic normal pressure and therefore varies with location along on the interface. The equilibrium interface position will necessarily differ from the previous case where the total magnetic pressure is constant everywhere. Starting from the same parameters that produced the non-magnetized equilibrium configuration, a constant magnetic field is again imposed in the x-direction. The strength of the field is chosen so that the maximum value of magnetic normal pressure is $p_{max}$=0.02, i.e., the same value as the total magnetic pressure in the previous illustration. The local value of magnetic normal pressure is thus $p_n=p_{max}(\vec{n}\cdot\vec{e}_x)^2$ where $\vec{n}$ is the interface normal. This magnetic pressure diminishes the effect of the capillary pressure when the W fluid is magnetized, so the meniscus is expected to retreat. Since the magnetic normal pressure depends on the interface position, an equilibrium position is found (shown in FIG. 9) different from the one found when magnetostrictive and fluid magnetic pressure of the same magnitude was applied.

Figure 10:
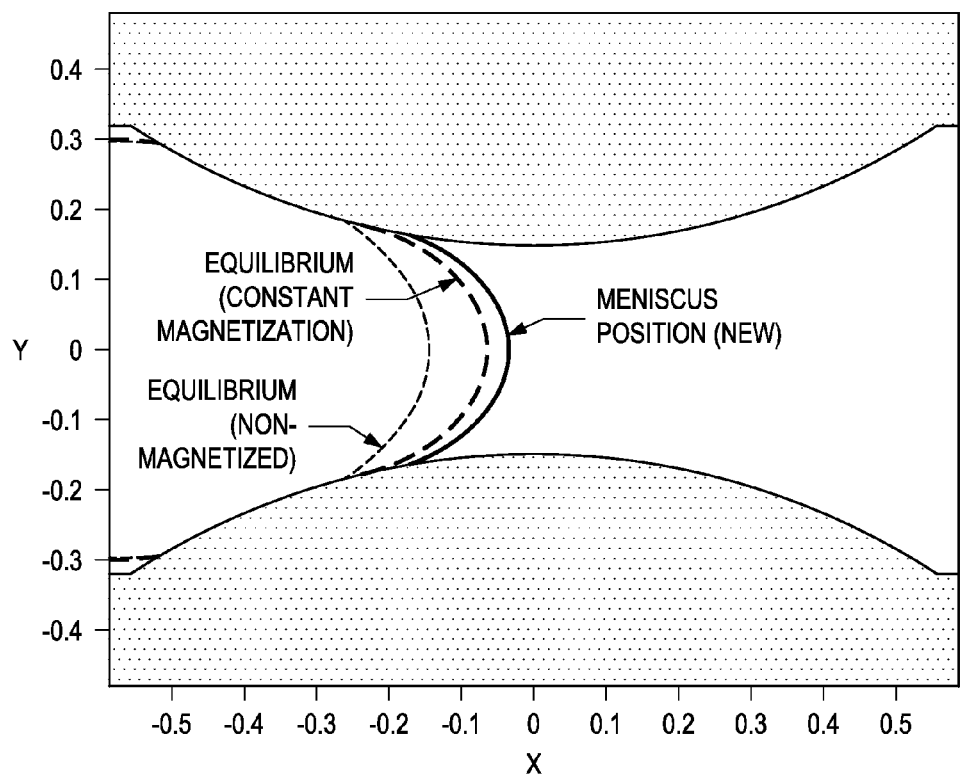
FIG. 10 is a plot showing the rock grains and same initial location of meniscus as in FIG. 9. In this case, the nonwetting fluid is magnetizable. Consequently, imposing the same magnetic field as in FIG. 9 augments the capillary pressure. Thus, the meniscus advances into the throat. Taking the same choices of parameters as in FIG. 9, the figure also shows curves corresponding to a negligible magnetic normal force, and a situation where the magnetostrictive and fluid-magnetic pressures cancel.

When the non-wetting phase is magnetized (and the wetting phase is not), the situation is reversed, as shown in FIG. 10. In this case, imposing the magnetic field causes a small amount of drainage. Clearly if the meniscus were near the narrowest part of the throat, even a small amount of drainage could lead to a Haines jump.

Figure 11A:
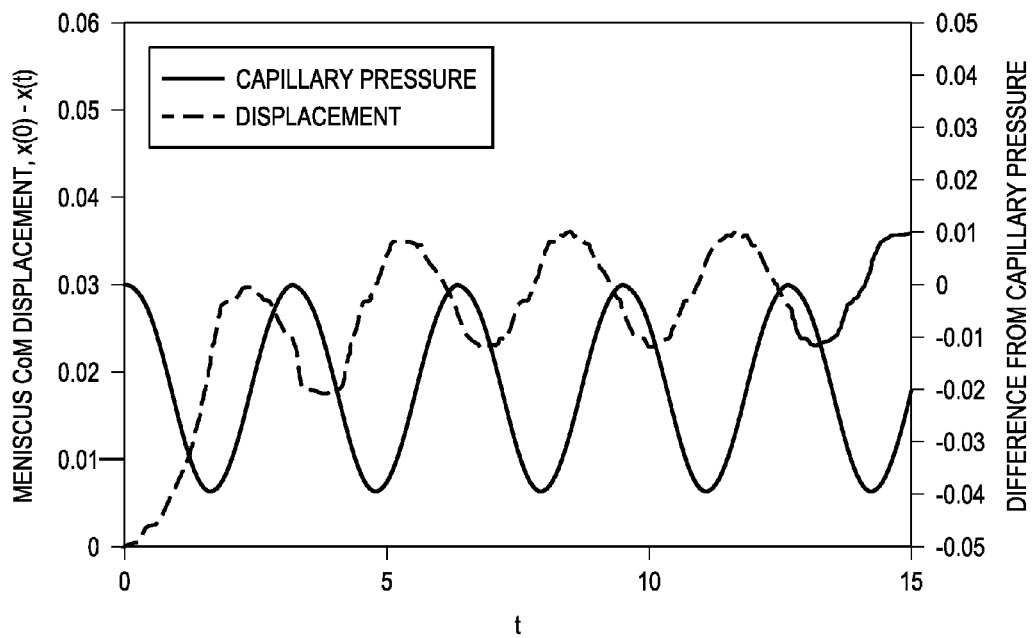
FIGS. 11A and 11B show the x-coordinate displacement of the center of mass of the fluid-fluid meniscus in a converging-diverging capillary in time when exposed to an oscillating magnetic field and when the wetting fluid is magnetized. The total pressure value is shown as the difference from capillary pressure. The interface is symmetric and the magnetic field is in x-direction as well, so there is no movement in transverse direction.
Figure 11B:
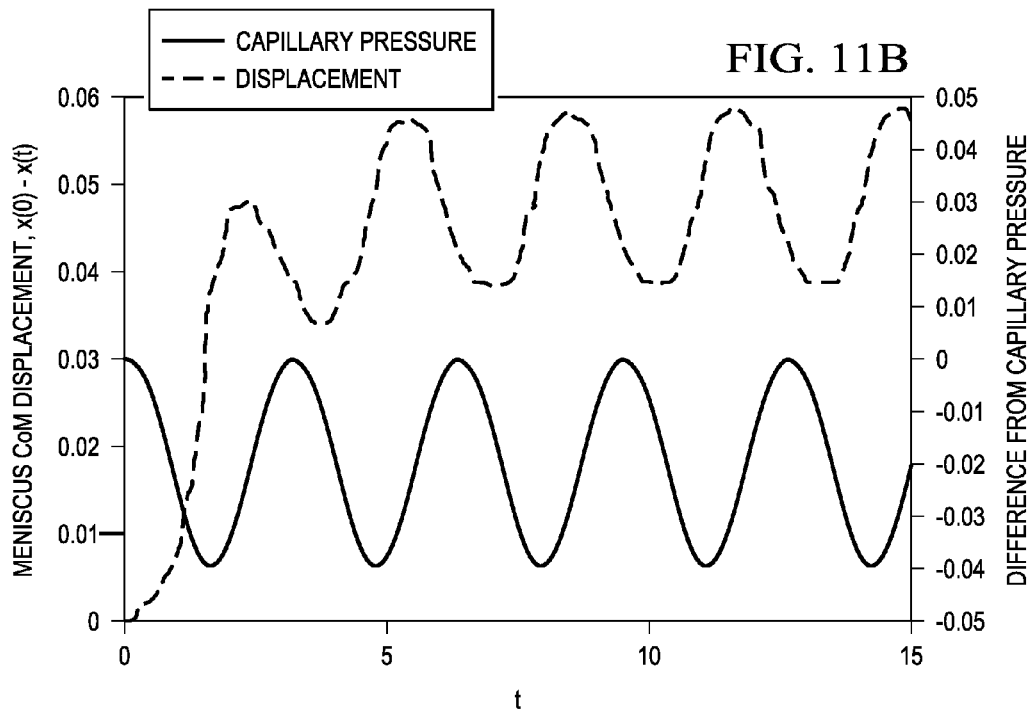

In an oscillating magnetic field, assuming no damping by viscosity, $p_m+p_s$=0 and the magnetic normal pressure of the form $p_n(t)=p_{max}(\vec{n}\cdot\vec{e}_x)^2 \sin^2(\omega t)$, the interface will oscillate at the same frequency $\omega$ between the zero magnetization and constant magnetization positions as shown in FIGS. 9 and 10. If for the purpose of illustration, a relationship t=τ is assumed and the displacement of the interface center of mass is monitored, it is observed that the interface withdraws somewhat and ultimately oscillates around a position in between the previously discussed end members as depicted in FIG. 11A. Adding the magnetostrictive and fluid-magnetic pressure (i.e., volumetric) terms of the same order of magnitude, e.g. $p_m+p_s=p_{max} \sin^2(\omega t)$, shows the same qualitative behavior as depicted in FIG. 11B.

Figure 12:
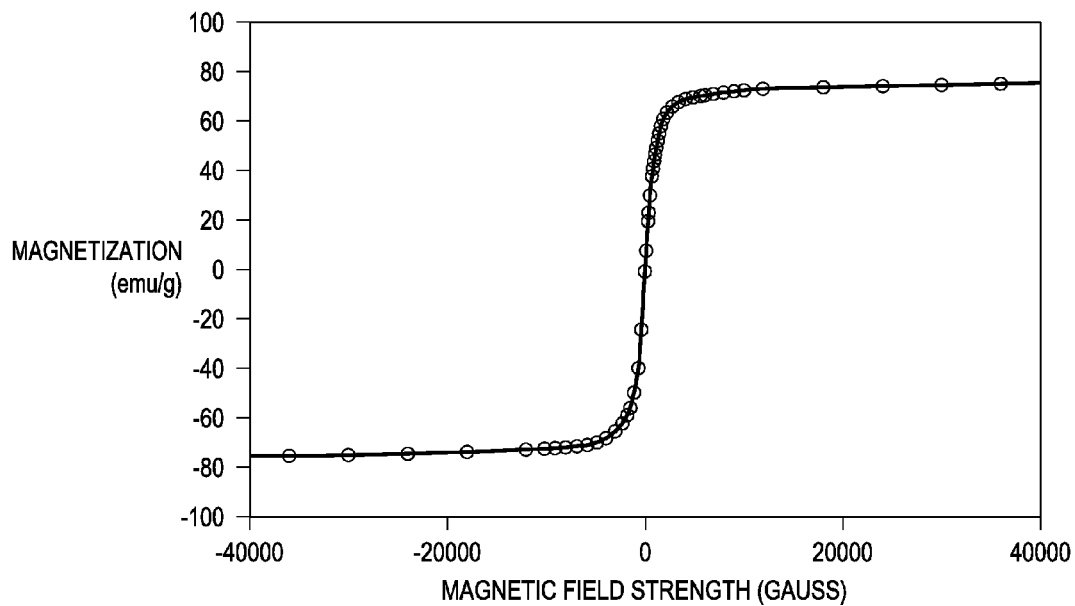
FIG. 12 is a graph showing the magnetization capacity of superparamagnetic nanoparticles in accordance with embodiments of the present invention.

Acoustic response of superparamagnetic nanoparticles to magnetic field oscillation: Because of a wide variety of applications, preparation of superparamagnetic nanoparticles is an active research area (Lu et al. 2007). FIG. 12 shows the magnetization capacity of the iron oxide nanoparticles prepared by the present inventors.

Figure 13:
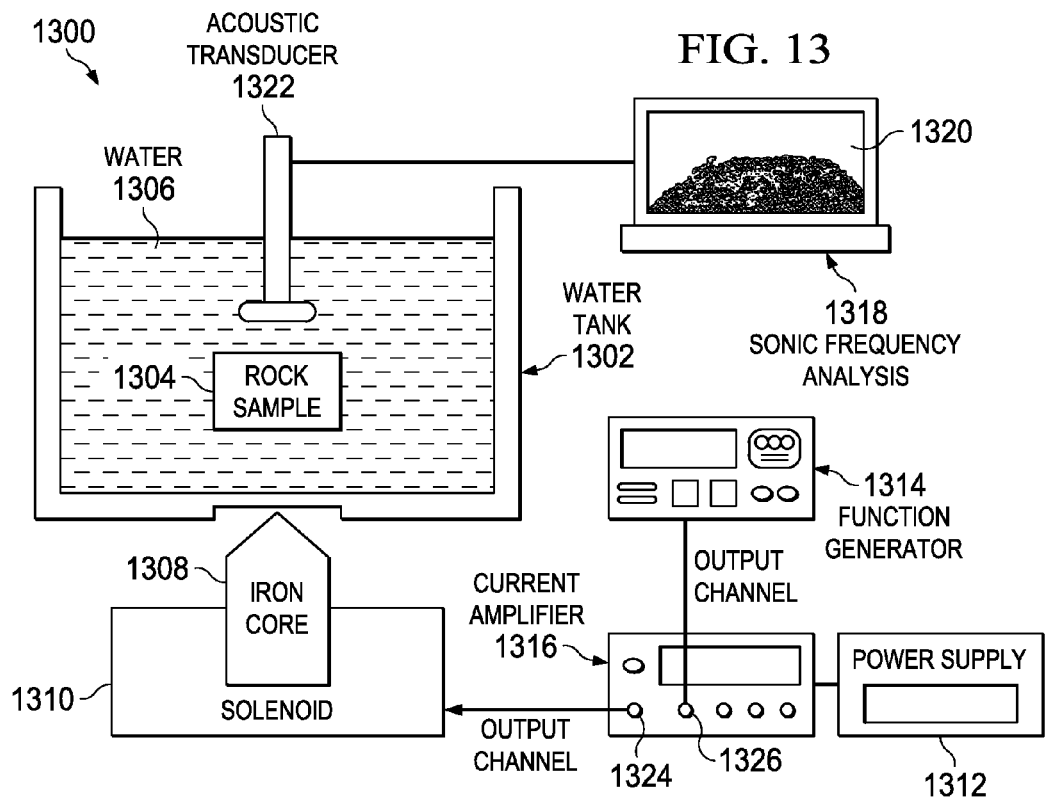
FIG. 13 is a schematic showing a magnetomotive acoustic system.

In biomedical engineering, sending paramagnetic nanoparticles to a target human organ, when injected into the blood stream, is an active research subject. The placement of paramagnetic nanoparticles at the target tissue allows enhanced imaging of the tissue, or delivery of a drug to it. The present inventors employed magnetic impulse and acoustic response to detect the presence of superparamagnetic nanoparticles in a surrogate tissue (Oh et al. 2006). FIG. 13 shows the schematics of the system 1300 for the magnetic field generation and acoustic response recording. System 1300 comprises a water bath/tank 1302, which contains a rock sample 1304 to be imaged. The tank 1302 is filled with water or an aqueous dispersion 1306 comprising the coated paramagnetic nanoparticles. An acoustic transducer 1322 is also placed in the tank 1302 to transmit the acoustic waves to a sonic frequency analyzer 1318. Images from the analyzer 1318 are viewed on a display device 1320. The system 1300 also comprises a power supply source 1312. A current amplifier 1316 with one or more output channels is connected to the power supply source 1312, and a function generator 1314 is connected to a second output channel 1326 of the current amplifier 1316. A solenoid coil 1310 is wrapped around a metallic core 1308, wherein the solenoid coil 1310 is connected to a first output channel 1324 of the current amplifier 1316, wherein the solenoid coil 1310 generates a magnetic field from the power supply 1312 and the current amplifier 1316.

Milner and his group also employed the phase-sensitive optical coherence tomography to measure the nano-scale displacements of the nanoparticle-imbedded sample, in response to the applied magnetic impulse (Telenkov et al. 2004). Such direct measurements of interfacial oscillation, for a simple model oil/water meniscus, will be very valuable in basic understanding of the acoustic generation. Both of the above measurement techniques can be employed when the magnetic field is applied in sinusoidal wave form, instead of the pulse form. Phase shifts in acoustic response and displacement response can be measured.

For embodiments of the present invention, the acoustic response to the imposed magnetic wave is measured in terms of the oil saturation in the rock sample, the sample size, lithology and permeability of rock sample, the nanoparticle size and surface wettability, and the compositions of oil and brine in the reservoir rock. Such detailed measurements allow development of the correlation between the oil saturation and magnetic impulse. Such correlations serve as a basis not only for the development of a new tool that "illuminates" the oil in the reservoir rock, but also for enhancing the capabilities of the existing tools such as the MRI for core scanning and the NMR logging.

Materials and Methods: An objective of the study described hereinabove was to model the oscillation of the oil/water interfaces in reservoir rock pores when a magnetic field is imposed, so that the feasibility of detecting the acoustic response can be evaluated. The inventors herein describe the measurement of the displacement of a fluid/fluid interface in response to the imposed magnetic field. The aqueous phase, which contains the paramagnetic nanoparticles, and another immiscible fluid are contained in a small cylindrical cell at ambient condition, forming an essentially flat interface between them. The procedure and the results are described below.

Figure 14:
FIG. 14 is a transmission electron microscopy (TEM) image of iron oxide nanorods. The concentration of particles is 1% (per weight), and the visible concentration depends on how the sample dries while taking the TEM image.
Figure 15:
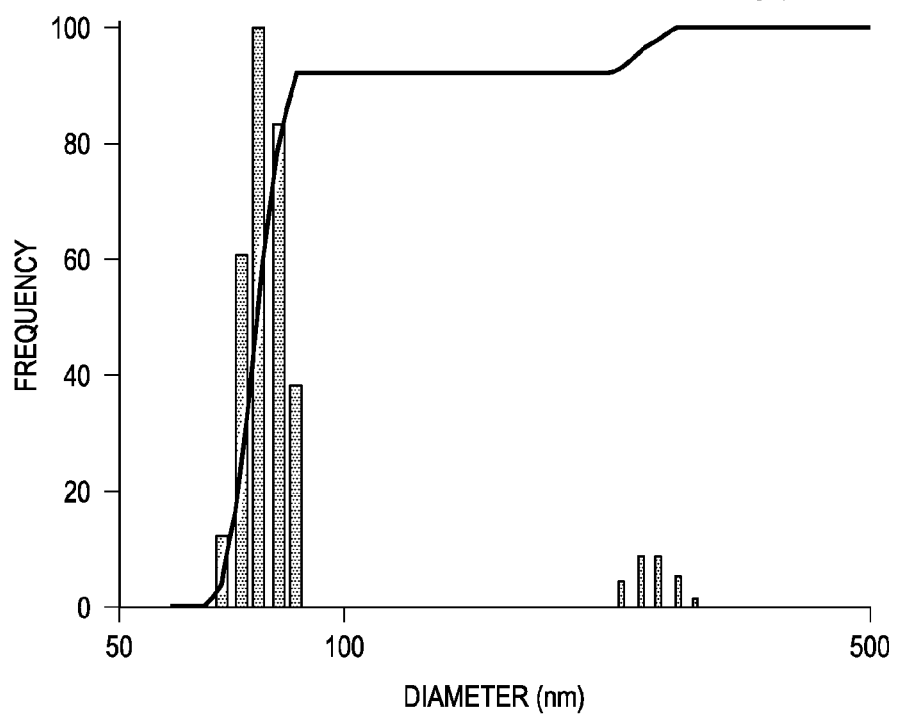
FIG. 15 is a statistical distribution of nanorod lengths as measured by the dynamic light scattering (DLS) apparatus.

Materials: NanoAmor iron oxide nanorods, dispersed in water at 35±2 wt % concentration, were obtained from Nanostructured & Amorphous Materials Inc. (Houston, Tex.). The Transmission Electron Microscopy (TECNAI 12 Spirit Biotwin, manufactured by FEI) images show that the nano-rods have an aspect ratio of about 5:1, as shown in FIG. 14. The size distribution of the nano-rods was measured with a Dynamic Light Scattering (DLS) apparatus (provided by the Chemical Engineering Department, UT Austin). FIG. 15 and Table 1 show the volume percentage as a function of the hydrodynamic diameter of the rods, which is close to the rod length. The scattering angle was set to 90° and the data were analyzed using a digital autocorrelator (Brookhaven BI-9000AT) and a non-negative least-squares (NNLS) routine (Brookhaven 9 KDLSW32). The measured count rate was approximately 150 kcps. Measurements were made over a period of 2 minutes. The nanorods had a reasonably narrow size distribution with peak value at 77 nm, and also contained a small amount of aggregates of about 250 nm diameter. The nanoparticle dispersion was diluted with de-ionized (DI) water as needed. Reagent grade dodecane and DI water were used.

TABLE 1

Local (G) and cumulative (C) distribution of nanoparticle equivalent diameter (d) as measured by DLS.

| d (nm) | G(d) | C(d), % |
|---|---|---|
| 58.01 | 0 | 0 |
| 61.36 | 0 | 0 |
| 64.86 | 0 | 0 |
| 68.58 | 12 | 4 |
| 72.51 | 61 | 23 |
| 76.67 | 100 | 54 |
| 81.07 | 83 | 80 |
| 85.72 | 38 | 92 |
| 90.63 | 0 | 92 |
| 95.83 | 0 | 92 |
| 101.33 | 0 | 92 |
| 107.14 | 0 | 92 |
| 113.29 | 0 | 92 |
| 119.78 | 0 | 92 |
| 126.65 | 0 | 92 |
| 133.92 | 0 | 92 |
| 141.60 | 0 | 92 |
| 149.72 | 0 | 92 |
| 158.31 | 0 | 92 |
| 167.39 | 0 | 92 |
| 176.99 | 0 | 92 |
| 187.14 | 0 | 92 |
| 197.87 | 0 | 92 |
| 209.22 | 0 | 92 |
| 221.23 | 0 | 92 |
| 233.91 | 4 | 93 |
| 247.33 | 8 | 96 |

TABLE 1-continued

Local (G) and cumulative (C) distribution of nanoparticle equivalent diameter (d) as measured by DLS.

| d (nm) | G(d) | C(d), % |
|---|---|---|
| 261.52 | 8 | 98 |
| 276.52 | 5 | 100 |
| 292.38 | 1 | 100 |
| 309.15 | 0 | 100 |
| 326.88 | 0 | 100 |
| 345.63 | 0 | 100 |

Figure 16:
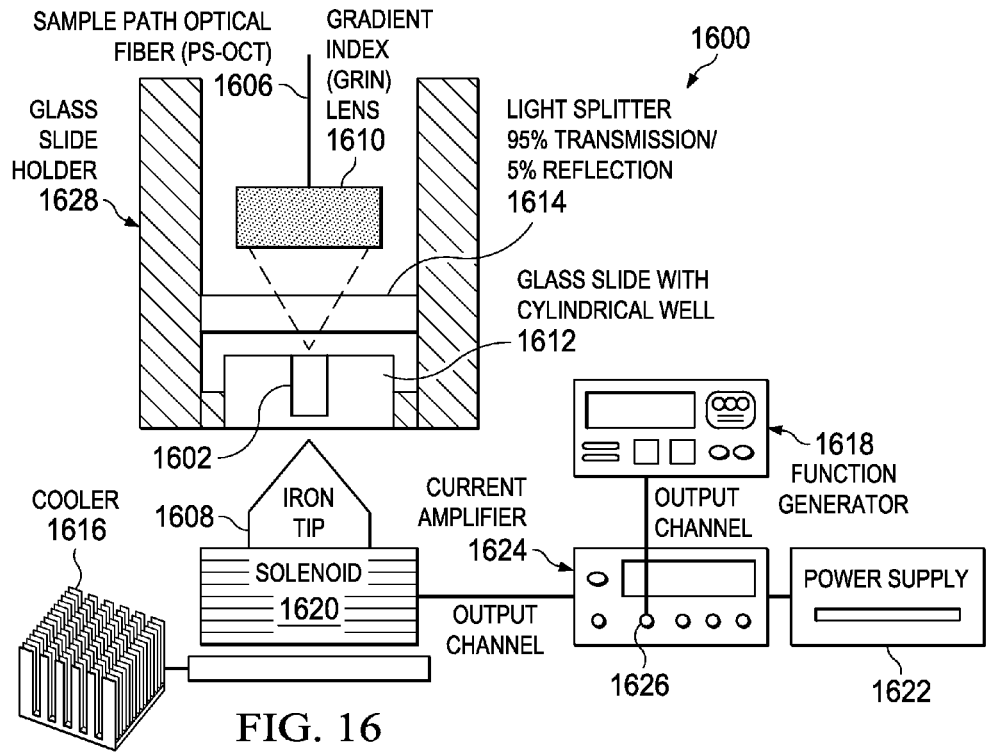
FIG. 16 shows a system for exciting an aqueous dispersion of paramagnetic nanoparticles with a time-varying magnetic field. The drive delivered a sinusoidal field with frequencies between 1 and 30 Hz. The field is focused on the sample by the tip (ca. 1 mm diameter) of the solenoid. The motion of the interface between aqueous phase and nonaqueous phase (air or dodecane in the studies reported here) is detected by phase-sensitive optical coherence tomography (PS-OCT) with resolution below 100 pm.

FIG. 16 shows a schematic of the system 1600, which comprises: (i) a glass slide holder 1628, capable of holding a glass slide 1612 with a small cylindrical well 1602 (diameter 2 to 4 mm) into which the sample liquid(s) are placed; (ii) an electromagnetic solenoid 1620 with an iron tip 1608, which generates the magnetic field of a prescribed schedule of strength vs. time; and (iii) a phase sensitive optical coherence tomography (PS-OCT) system 1606 that measures the displacement of the fluid/fluid interface in response to the imposed magnetic field. The sample path optical fiber (PS-OCT) 1606 is in communication with a gradient index (GRIN) lens 1610. The laser beam from the optical fiber 1606 is focused through lens 1610 and passed through a light splitter 1614 that allows for 95% transmission and 5% reflection. PS-OCT allows measurement of displacement of a fluid element or a solid particle in a sample with a sensitivity of tens of picometers (Pierce et al. 2002). With a vertical scan (or a horizontal scan, if needed) of the measurement location, the interface location can be identified and its displacement can be subsequently measured. PS-OCT has recently been employed to measure the displacement of laser- and magneto-excited nanoparticles (Joo et al. 2005; Adler et al. 2007). In the system 1600, the displacement sensitivity of the PS-OCT 1606 is 65 pm and the depth resolution is 10 to 15 microns. The imaging depth, the depth to which reliable measurements in the fluid can be obtained, is 2 mm. A laser beam used in the PS-OCT 1606 has a diameter of 30 microns. The cylindrical well 1602 can be drilled directly into the glass slide 1612, which enables convenient positioning of the sample for the PS-OCT measurements. The system 1600 also comprises a power supply source 1622. A current amplifier 1624 with one or more output channels is connected to the power supply source 1622. A function generator 1618 is connected to a second output channel 1626 of the current amplifier 1624. Cooling to the system is provided by an externally connected cooler 1616.

Figure 17:
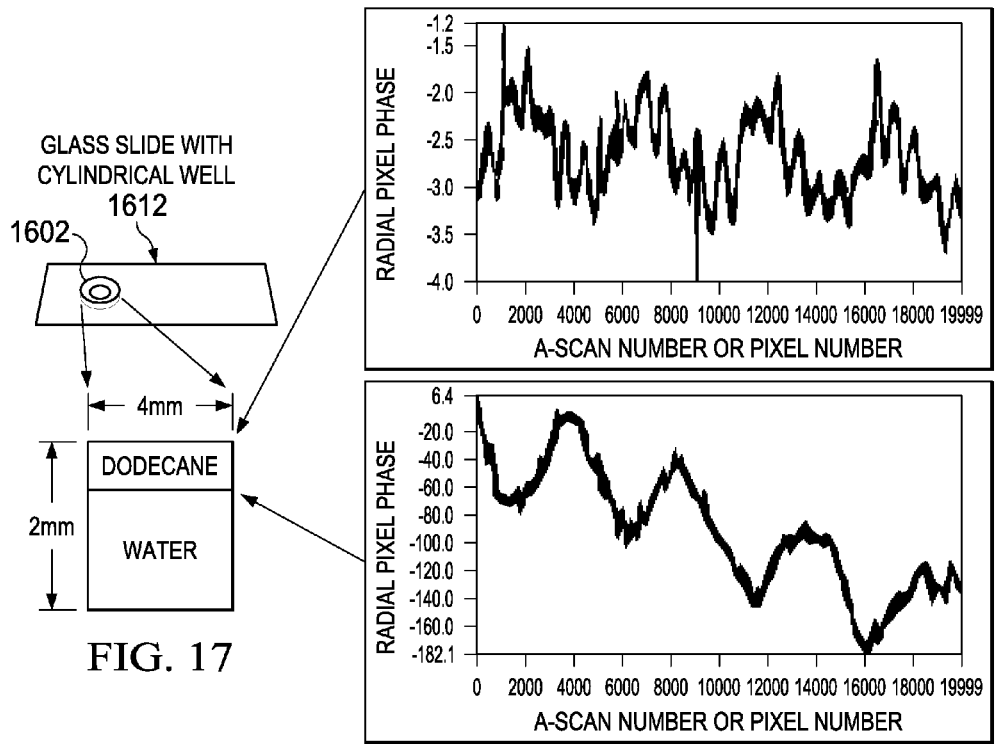
FIG. 17 shows a dodecane-water study in a large diameter (4 mm) well. The water contains 5 wt % iron oxide nanorods. Measured waveforms on the right show displacement (y-axis; one radial pixel approximately equals 100 nm) vs. time (x-axis; 10,000 A-scan number equals 1 second). The dodecane/water interface oscillates at 2 Hz with a peak-to-valley displacement of about 5000 nm (lower right). The air/dodecane interface response is small (peak-to-valley displacement about 100 nm, upper right), noisy and secondary: its motion is driven only by the motion of the underlying dodecane/water interface.

The cylindrical well 1602 was partially filled with an aqueous suspension of 5 wt % iron oxide nanorods. The remaining volume in the well 1602 was filled with dodecane, as shown in FIG. 17. The PS-OCT 1606 was used to measure the displacement of both interfaces (water/dodecane and dodecane/air) when a 1 Hz magnetic field of approximately 0.05 T was applied. The displacement of water-dodecane interface, measured from peak to valley, was about 5000 nm. The frequency was 2 Hz, twice the frequency of the magnetic field. The frequency doubling is characteristic of ferrofluids made with paramagnetic particles. No displacement of the air/dodecane interface is expected, since neither phase is magnetizable. The motion of the underlying dodecane/water interface does cause measurable displacement at the air/dodecane, however. The displacement is small (about 100 nm from peak-to-valley of the 2 Hz signal as seen in FIG. 18) and noisy: the high-frequency fluctuations are almost half the amplitude of the 2 Hz signal.

The study was repeated without dodecane, so that the only interface is between air and the aqueous suspension of nanorods. The motion of the interface is clear, FIG. 18, but the maximum displacement of the interface is 500 nm, an order of magnitude smaller than for the dodecane/water interface.

The two studies demonstrated that the existence of nanoparticles in one fluid phase results in measureable displacements of the interface between that fluid and another, non-magnetized fluid when a magnetic field is imposed. This displacement is maximum at the interface of the magnetic fluid and the non-magnetic fluid. Focusing the PS-OCT at depths below the interface (results not shown here) shows that the displacement decays with distance from the interface. Secondary displacement (motion induced by the moving interface) also occurs above the interface. Thus sound waves propagated through the fluids in this study.

The studies also confirmed an important aspect. The measured displacement of the interface between the magnetic and non-magnetic fluids depends strongly on the densities of the fluids. Greater displacement occurred when the non-magnetizable fluid (air or dodecane) was denser. This observation is in accordance with the above theoretical discussion. According to Equation (14), the sum of magnetostrictive and fluid-magnetic pressures is inversely proportional to the difference in the densities of the fluids and directly proportional to the density of the non-magnetic fluid (the density term in Equation (14) is near unity for the air/water experiment and about 5 for the dodecane/water study). Therefore, the denser the non-magnetic fluid, the larger the magnetic pressures will be, and the greater the perturbation of the interface [Equation (12)].

Studies with a ferrofluid (aqueous suspension of iron oxide nano-rods) below a second, non-magnetizable fluid (air, dodecane) showed measurable displacements of the fluid/fluid interface when the system is exposed to an oscillating magnetic field. The relative densities of the fluid phases strongly affect the displacement, confirming theoretical prediction. A sinusoidal magnetic field causes displacements of double frequency, also confirming theoretical analysis. Quadratic sinusoidal terms emerge in magnetic pressures, which are of the same order as capillary pressure in the experiments. Theoretical modeling reveals an insight into the nature of the displacements and the key material properties, e.g., magnetic susceptibility, needed to design nanoparticles to suit the practical purpose of interest.

Extension of the Navier-Stokes equation to ferrofluids yields an important result for modeling the motion of fluid/fluid interfaces: the magnetic field manifests itself as several pressure-like terms. This greatly facilitates the extension of existing models of capillarity-controlled displacements at the grain scale to include magnetic forcing. Preliminary implementation in an interface-tracking model agrees qualitatively with the dynamic behavior observed in experiments.

Embodiments of the present invention further disclose a novel nanoparticle coating technique, which makes their reservoir application possible. The present inventors employed a copolymer and a crosslinker that form a gel, and generates a thin layer of a polymer network around the nanoparticle. The polymer gel film does not detach from particle even when the coating material is removed from the injection water, unlike the surfactants or polymers adsorbed. By adjusting the hydrophilic and lipophilic parts of the copolymer, the salt-tolerance of the dispersion and the oil/water interfacial activity of the nanoparticles can be optimized.

Coating of iron oxide particles with poly(acrylic acid) (PAA) during synthesis resulted in sub-100 nm nanoclusters with electrostatic and steric stabilization. Cross-linking of PAA at various cross-link densities led to a coating with a polymer concentration of about 12% that did not desorb even for iron oxide concentrations down to 0.014 wt %. Without cross-linking, over half of the polymer desorbed from the particle surfaces at these dilute conditions. The superparamagnetic nanoclusters with cross-linked PAA were characterized using a superconducting quantum interference device or (SQUID) magnetometer, transmission electron microscopy (TEM), dynamic light scattering (DLS), thermo gravimetric analysis (TGA), and zeta potential measurements. The incorporation of the cross-linking agent, 1,6-hexanediamine, enhances the hydrophobicity and thus the interfacial activity of the clusters at the oil-water interface. In this general and highly flexible approach, iron oxide nanoparticles may be formed with an adsorbed polymer stabilizer, which is then permanently bound to the surface via cross-linking. This cross-linking approach offers important benefits for the formation of inexpensive coatings on nanoparticles for large scale applications including magnetomotive imaging of subsurface reservoirs.

In FIG. 19, the emulsion behavior is shown with and without 1 wt % NaCl. The presence of the organic functionalities via crosslinking makes the particles less hydrophilic and clear water phases are observed with salt added. This cross-linking approach with the large volume of the nanoclusters relative to the primary nanoparticles and the small mass of the cross-linked PAA coating offers important benefits for the formation of inexpensive coatings on nanoparticles for large scale applications including magnetomotive imaging of subsurface reservoirs.

Examples based on the copolymer-coated nanoparticle concept are presented herein below:

Example I

Poly(acrylic acid)$_{114}$-b-Poly(butyl acrylate)$_B$ block copolymer coatings on iron oxide Nanoparticles Iron oxide nanoparticles were synthesized from iron chlorides in the presence of a PAA-b-PBA polymer. This block copolymer was properly balanced to give a high absorption of nanoparticles at the oil/water interface. The inventors used three different ratios of copolymers with a polymer concentration of 2 wt % for the systematic study. Higher hydrophobic ratio showed a higher interfacial tension. The hydrodynamic diameter of the particles was controllable as a function of the reaction concentrations. The results presented herein were obtained with nanoclusters with a diameter on the order of 100 nm. The aqueous dispersions were stable up to 3 wt % salt at pH 8. Therefore, upon intense probe sonication, micron sized oil/water (oil/water) emulsions were formed and with significant stability. Emulsions of water and dodecane with drop sizes down to 5 μm are stabilized with 100 nm interfacially active nanoclusters of sub-10 nm iron oxide primary particles at an extremely low loading of 0.2 wt %. FIG. 20 shows the volume fraction based distributions of Poly(acrylic acid)-b-Poly(butyl acrylate) coated iron oxide nanoclusters. FIGS. 21A-21D show emulsion images of Poly(acrylic acid)114-b-Poly(butyl acrylate)26 at pH 8 with no salt, 1 wt % salt, 2 wt % salt, and 3 wt % salt, respectively. FIGS. 21E-21H show microscope images of Poly(acrylic acid)114-b-Poly (butyl acrylate)26 at pH 8 with no salt, 1 wt % salt, 2 wt % salt, and 3 wt % salt, respectively.

Example II

Poly(acrylic acid)$_m$-r-Poly(butyl acrylate)$_n$ Coatings on Iron Oxide Nanoparticles The inventors synthesized stable dispersions of small, about 100 nm superparamagnetic iron oxide nanoclusters with high magnetization, and controllable sizes, employing inexpensive random copolymers. In order to achieve these requirements, the inventors introduced random copolymers of Poly(acrylic acid)m-r-Poly(butyl acrylate)n as coating materials on iron oxide nanoparticles. This simple synthesis to apply various ratios of hydrophilic and hydrophobic monomers to design these copolymers allows independent tuning of the molecular weight, attachment density of hydrophobic block, and hydrophobicity of the coatings. A systematic study was performed to relate interfacial activity at the oil-water interface to the copolymer structure. The Fe3O4 particles were produced by co-precipitation of iron chloride salts in aqueous alkaline media with ~10 nm individual size. The clustering was kinetically controlled without utilizing complicated synthetic approaches and templating agents. The size of the formed magnetic clusters was measured by using dynamic light scattering.

Figure 22:
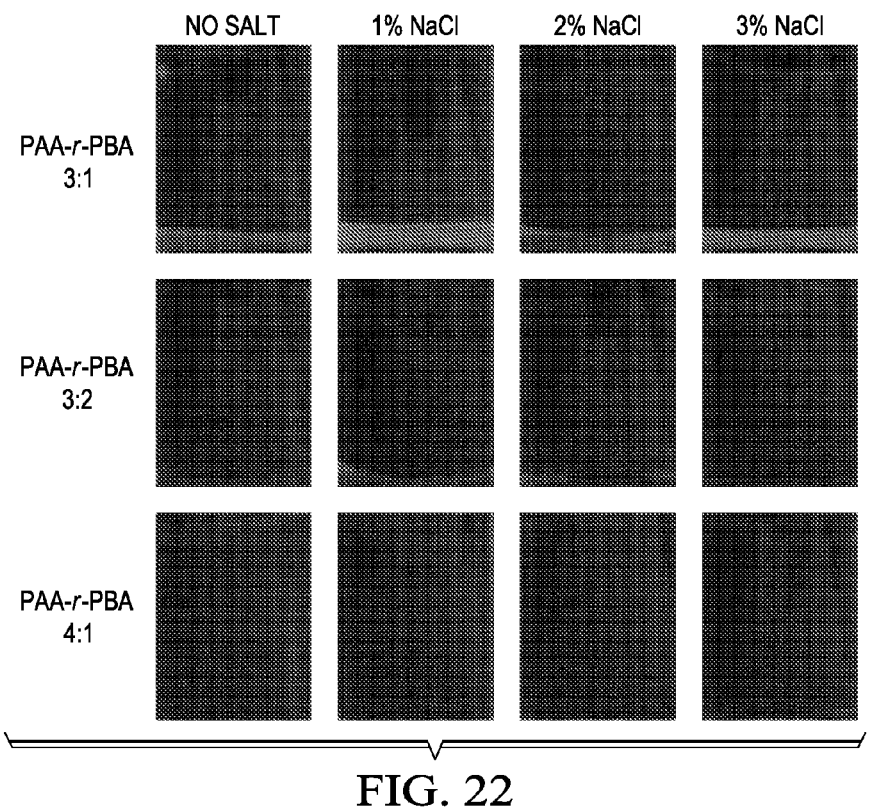
FIG. 22 is a photograph taken after 1 day of emulsions formed with equal volume fractions of dodecane and aqueous dispersion of 0.2 wt % random copolymer-coated iron oxide particles with different ratio of PAA-r-PBA at pH 8 without salt and with different salt levels.
Figure 23A:
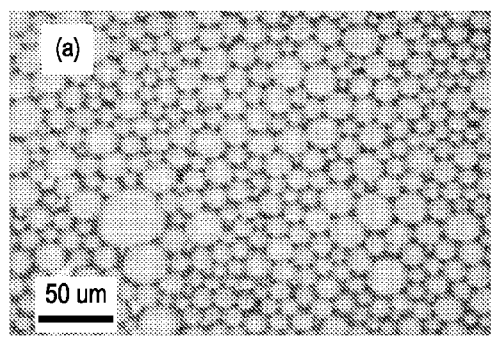
FIGS. 23A-23F show optical micrographs (taken immediately upon formation) of emulsion droplets formed at conditions in FIGS. 21A-21D: PAA-r-PBA (ratio 3:1), no salt (FIG. 23A), PAA-r-PBA (ratio 3:1), 3 wt % NaCl (FIG. 23B), PAA-r-PBA (ratio 3:2), no salt (FIG. 23C), PAA-r-PBA (ratio 3:2), 3 wt % NaCl (FIG. 23D), PAA-r-PBA (ratio 4:1), no salt (FIG. 23E), and PAA-r-PBA (ratio 4:1), 3 wt % NaCl (FIG. 23F).
Figure 23B:
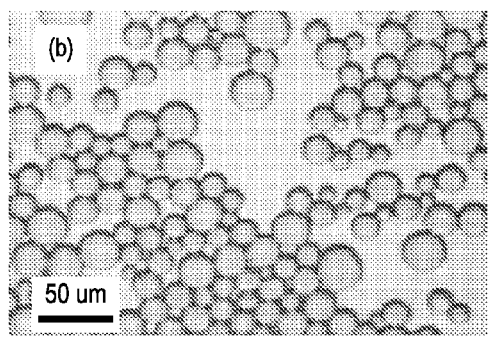
Figure 23C:
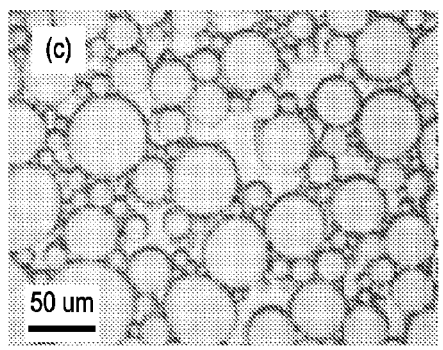
Figure 23D:
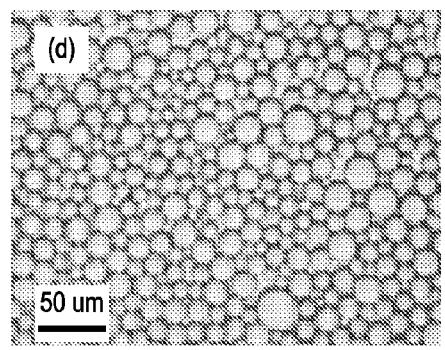
Figure 23E:
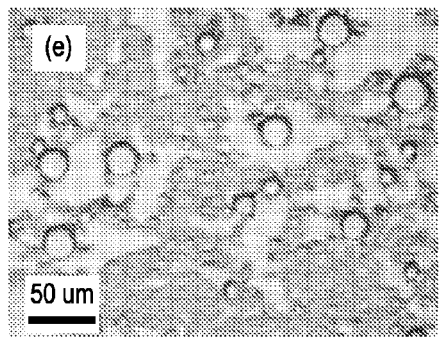
Figure 23F:
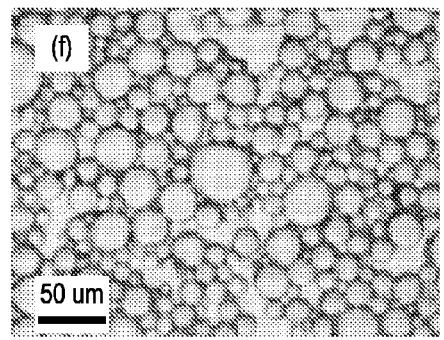

For the random copolymers with different ratios between hydrophobic and hydrophilic moieties, the key properties could be adjusted. Carboxylate complexes with the Fe atoms and chemisorbs at the iron oxide nanoparticle surface. Above a certain pH (~8 for the copolymer), the nanoparticle exposes negative charge to the solution and provides electrostatic stabilization. Also, Poly(butyl acrylate) groups give high interfacial activities between the oil and water. Overall, the random copolymer coating provides good salt tolerance for the magnetic nanoparticles because of high adsorption and large charge for electrosteric stabilization. There is still sufficient surface charge on the particles at high solution salinities (~3 wt % NaCl) at pH 8. FIG. 22 shows emulsions formed with equal volume fractions of dodecane and aqueous dispersion of 0.2 wt % random copolymer-coated iron oxide particles with different ratios of PAA-r-PBA at pH 8 without salt and with different salt levels. The photographs of emulsion formation were taken after 1 day. Optical micrographs (FIGS. 23A-23F) of emulsions formed are shown at conditions described in FIGS. 21A-21D. FIG. 23A shows PAA-r-PBA (ratio 3:1) with no salt, FIG. 23B shows PAA-r-PBA (ratio 3:1) with 3 wt % NaCl, FIG. 23C shows PAA-r-PBA (ratio 3:2) with no salt, FIG. 23D shows PAA-r-PBA (ratio 3:2) with 3 wt % NaCl, FIG. 23E shows PAA-r-PBA (ratio 4:1), with no salt; and FIG. 23F shows PAA-r-PBA (ratio 4:1) with 3 wt % NaCl. The optical micrographs were taken immediately after emulsion formation.

Example III

Poly(4-styrenesulfonic acid-co-maleic acid) Coated Nanoparticles for High Salt Tolerance The present inventors also studied the properties of the Poly(4-styrenesulfonic acid-co-maleic acid) coated iron oxide nanoclusters for exceptional salt tolerance (up to 8 wt % salt), higher than that achievable for acrylic-based polymers. The paramagnetic nanoparticles are coated with random copolymers (Saleh, Phenrat et al. 2005) of maleic acid and styrene sulfonic acid, which are suitable for achieving interfacial activities between oil and water. Generally, a random copolymer is usually inexpensive and relatively simple to synthesize. Overall, the method to synthesize the Poly(4-styrenesulfonic acid-co-maleic acid) coated iron oxide nanoclusters has advantages over other procedures in that it is a quick, inexpensive, and a one-step process which is highly reproducible.

Figure 24A:
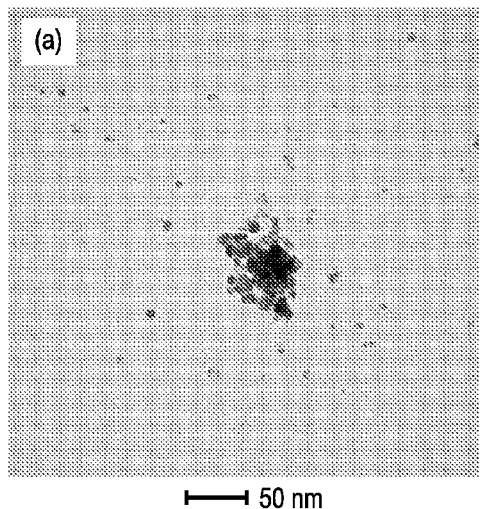
FIGS. 24A and 24B are transmission electron microscopy (TEM) images for Poly(4-styrenesulfonic acid-co-maleic acid) coated iron oxide nanoparticles with different ratio between 4-styrenesulfonic acid and maleic acid: 3:1 ratio (FIG. 24A) and 1:1 ratio (FIG. 24B).
Figure 24B:
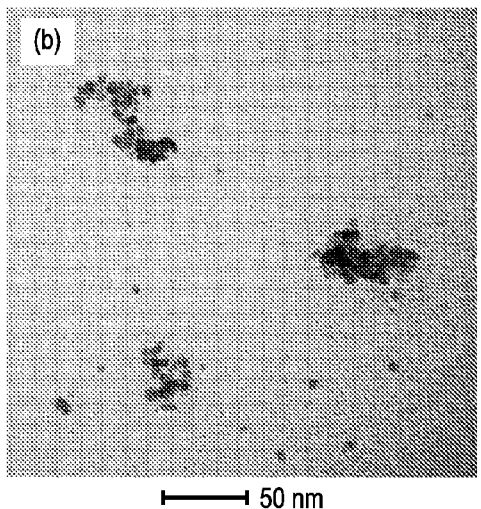
Figure 25:
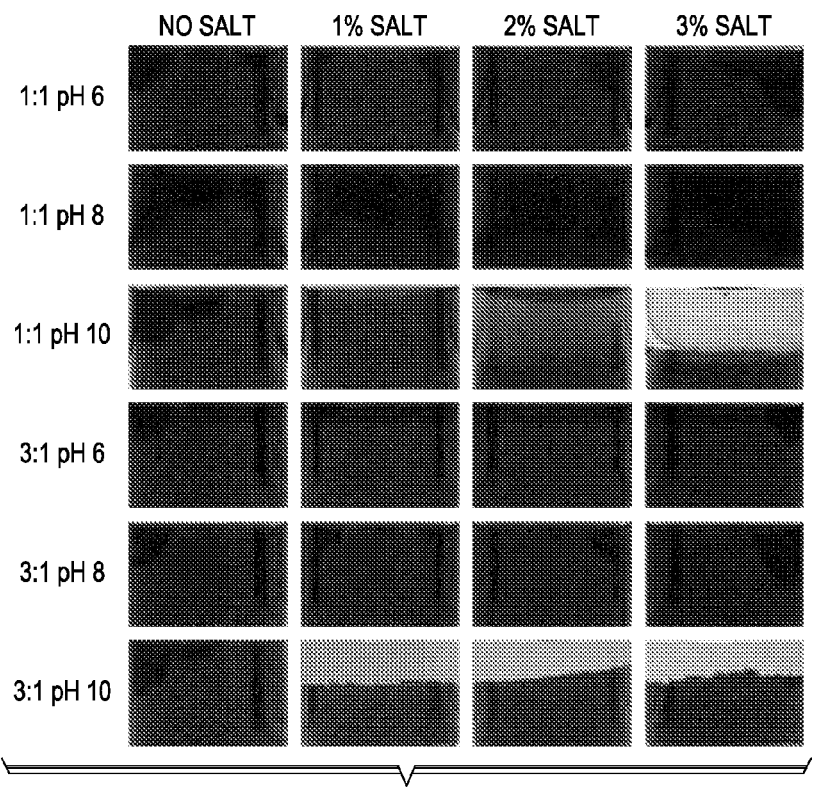
FIG. 25 shows a stability of 0.2 wt % Poly(4-styrenesulfonic acid-co-maleic acid) coated iron oxide nanoparticle dispersions at different pH and salinity values.
Figure 26A:
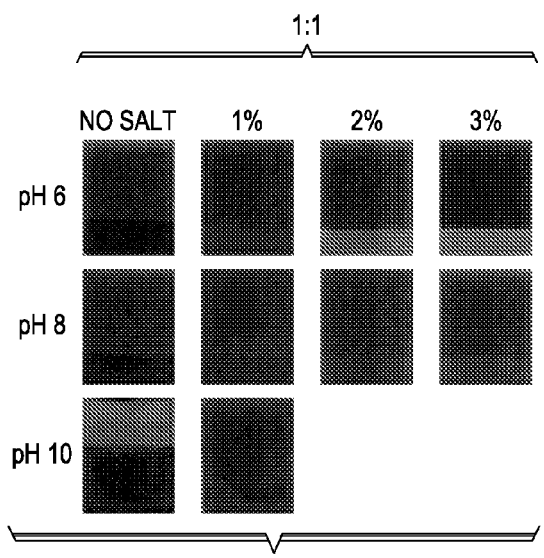
FIGS. 26A and 26B are dodecane in water emulsions stabilized by poly(4-styrenesulfonic acid-co-maleic acid) coated iron oxide nanoparticles at different pH and salinity values. The particle concentration in the dispersions was 0.2 wt %, and the volume ratio of dodecane and water: 1:1 ratio (FIG. 26A) and 3:1 ratio (FIG. 26B).
Figure 26B:
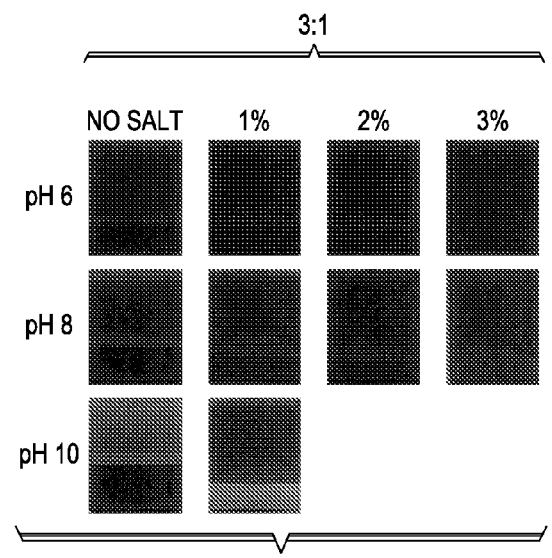

Aqueous dispersions of 0.2 wt % superparamagnetic iron oxide nanoclusters were stabilized with Poly(4-styrene-sulfonic acid-co-maleic acid) on the particle surface, with a high loading of 90% iron oxide. The dispersions were stable for months even with high salt concentrations up to 8 wt % at pH 6 and pH 8 based on the hydrodynamic diameter measurements from dynamic light scattering. The 4-styrenesulfonic acid and maleic acid groups provide sufficient electrostatic repulsion for high stability. The small size of the clusters, superparamagnetic properties, and high salt tolerance are highly beneficial for mapping of petroleum reservoirs with magnetomotive techniques. The TEM images for Poly(4-styrenesulfonic acid-co-maleic acid) coated iron oxide nanoparticles with different ratio between 4-styrenesulfonic acid and maleic acid: 3:1 ratio and 1:1 ratio are shown in FIGS. 24A and 24B, respectively. FIG. 25 shows the stability of 0.2 wt % Poly(4-styrenesulfonic acid-co-maleic acid) coated iron oxide nanoparticle dispersions at different pH and salinity values. Dodecane in water emulsions stabilized by Poly(4-styrenesulfonic acid-co-maleic acid) coated iron oxide nanoparticles at different pH and salinity values are shown in FIGS. 26A and 26B. The particle concentration in the dispersions was 0.2 wt %:1:1 4-styrenesulfonic acid and maleic acid ratio (FIG. 26A) and 3:1 ratio (FIG. 26B).

Example IV

Figure 27A:
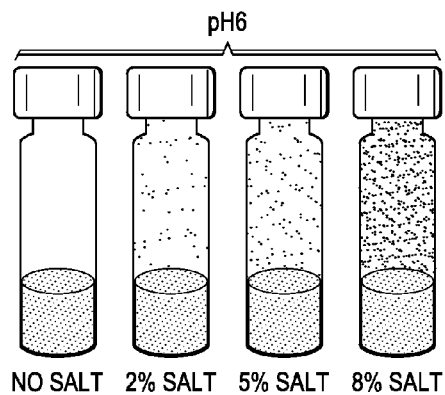
FIGS. 27A and 27B show the stability of 0.2 wt % poly(4-styrenesulfonic acid-co-maleic acid)+DTAB-coated iron oxide nanoparticle dispersions at different pH and salinity values: pH 6.0 (FIG. 27A) and pH 8.0 (FIG. 27B).
Figure 27B:
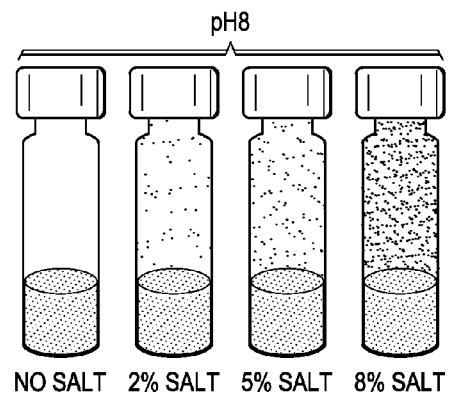
Figure 28A:
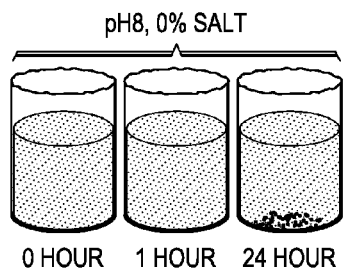
FIGS. 28A and 28B show dodecane in water emulsions stabilized by Poly(4-styrenesulfonic acid-co-maleic acid)+DTAB-coated iron oxide nanoparticles at pH 8.0 and different salinity values: 0% salt (FIG. 28A) and 8% salt (FIG. 28B).
Figure 28B:
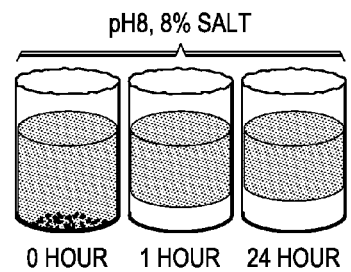

Poly(4-styrenesulfonic acid-co-maleic acid) Coated Nanoparticles with DTAB (decyltrimethyl ammonium bromide) DTAB In order to improve the stability and interfacial activity of the nanoparticle dispersion, the inventors added DTAB such that the cationic head group interacted with the carboxylate moieties. The DTAB also lowered the hydrophilicity of the particles by replacing COO— with hydrophobic ion paired tail groups. The inventors used this as a simple technique to determine the effect on the particle partitioning between oil and water phases and at the interface. This information is being used to design systems with copolymers. The DTAB greatly increased the interfacial activities and salt tolerance (up to 8 wt % NaCl) as shown in FIGS. 27A (pH 6) and 27B (pH 8). In these studies, the excess stabilizer was removed by centrifugation and re-dispersion in de-ionized (DI) water and the appropriate buffer. The less hydrophilic particles partitioned more strongly to the oil-water interface, as shown in the figure after 1 day. As the salinity increased, the particles partitioned out of the aqueous phase at pH 6 and 8. FIGS. 28A and 28B show dodecane in water emulsions stabilized by Poly(4-styrenesulfonic acid-co-maleic acid)+DTAB-coated iron oxide nanoparticles at different pH and salinity values. The particle concentration in the dispersions was 0.2 wt %. The emulsions were formed with probe sonication and the photographs were taken 1 day after the emulsions formation.

In addition to the frequency doubling, the phase shift between the imposed magnetic wave and the measured acoustic wave may be employed as a finger-printing parameter to detect particles adsorbed at oil/water, gas/water or CO2/water interfaces. Interfacial fluctuation due to particle oscillation is elastic with restoring force, while the bulk fluid fluctuation due to particle oscillation is viscous and dissipative. The inventors describe novel techniques for acoustic response measurements: (i) use of PS-OCT for rock displacement measurements; and (ii) use of polyvynilidene fluoride (PVDF) film sensor or fiber Bragg grating sensor for rock stress measurements. These sensors have properties suitable for this research: a low working frequency (0.001-100 Hz), high sensitivity (0.0103 V/N), and a low acoustic impedance close to water. The inventors measured rock stress responses from rock samples and from sandpack samples imbedded between Boise sandstone cores. The inventors measured rock displacement responses from sandpack samples imbedded between Boise sandstone cores and from rock samples.

Example V

Figure 29:
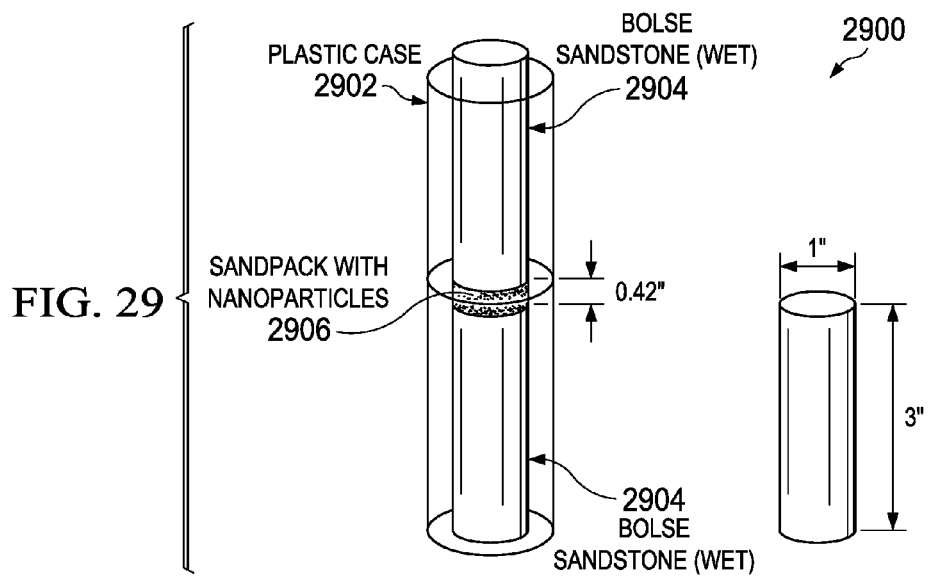
FIG. 29 is a schematic showing a geometry of a sandpack holder and the rock cores in contact with the sandpack. By measuring the acoustic responses at different locations along the side of the upper rock core or by measuring the vertical displacement response at the top surface of the upper core, the acoustic response from a small volume of nanoparticle-containing fluids imbedded in a rock sample is simulated.

Measurements of Rock Displacement Response from Sandpack Sample Imbedded Between Boise Sandstone Cores The nanoparticle sample comprised a 1.0 wt % Poly(4-styrenesulfonic acid-co-maleic acid) coated iron oxide nanoparticles (mean diameter: 120 nm, magnetization: 64 emu/g) in de-ionized (DI) water. A 0.5 wt % nanoparticle dispersion ("solution") was prepared by adding same amount of DI water to 1.0 wt % solution. An emulsion was made from dodecane and 1.0 wt % solution at a 50:50 volume ratio using a ultrasonic sonifier (Branson Ultrasonics). The sandpack sample was prepared from Boise sandstone rock pieces by crushing them. Overall individual grain diameter is around 0.4 mm. A sandpack holder 2900 was designed to accommodate a point source of acoustic pressure placed in between two rock cores. It comprises two Boise sandstone rock cores (designated as 2904) and sandpack 2906 placed between them (FIG. 29). The holder is encased in a plastic case 2902. Each side of the rock core was coated with epoxy to prevent diffusion of nanoparticle samples into the rock cores, and was fully saturated with water.

Two different magnetic fields, sinusoidal (4 Hz, 4000 Gauss peak to peak) and pulsed, were applied. Pulsed magnetic field was a DC magnetic field with intensity of more than 2 Tesla and time duration of 1 ms. Pulse was generated from a custom built magnetic pulser.

The 1.0 wt % solution and the emulsion were used to test their basic response with applied magnetic field. Displacement of each interface, air/water and air/emulsion, was measured by the procedure as previously described.

Figure 30A:
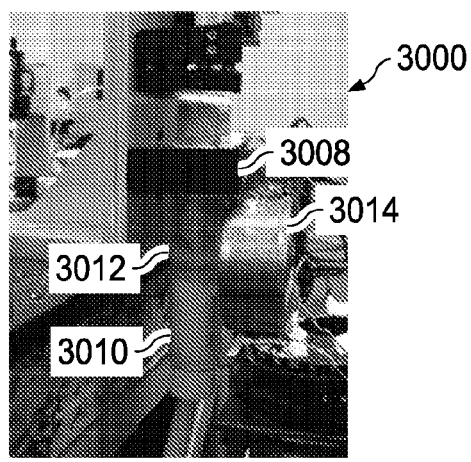
FIGS. 30A and 30B show a photograph (FIG. 30A) and a schematic diagram of a study setup (FIG. 30B).
Figure 30B:
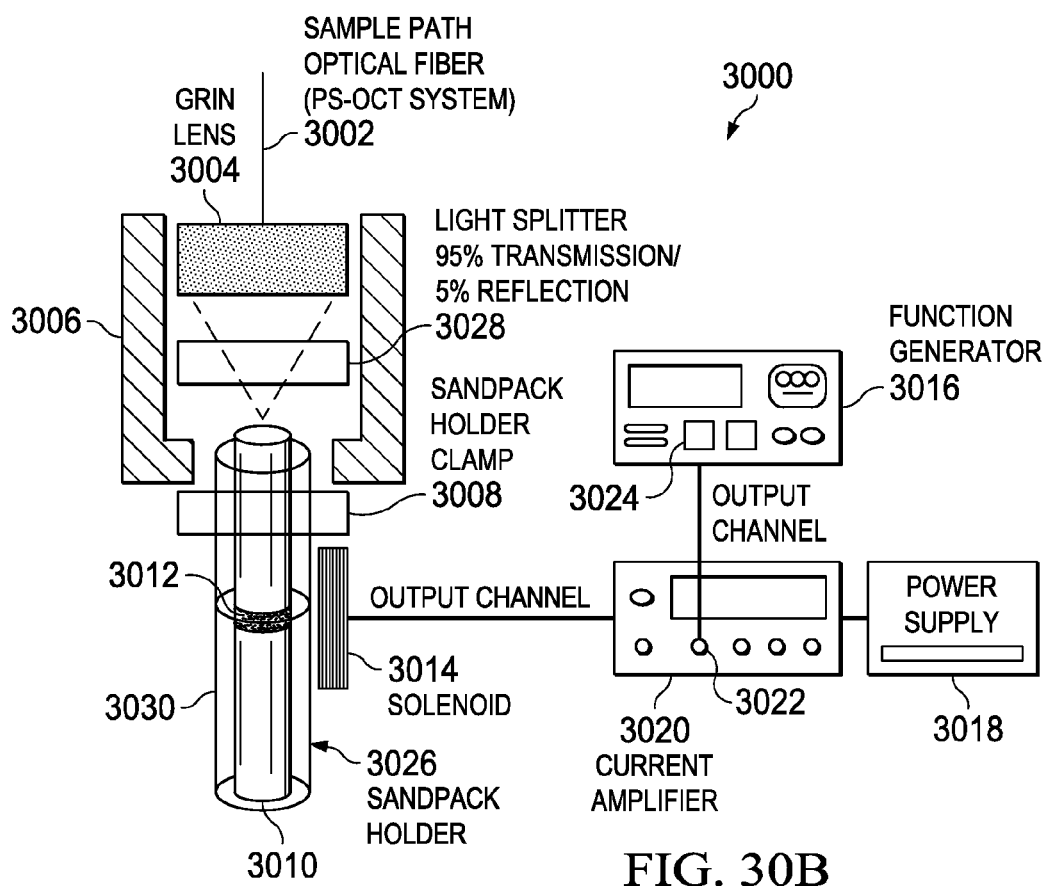

Measurement of rock displacement response from sandpack sample holder: After 8 grams of sandpack was put into the gap in the sandpack sample holder, the sandpack sample was wetted with 4 ml of 1.0 wt % nanoparticle solution. The sandpack sample holder was located at the place where PS-OCT light was focused fixed by a clamp. The center of the solenoid coil was placed at the side of the sandpack sample. Immediately after application of the magnetic field, the displacement of the top surface of the upper core was measured over a 4 second time duration. FIGS. 30A and 30B show a photograph and a diagram of the system 3000, which comprises: (i) a PS-OCT holder 3006; (ii) a sandpack holder 3026 is attached to a sandpack holder clamp 3008 that is placed close to the holder 3006; (iii) an electromagnetic solenoid 3014, which generates the magnetic field of a prescribed schedule of strength vs. time; and (iv) a phase sensitive optical coherence tomography (PS-OCT) measurement system that measures the displacement of the core sample in response to the imposed magnetic field, comprising a sample path optical fiber (PS-OCT) 3002 in communication with a gradient index (GRIN) lens 3004. The laser beam from the optical fiber 3002 is focused through lens 3004 and passes through a light splitter 3028 that allows for 95% transmission and 5% reflection. Sandpack holder 3026 is designed to hold the sandpack as a point source of acoustic pressure. It comprises two Boise sandstone rock cores (designated as 3010) and sandpack 3012 placed between them (FIG. 29). The holder is encased in a plastic case 3030. The system 3000 also comprises a power supply source 3018. The solenoid 3014 located at the side of the nanoparticle-containing sandpack 3012 generates the magnetic field, and the rock displacement resulting from the oscillations of the paramagnetic nanoparticles is measured at the top surface of the upper rock core by the PS-OCT (3002, 3004, and 3028). A current amplifier 3020 with one or more output channels is connected to the power supply source 3018. A function generator 3016 is connected through 3024 to a second output channel 3022 of the current amplifier 3020. Three additional PS-OCT measurements were recorded as above with two other nanoparticle samples and DI water.

Figure 31A:
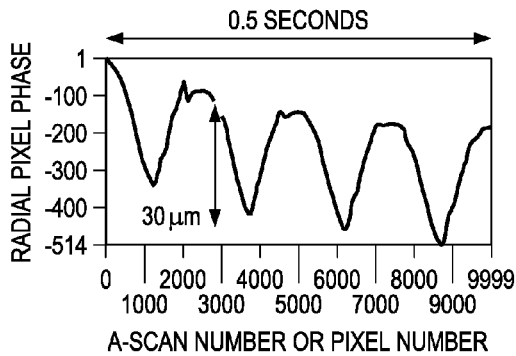
FIGS. 31A and 31B show a displacement as measured by PS-OCT of an air/water interface (FIG. 31A) and an air/emulsion interface (FIG. 31B).
Figure 31B:
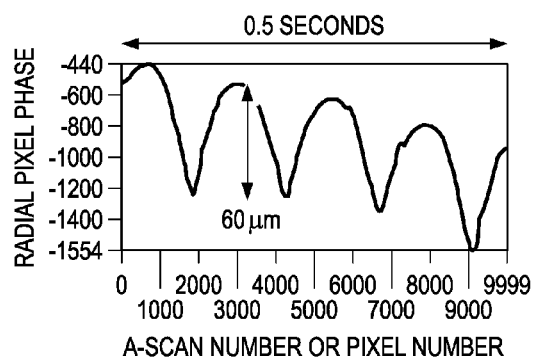
Figure 32A:
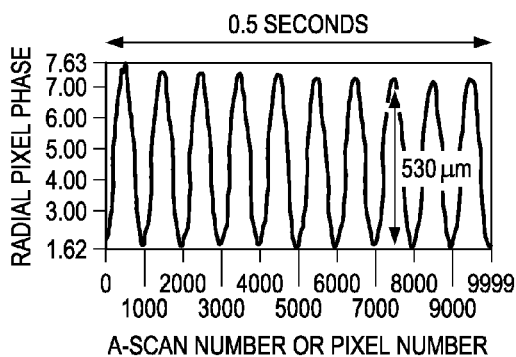
FIGS. 32A-32D show rock displacement signals from a sandpack sample wetted with: 1.0 wt % nanoparticle dispersion ("solution") (FIG. 32A), 0.5 wt % solution (FIG. 32B), emulsion (FIG. 32C), and DI water (FIG. 32D).
Figure 32B:
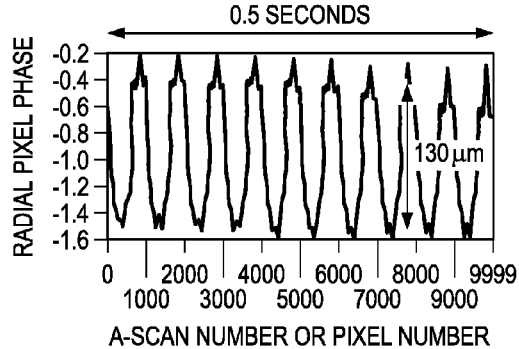
Figure 32C:
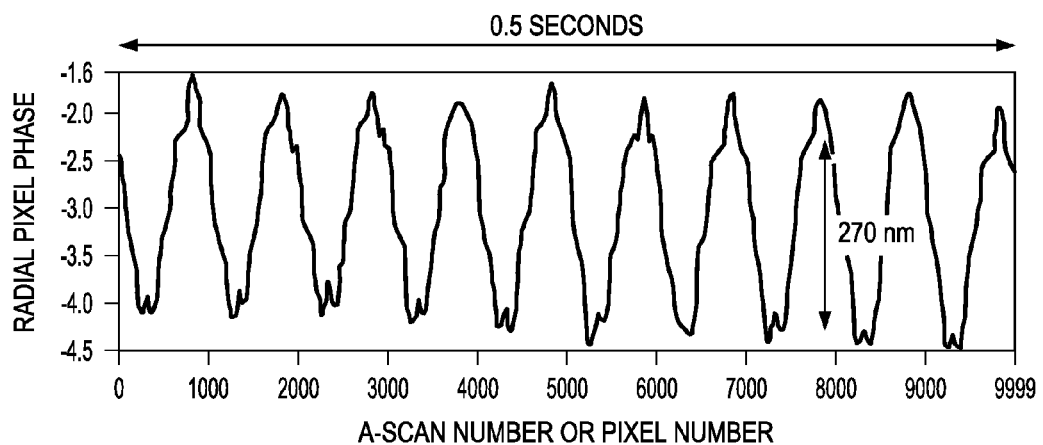
Figure 32D:
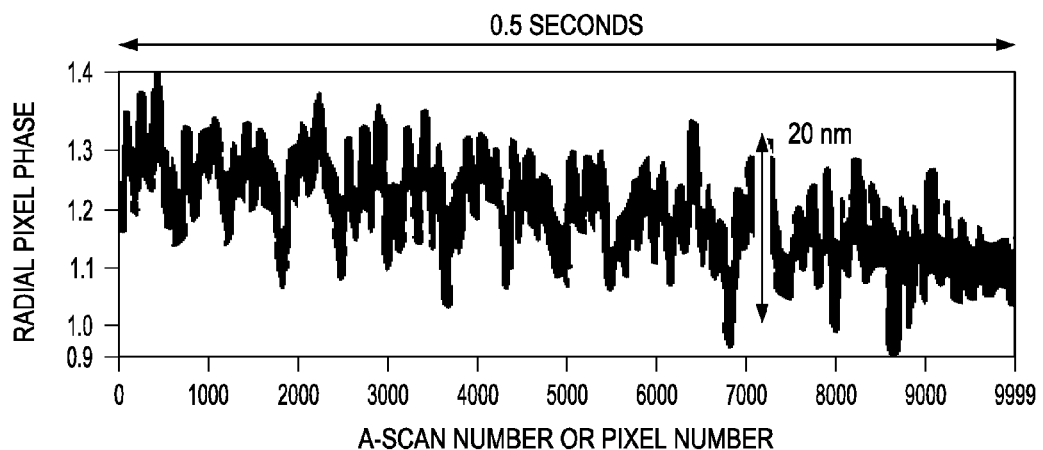

Measurement of displacement of air/nanoparticle-sample interfaces: FIGS. 31A and 31B show a comparison of the PS-OCT measured interfacial displacements of a 1.0 wt % solution and emulsion, respectively. The displacement of the emulsion is two times larger than that of the 1.0 wt % solution although nanoparticle concentration in the emulsion was 0.5 wt % (as dodecane and 1.0 wt % solution were mixed at 50:50 ratio). Frequency and magnitude of applied magnetic field were 4 Hz and 780 gauss peak to peak.

Figure 34:
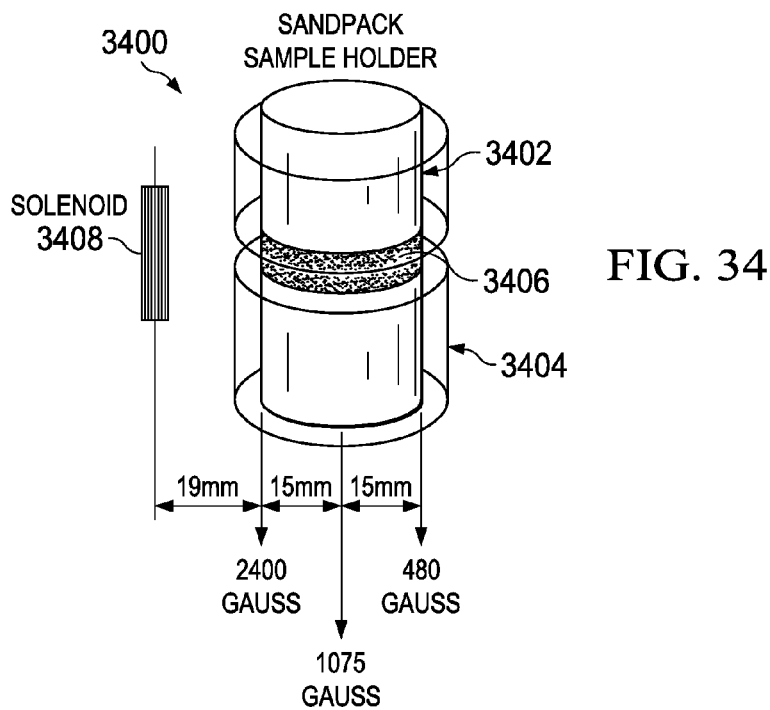
FIG. 34 shows a magnetic field strength measured at three different positions from the solenoid.

Measurement of rock displacement response from the sandpack sample: FIGS. 32A-32D illustrate recorded rock displacement signals from the sandpack sample, measured by PS-OCT. Note that the rock displacement from the sandpack sample wet with emulsion is about two times larger than from the sandpack sample wet with 0.5 wt % solution. Applied magnetic field was 10 Hz and the field strength was measured by a magnetic Hall sensor (Magnetometer, AlphaLab Inc., USA) at different positions of the sandpack sample 3400 as shown in FIG. 34. Sandpack sample 3400 comprises two Boise sand stone rock cores (designated as 3402) and sandpack 3406 placed between them. The holder is encased in a plastic case 3404. The magnetic field applied for testing was achieved by the use of solenoid 3408 that generates the magnetic field: (i) at the edge of the bottom surface of the lower rock core that is closest to the solenoid; (ii) at the center of the bottom surface; and (iii) at the bottom surface edge that is farthest from the solenoid.

Figure 33A:
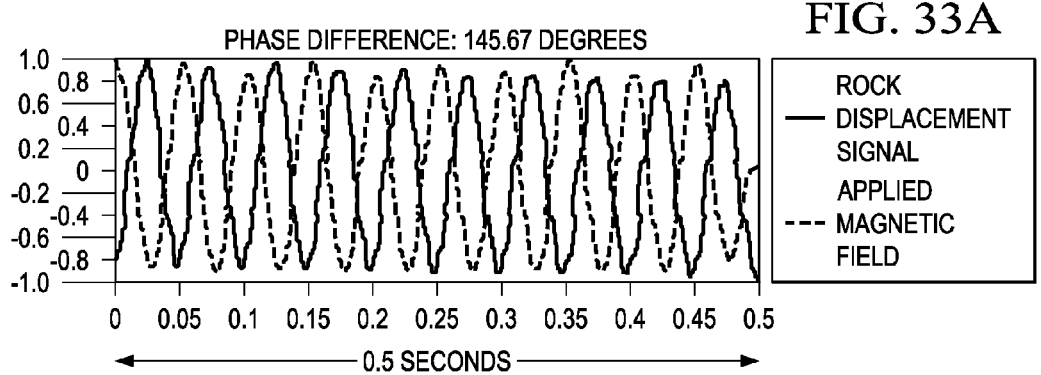
FIGS. 33A-33C show phase differences between a doubled applied magnetic field and a rock displacement signal from a sandpack sample wetted with: 1.0 wt % solution (FIG. 33A), emulsion (FIG. 33B), and 0.5 wt % solution (FIG. 33C).
Figure 33B:
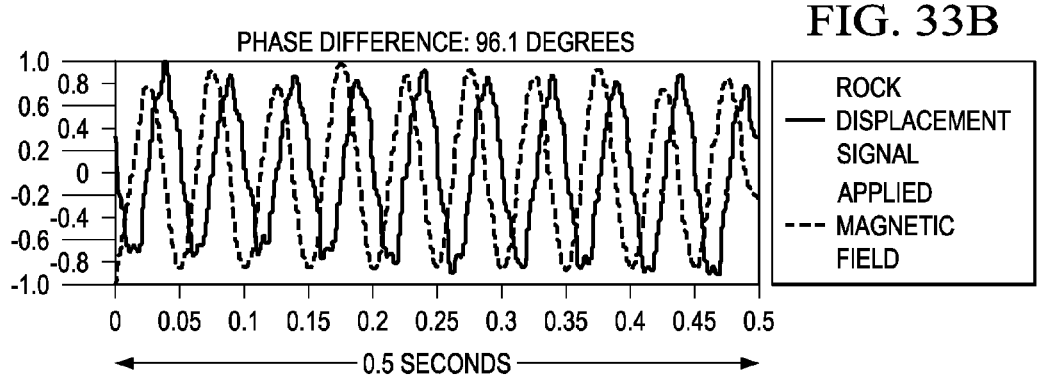
Figure 33C:
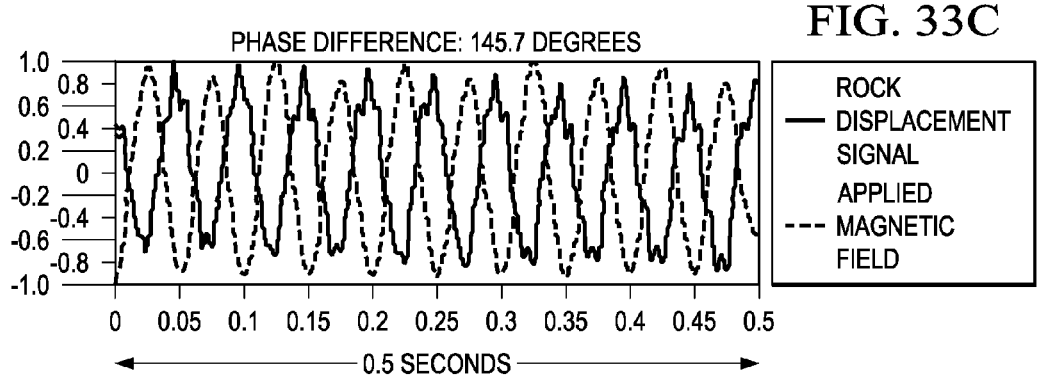

Phase differences between measured rock displacement signal and applied field, were calculated by the following signal process procedure, and are displayed in FIGS. 33A-33C: (i) compute frequency doubled applied field by squaring measured magnetic field; (ii) display measured rock displacement signal together with the frequency-doubled applied field; (iii) compute FFT of the measured displacement signal (includes all frequency components); (iv) find phase of the frequency-doubled (20 Hz) signal component; (v) compute FFT of the frequency doubled applied field (obtained by squaring applied field) and obtain phase of the frequency doubled field; and (vi) subtract phase of frequency doubled signal from the phase of frequency doubled applied signal to give the phase delay between the applied field wave and the measured displacement wave.

Phase difference from the case wetted with emulsion was distinguished from the cases wetted with 1.0 wt % and with 0.5 wt %. It may be due to the elastic oscillation of nanoparticles adsorbed at oil/water interfaces in emulsion.

Figure 35A:
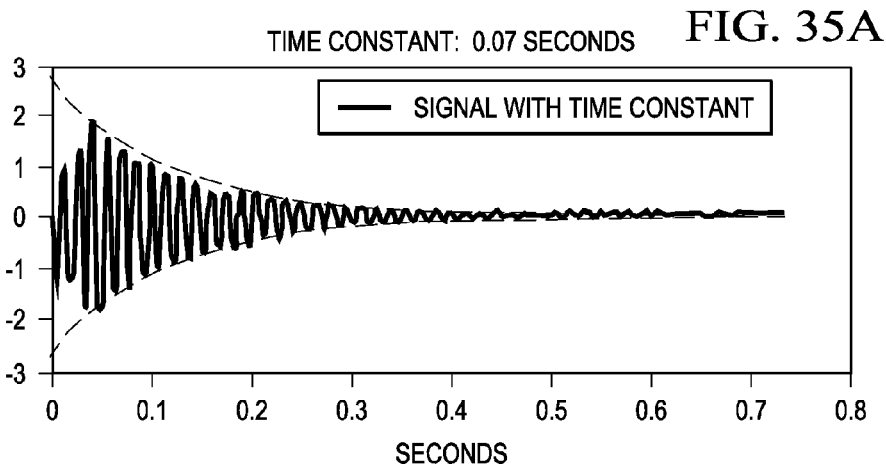
Figure 35B:
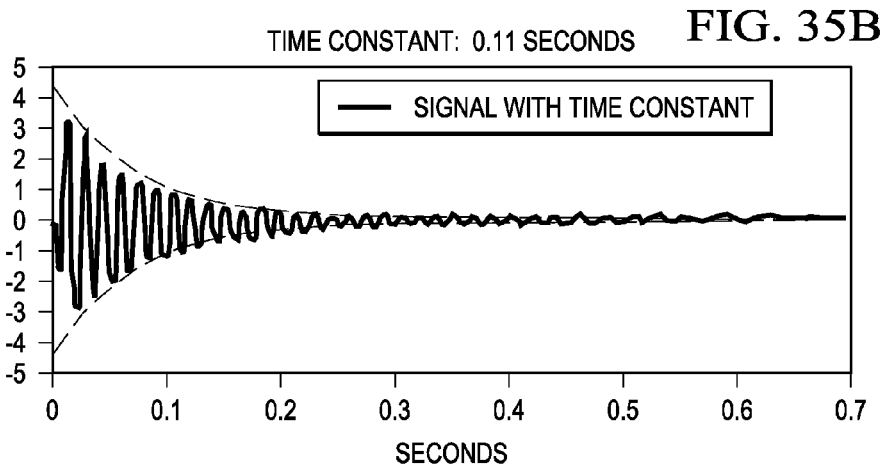

Recorded rock displacements from sandpack samples, measured by PS-OCT, are shown in FIGS. 35A-35C. Time constant of the signal was calculated to show how fast signal decays. Time constant is the time required for a physical quantity to fall to 36.8% of its initial value. In the study described hereinabove, a sandpack sample filled with emulsion showed bigger displacement response compare to the sandpack sample filled with 0.5 wt % nanoparticle solution. This indicates that an oil/water interface with nanoparticles can generate a stronger acoustic signal than nanoparticle dispersion and there is possibility for calculated phase difference and time constant to be another fingerprint to detect oil in reservoir rock.

Example VI

Measurements of Rock Displacement Response from Rock Sample

The nanoparticle sample comprised a Poly(acrylic acid) 114-b-Poly(butyl acrylate)B block copolymer coated iron oxide nanoparticles in DI water. Boise sandstone (BS) rock core was presented as a typical example of an oil reservoir rock. The rock core was 6" long and 1" in diameter. Two samples were prepared: (i) a rock core (L1) that had been initially flooded with 0.5 wt % nanoparticle solution and then flushed with nanoparticle-free water; and (ii) another rock core (L2) with oil and flooded with 0.5 wt % nanoparticle solution, and subsequently flushed with nanoparticle-free water. Retention of nanoparticles on rock surfaces was 53.4% in L1 and 72.3% in L2, after post flushing with water.

BS rock core was fixed by a clamp as described previously in Example V and rock displacement was measured by PS-OCT after application of a magnetic field. Two different magnetic fields, sinusoidal (4 Hz, 4000 Gauss peak to peak) and pulsed, were applied in turns. FIGS. 36A and 36B show a photograph and a schematic diagram of the system 3600, which comprises: (i) a PS-OCT holder 3608; (ii) a 6" long BS rock core 3610 that is placed close to the holder 3608 via a clamp 3630; (iii) an electromagnetic solenoid 3612, which generates the magnetic field of a prescribed schedule of strength vs. time; and (iv) a phase sensitive optical coherence tomography (PS-OCT) measurement system that measures the displacement of the core sample in response to the imposed magnetic field and comprises a sample path optical fiber (PS-OCT) 3602 in communication with a gradient index (GRIN) lens 3604. The laser beam from the optical fiber 3602 is focused through lens 3604 and passes through a light splitter 3606 that allows for 95% transmission and 5% reflection. The solenoid (3612) located at the side of the nanoparticle-containing rock core sample (3610) generates the magnetic field, and the rock displacement resulting from the oscillations of the paramagnetic nanoparticles is measured at the top surface of the rock core by the PS-OCT (3602, 3604, and 3606). The system 3600 also comprises a power supply source 3616. A current amplifier 3620 with a plurality of output channels is connected to the power supply source 3616. A function generator 3614 is connected through 3624 to a second output channel 3622 of the current amplifier 3620.

Figure 37A:
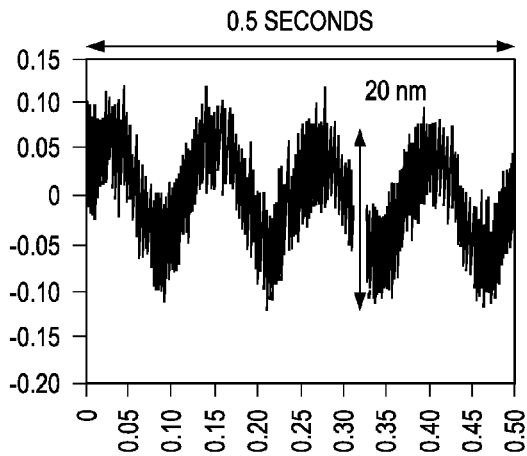
FIGS. 37A and 37B show the displacement: of a rock core with 0.5 wt % nanoparticle solution (FIG. 37A), and of a rock core with 0.5 wt % nanoparticle solution and oil (FIG. 37B) under a sinusoidal magnetic field.
Figure 37B:
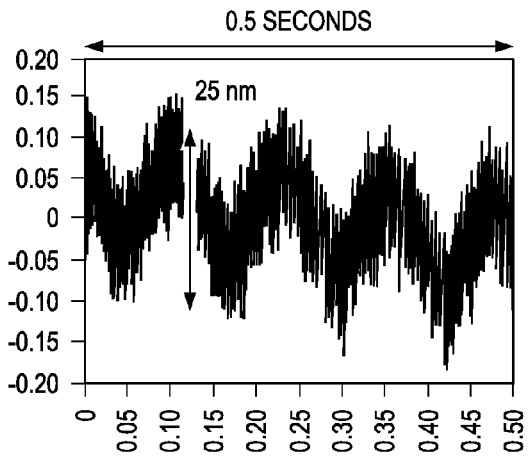
Figure 38A:
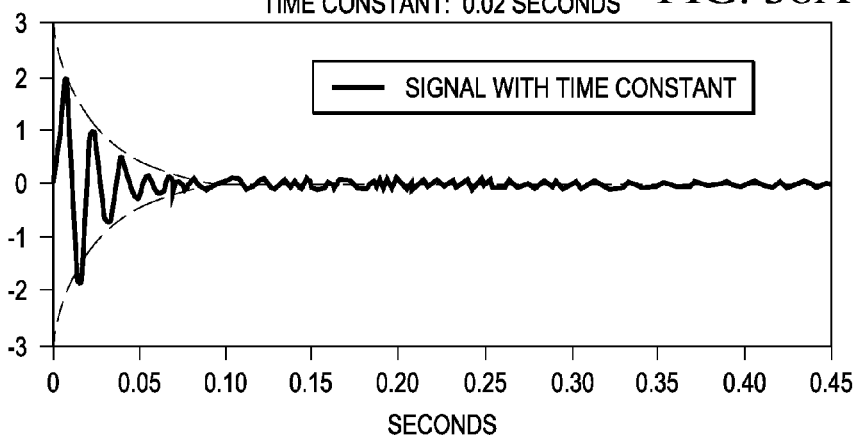
FIGS. 38A and 38B show displacements: of a rock core with 0.5 wt % nanoparticle solution (FIG. 38A), and of a rock core with 0.5 wt % nanoparticle solution and oil (FIG. 38B) under a pulsed magnetic field.
Figure 38B:
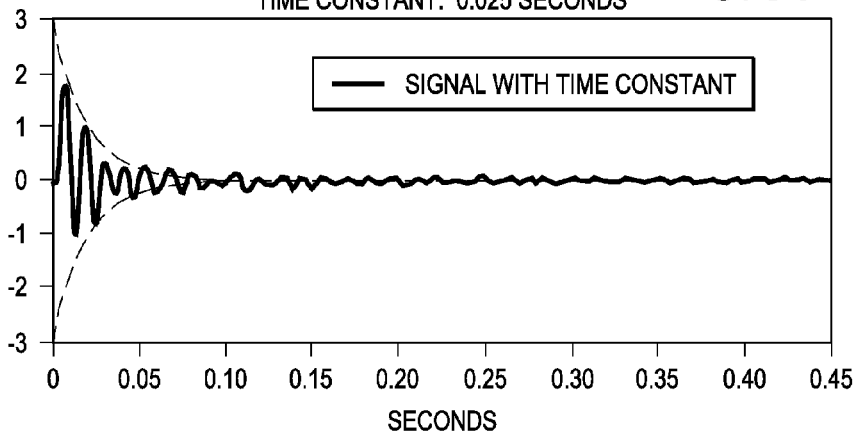

FIGS. 37A and 37B show the measured rock core displacement in response to the sinusoidal magnetic field. The figure shows that the displacement of rock core with nanoparticle solution and oil (L2) (FIG. 37B) was larger than that of rock core with nanoparticle solution only (L1) (FIG. 37A). FIGS. 38A and 38B illustrate the measured rock core displacement by PS-OCT with pulsed magnetic field. Time constant was calculated from both rock cores, and showed consistency with the result from the sandpack samples described above. The study presented above shows that the displacement of a rock core with oil and water is larger than that of a rock core with water only. Therefore, nanoparticle adsorption at oil/water interfaces needs to be maximized while retention on rock surfaces minimized.

Embodiments of the present invention provide for the detection of the oil/water menisci in reservoir rock indicating the presence of oil. By injecting paramagnetic particles that adsorb only on the oil/water interface (meniscus), and by detecting the density wave generated by their oscillation, their presence in the reservoir rock can be determined.

Somewhat similar hydrocarbon-detection methods, which neither recognizes the presence of oil/water menisci, nor uses paramagnetic nanoparticles, have been proposed by Thompson et al. (1999) and others. In those methods, an electromagnetic oscillation is applied to the reservoir zone, and the seismic response due to the pore fluid oscillation is detected with sensitive geophones. The supporting theory for the methods has been developed by Pride (1994). Because these methods are proposed for oil exploration and the governing frequencies are of seismic domain with wavelength in kilometers, the methods' resolution for oil detection is believed to be of similar length scale. As briefly described above, for the detection of paramagnetic nanoparticles sent to the target human tissue, combination of MRI and ultrasound scanning is being employed (Oh et al. 2006; Norton and Vo-Dinh 2007). Because the MRI and ultrasound probes are intended to image microscopically localized areas, they employ frequencies in the mega-Hz range or higher, and their probing depth is not deep.

In addition to the above magnetic-acoustic combination method, just as the medical applications of the functionalized magnetic nanoparticles (Ito et al. 2005), the basic concept of the magnetic nanoparticle adsorption at the oil/water meniscus could be utilized to enhance the capabilities of the MRI scanning of rock core samples (Chen et al. 2006; Sheppard et al. 2003) and the NMR logging (Dunn et al. 2002). The spectrometric measurements of the effects of the paramagnetic nanoparticle adsorption on the NMR relaxation time (T1, T2) could help better determine the oil saturation in the reservoir rock. This could be done in the manner to quantify the effects of rock surface wettability on the relaxation time (Zhang et al. 2000).

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

U.S. Pat. No. 7,170,294: Subsurface Imagery for Temperature Measurement and Fluid Flow for Oil Recovery using Electromagnetic Impedance Tomography (EMIT).

U.S. Pat. No. 4,769,602: Determining Multiphase Saturations by NMR Imaging of Multiple Nuclides.

U.S. Patent Application No. 20090167302: Time-Lapsed Diffusivity Logging for Monitoring enhanced Oil Recovery.

Adkins, S. S., Gohil, D., Dickson, J. L., Webber, S. E., and Johnston, K. P., "Water-in-Carbon Dioxide Emulsions Stabilized with Hydrophobic Silica Particles", Phys. Chem. Chem. Phys., 9, 1-11 (2008).

Adler, D. C., R. Huber and J. G. Fujimoto: "Phase-Sensitive Optical Coherence Tomography at up to 370,000 Lines per Second Using Buffered Fourier Domain Mode-Locked Lasers", Optics Letters, 32, 626-628 (2007).

Arney, D. S., Baran, J. R., Siedle, A. R., and Frey, M. H., "Nanomaterials", in Encyclopedia of Chemical Processing, 1803-1812, Taylor & Francis (2006).

Bashtovoi, V., P. Kuzhir and A. Reks: "Capillary Ascention of Magnetic Fluids", J. Magnetism and Magnetic Materials, 252, 265-267 (2002).

Binks, M., "Particles as Surfactants—Similarities and Differences", Current Opinion in Colloids Interface Sci., 7, 21-41 (2002).

Binks, B. P., and Horozov, T. S., "Colloidal Particles at Liquid Interfaces: An Introduction", in Colloidal Particles at Liquid Interfaces, Chapt. 1, Binks, B. P., and Horozov, T. S., eds., 1-74, Cambridge Univ. Press (2006).

Binks, B. P., and Lumsdon, S. O., "Influence of Particle Wettability on the Type and Stability of Surfactant-Free Emulsions", Langmuir, 16, 8622-8631 (2000).

Bourgeat-Lami, E., and Duguet, E., "Polymer Encapsulation of Inorganic Particles", in Functional Coatings by Polymer Microencapsulation, Chapt. 4, Gosh, S. K., ed., 85-152, Wiley-VCH Verlag (2006).

Bresme, F. and M. Oettel: "Nanoparticles at fluid interfaces". J. Phys.: Condensed Matter, 19: 413101 (2007).

Chen, Q., Rack, F. R., and Balcom, B. J., "Quantitative Magnetic Resonance Imaging Methods for Core Analysis", New Techniques in Sediment Core Analysis, Geol. Soc. London Spec. Pub., 267, Rothwell, R. G., ed., 193-207 (2006).

Dey, T., and O'Connor, C. J., "Synthesis of Polymer-coated Nanoparticles", Proc. NSTI Nanotech, vol. 2, 13-16 (2005).

Dickson, J. L., Binks, B. P., and Johnston, K. P., "Stabilization of Carbon Dioxide-in-Water Emulsions with Silica Nanoparticles", Langmuir, 20, 7976-7983 (2004).

Dunn, K.-J., Bergman, D. J., and Latorraca, G. A., Nuclear Magnetic Resonance Petrophysical and Logging Applications, Handbook Geophysical Exploration, 32, Pergamon (2002).

Gupta, A. K. and M. Gupta: "Synthesis and surface engineering of iron oxide nanoparticles for biomedical applications" Biomaterials 26 3995-4021 (2005).

Hilpert, M., Jirka, G. H., and Plate, E. J., "Capillary-Induced Resonance of Oil Blobs in Capillary Tubes and Porous Media", Geophysics, 65(3), 874-883 (2000).

Hilpert, M.: "Capillarity-induced resonance of blobs in porous media: Analytical solutions, Latice-Boltzmann modeling, and blob mobilization", J. Colloid Interface Sci., 309, 493-504 (2007).

Huh, C.: "Improved Oil Recovery by Seismic Vibration: A Preliminary Assessment of Possible Mechanisms," SPE 103870 presented at First Intern. Oil. Conf. Mexico, Cancun, Mexico, August 2006.

Ito, A., Shinkai, M., Honda, H., and Kobayashi, T., "Review: Medical Application of Functionalized Magnetic Nanoparticles", J. Biosci. Bioeng., 100(1), 1-11 (2005).

Joo, C., T. Akkin, B. Cense, B. H. Park and J. F. de Boer: "Spectral-Domain Optical Coherence Phase Microscopy for Quantitative Phase-Contrast Imaging", Optics Letters, 30, 2131-2133 (2005).

Kralchevsky, P. A., Ivanov, I. B., Ananthapadmanabhan, K. P., and Lips, A., "On the Thermodynamics of Particle-Stabilized Emulsions: Curvature Effects and Catastrophic Phase Inversion", Langmuir, 21, 50-63 (2005).

Kuranov, R., A. McElroy, N. Kemp, S. Baranov, J. Taber and T. E. Milner: "Gas-Cell Referenced Swept Source Phase Sensitive Optical Coherence Tomography", paper to appear in Optics Letters, (2009).

Lavrova, O., G. Matthies, T. Mitkova, V. Polevikov and L. Tobiska. "Numerical treatment of free surface problems in ferrohydrodynamics", J. Phys.: Condens. Matter. 18 (2006) S2657-2669.

Li, X., Zhong, L., and Pyrak-Nolte, L. J., "Physics of Partially Saturated Porous Media Residual Saturation and Seismic-Wave Propagation", Annual Rev. Earth Planet. Sci., 29, 419-460 (2001).

Li, Y., Wang, Y., Pennell, K., and Abriola, L., "Investigation of the Transport and Deposition of Fullerene (C60) Nanoparticles in Quartz Sands under Varying Flow Conditions", Environ. Sci. Tech., 42, 7174-7180 (2008).

Lu, A.-H., Salabas, E. L., and Schuth, F., "Magnetic Nanoparticles: Synthesis, Protection, Functionalization, and Application", Angew. Chem. Int. Ed., 46, 1222-1244 (2007).

Miksis, M. J., "Effects of Contact Line Movement on the Dissipation of Waves in Partially Saturated Rocks", J. Geophys. Res., 93(B6), 6624-6634 (1988).

Moridis, G. J., Borglin, S. E., Oldenburg, C. M. and Becker, A.: 1998, Theoretical and Experimental Investigations of Ferrofluids for Guiding and Detecting Liquids in the Subsurface, Lawerence Berkeley National Laboratory Report LBL-41069, Berkeley, Calif.

Norton, S. J., and Vo-Dinh, T., "Imaging the Distribution of Magnetic Nanoparticles with Ultrasound", IEEE Trans. Medical Imaging, 26(5), 660-665 (2007).

Oh, J., M. D. Feldman, J. Kim, C. Condit, S. Emelianov and T. E. Milner: "Detection of magnetic nanoparticles in tissue using magneto-motive ultrasound", Nanotechnology, 17, 4183-4190 (2006).

Oldenburg, C. M., S. E. Borglin and G. J. Moridis: "Numerical Simulation of Ferrofluid Flow for Subsurface Environmental engineering Applications," Transport in Porous Media, 38, 319-344 (2000).

Pierce, M. C., B. H. Park, B. Cense and J. F. de Boer: "Simultaneous Intensity, Birefringence, and Flow Measurements with High-Speed Fiber-Based Optical Coherence Tomography," Optics Letters, 27, 1534-1536 (2002).

Polevikov, V. and L. Tobiska: "Instability of Magnetic Fluid in a Narrow Gap between Plates," J. Magnetism and Magnetic Materials, 289, 379-381 (2005).

Pride, S. R.: "Governing Equations for the Coupled Electromagnetics and Acoustics of Porous Media," Phys. Rev. B, 50(21), 15678-15696 (1994).

Prodanović, M. and S. L. Bryant: "A Level Set Method for Determining Critical Curvatures for Drainage and Imbibition," J. Colloid Interface Sci., 304, 442-458 (2006).

Prodanović, M. and S. L. Bryant: "Resolving Meniscus Movement within Rough Confining Surfaces via the Level Set Method," in Focus on Water Resource Research (in press), ed. E. Haikkinen. (ISBN 978-1-60456-093-0), Nova Science Publ., Hauppage, N.Y. (2008).

Prodanović, M. and S. L. Bryant: "Physics-driven interface modeling for drainage and imbibition in fractures," SPE Journal, to appear, SPE paper 110448 (2009).

Prodanović, M. Level Set Method based Progressive Quasi-Static (LSMPQS) software. Code and documentation available from http://users.ices.utexas.edu/~masha/lsmpqs/index.html (website active on Jun. 29, 2009).

Roberts, P. M., Esipov, I. B., and Majer, E. L., "Elastic Wave Stimulation of Oil Reservoirs: Promising EOR Technology?", The Leading Edge, 448-453, May 2003.

Rodriguez, E., M. Roberts, H. Yu, C. Huh and S. L. Bryant: "Enhanced Migration of Surface-Treated Nanoparticles in Reservoir Rock," SPE 124418 presented at SPE Annual Tech. Conf., New Orleans, La., October 2009.

Rosensweig, R. E.: Ferrohydrodynamics (2nd ed.), Dover Publ, Mineola, N.Y. (1997).

Saleh, N., T. Phenrat, et al. (2005). "Adsorbed Triblock Copolymers Deliver Reactive Iron Nanoparticles to the Oil/Water Interface" Nano Letters 5(12): 2489-2494.

Saleh, N., Sarbu, T., Sirk, K., Lowry, G. V., Matyjaszewski, K., and Tilton, R. D., "Oil-in-Water Emulsions Stabilized by Highly Charged Polyelectrolyte-Grafted Silica Nanoparticles," Langmuir, 21, 9873-9878 (2005).

Sheppard, S., Mantle, M. D., Sederman, A. J., Johns, M. L., and Gladden, L. F., "Magnetic Resonance Imaging Study of Complex Fluid Flow in Porous Media: Flow Patterns and Quantitative Saturation Profiling of Amphiphilic Fracturing Fluid Displacement in Sandstone Cores," Magnetic Resonance Imaging, 21, 365-367 (2003).

Telenkov, S. A., Dave, D. P., Sethuraman, S., Akkin, T., and Milner, T. E., "Differential Phase Optical Coherence Probe for Depth-Resolved Detection of Photothermal Response in Tissue," Phys. Medicine Biology, 49, 111-119 (2004).

Thompson, A. H. and G. A. Gist: "Geophysical Prospecting," U.S. Pat. No. 5,877,995, Mar. 2, 1999.

Zhang, G. Q., Huang, C.-C., and Hirasaki, G. J., "Interpretation of Wettability in Sandstones with NMR Analysis," Petrophysics, 41(32), 223-233 (2000).

Zhang, T., M. R. Roberts, S. L. Bryant and C. Huh: "Foams and Emulsions Stabilized With Nanoparticles for Potential Conformance Control Applications", SPE paper 121744 presented at SPE Intern. Symp. Oilfield Chemistry, The Woodlands, Tex., April 2009.

What is claimed is:

1. A method of determining a presence, measuring a distribution and saturation or both of an oil or a hydrocarbon or $CO_2$ in a reservoir rock or subsurface formation comprising:
   injecting a fluid comprising one or more paramagnetic nanoparticles coated with a polymer or a surfactant or any combinations thereof into the reservoir rock or subsurface formation to adsorb the one or more coated paramagnetic nanoparticles at an oil/water, gas/water or $CO_2$/water interface, wherein the coated paramagnetic nanoparticles are dispersed in a fluid is selected from the group consisting of water, hard water, brine, and any combinations thereof;
   applying an external magnetic field to oscillate the one or more coated paramagnetic nanoparticles adsorbed at the oil/water, gas/water or $CO_2$/water interface;
   measuring one or more acoustic response parameters generated by the oscillation of the one or more coated paramagnetic nanoparticles adsorbed at the oil/water, gas/water or $CO_2$/water interface, wherein the acoustic response is measured by a device selected from the group consisting of a geophone, a surface acoustic wave sensor, a frequency analyzer, and any combinations thereof; and
   determining the presence and an oil, a gas or a $CO_2$ meniscus density in the reservoir rock or subsurface formation to obtain the distribution and the saturation from a frequency spectrum, a magnitude, or a combination thereof of the measured one or more acoustic response parameters.

2. The method of claim 1, wherein the one or more coated paramagnetic nanoparticles have diameters of 1 nm, 5 nm, 10 nm, 25 nm, 40 nm, 50 nm, 60 nm, 75 nm, 90 nm, and 100 nm.

3. The method of claim 1, wherein the one or more coated paramagnetic nanoparticles are selected from the group consisting of nanospheres, nanorods, nanoclusters, nanotubes, nanofibers, and combinations or modifications thereof.

4. The method of claim 1, wherein the method is performed prior to or during an oil recovery operation.

5. The method of claim 1, wherein the one or more acoustic response parameters measured to detect the oscillation of the one or more paramagnetic nanoparticles at the oil/water meniscus is an amplitude of a response oscillation, wherein a measured frequency is twice an applied magnetic frequency.

6. The method of claim 1, wherein the one or more acoustic response parameters measured to detect the oscillation of the one or more paramagnetic nanoparticles at the oil/water meniscus is a wave phase shift between an acoustic response wave and an applied magnetic wave.

7. The method of claim 1, wherein the one or more coated paramagnetic nanoparticles comprise a metal oxide selected from the group consisting of iron, magnesium, molybdenum, lithium, cobalt, nickel, and tantalum.

8. The method of claim 1, wherein further comprising coating the one or more paramagnetic nanoparticles are coated by adsorbing a thin polymer gel film around the one or more paramagnetic nanoparticles, wherein the thin polymer gel film wraps around the one or more paramagnetic nanoparticles to prevent a detachment of the coating during transport of the one or more paramagnetic nanoparticles in the subsurface formation and promotes a high salinity tolerance to the one or more paramagnetic nanoparticles for monovalent and divalent salts.

9. The method of claim 8, wherein the adsorption of the thin polymer gel film is achieved by contacting the one or more paramagnetic nanoparticles suspended in an aqueous solution with the polymer, a cross-linker, a catalyst, a first stabilizer, and a second stabilizer.

10. The method of claim 9, wherein the polymer is selected from the group consisting of polymers comprise monomers, a homopolymer, a copolymer, and combinations and modifications thereof.

11. The method of claim 9, wherein the polymers are polymer is selected from the group consisting of polyacrylic acid (PAA), block copolymers of poly(acrylic acid)m-b-poly(butyl acrylate)n, random copolymers of poly(acrylic acid)m-r-poly(butyl acrylate)n, poly(4-styrene sulfonic acid-co-maleic acid), polyethylene glycol, styrene sulfonic acids, acrylic and methacrylic acid polymers and copolymers, polylactic acid copolymers (PLA) and polylactic glycolic acid (PLGA), vinyl sulfonic acid, vinyl benzyl trimethyl ammonium chloride, acrylamidopropyl trimethyl ammonium chloride, polyethylene oxide, polypropylene oxide, and combinations or modifications thereof, wherein m and n are the number numbers of monomers.

12. The method of claim 9, wherein the first stabilizer and the second stabilizer comprise low molecular weight substances or polymeric materials.

13. The method of claim 9, wherein the second stabilizer is configured so that it increases the adsorption of the one or more paramagnetic nanoparticles at the oil-water interface to provide an enhanced imaging of the oil, hydrocarbon, or $CO_2$ in the reservoir rock or subsurface formation, and decreases adsorption of the one or more paramagnetic nanoparticles at rock surfaces in the reservoir rock or subsurface formation to promote the transport of the one or more nanoparticles in the reservoir rock or subsurface formation.

14. The method of claim 9, wherein the first and the second stabilizers are selected from the group consisting of polyacrylic acid (PAA), block copolymer of poly(acrylic acid)$_m$-b-poly(butyl acrylate)$_n$, random copolymer of poly(acrylic acid)$_m$-r-poly(butyl acrylate)$_n$, poly(4-styrene sulfonic acid-co-maleic acid), polyethylene glycol, styrene sulfonic acids, acrylic and methacrylic acid polymers and copolymers, polylactic acid copolymers (PLA) and polylactic glycolic acid (PLGA), vinyl sulfonic acid, vinyl benzyl trimethyl ammonium chloride, acrylamidopropyl trimethyl ammonium chloride, polyethylene oxide, polypropylene oxide, and combinations or modifications thereof, wherein m and n are the numbers of monomers.

15. The method of claim 9, wherein the polymer is selected from the group consisting of a poly(acrylic acid)$_{114}$-b-poly(butyl acrylate)$_{26}$ copolymer, and a poly(4-styrenesulfonic acid-co-maleic acid) copolymer.

\* \* \* \* \*